(12) United States Patent
Yamada et al.

(10) Patent No.: US 11,687,843 B2
(45) Date of Patent: Jun. 27, 2023

(54) SYSTEM AND METHOD FOR RESERVING RESOURCES AND NOTIFYING GROUP MEMBERS

(71) Applicant: Ricoh Company, Ltd., Tokyo (JP)

(72) Inventors: Tsuyoshi Yamada, Kanagawa (JP); Yasuhiro Hayashi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 1143 days.

(21) Appl. No.: 16/028,552

(22) Filed: Jul. 6, 2018

(65) Prior Publication Data

US 2019/0012614 A1    Jan. 10, 2019

(30) Foreign Application Priority Data

Jul. 6, 2017  (JP) .............................. JP2017-133152
Jul. 10, 2017 (JP) .............................. JP2017-135004
Mar. 14, 2018 (JP) .............................. JP2018-047353

(51) Int. Cl.
  *G06Q 10/02*  (2012.01)
  *H04L 67/12*  (2022.01)
  (Continued)

(52) U.S. Cl.
  CPC ....... *G06Q 10/02* (2013.01); *G06Q 10/06314* (2013.01); *G07C 1/10* (2013.01);
  (Continued)

(58) Field of Classification Search
  CPC .............. G06Q 10/02; G06Q 10/06314; H04L 12/1818; H04L 67/12; H04L 67/26; H04L 51/046
  See application file for complete search history.

(56) References Cited

U.S. PATENT DOCUMENTS

2002/0062348 A1* 5/2002 Maehiro .............. A63F 13/352
                                                        348/E7.083
2002/0143600 A1* 10/2002 Dugan ................ G06Q 10/109
                                                        709/204
(Continued)

FOREIGN PATENT DOCUMENTS

JP      2003-141066 A    5/2003
JP      2003-248739 A    9/2003
(Continued)

OTHER PUBLICATIONS

Japanese Office Action dated Nov. 17, 2020 in Japanese Patent Application No. 2017-135004, 3 pages.
(Continued)

*Primary Examiner* — Justin R. Blaufeld
(74) *Attorney, Agent, or Firm* — Xsensus LLP

(57) ABSTRACT

An information processing apparatus is communicable with a reservation management apparatus and an information providing apparatus via a network. The information processing apparatus includes a memory and circuitry. The memory stores association information associating notification destination information and identification information for reservation with each other. The notification destination information is information used for transmitting notification to one or more target persons belonging to a same group. The circuitry obtains reservation information from the reservation management apparatus, and obtains, from the obtained reservation information, particular identification information for reservation identifying a user who requested a reservation of a resource indicated by the obtained reservation information. The circuitry identifies particular notification destination information used for transmitting the notification information relating to the obtained reservation information. The circuitry requests the information provid- (Continued)

ing apparatus to send the notification information to a group associated with the identified notification destination information.

11 Claims, 42 Drawing Sheets

(51) Int. Cl.
    *G07C 1/10*     (2006.01)
    *G07C 9/29*     (2020.01)
    *G07C 9/27*     (2020.01)
    *G07C 9/23*     (2020.01)
    *G06Q 10/0631*     (2023.01)
    *H04L 12/18*     (2006.01)
    *H04L 67/55*     (2022.01)
    *H04L 51/046*     (2022.01)

(52) U.S. Cl.
    CPC .............. *G07C 9/23* (2020.01); *G07C 9/27* (2020.01); *G07C 9/29* (2020.01); *H04L 12/1818* (2013.01); *H04L 67/12* (2013.01); *H04L 67/55* (2022.05); *H04L 51/046* (2013.01)

(56) References Cited

U.S. PATENT DOCUMENTS

| | | | |
|---|---|---|---|
| 2003/0182379 A1* | 9/2003 | Henry | H04L 51/48 709/206 |
| 2003/0236842 A1* | 12/2003 | Natarajan | H04L 51/48 709/206 |
| 2004/0049539 A1* | 3/2004 | Reynolds | H04L 12/1822 709/205 |
| 2004/0215592 A1 | 10/2004 | Matsuura et al. | |
| 2005/0034079 A1* | 2/2005 | Gunasekar | H04M 3/567 715/756 |
| 2010/0132034 A1* | 5/2010 | Pearce | G06F 3/038 726/19 |
| 2010/0169320 A1* | 7/2010 | Patnam | H04L 51/234 707/E17.014 |
| 2012/0011205 A1* | 1/2012 | Paulsami | G06Q 10/1095 709/204 |
| 2014/0040780 A1* | 2/2014 | Artzt | G06Q 10/101 715/753 |
| 2014/0222916 A1* | 8/2014 | Foley | G06F 16/176 709/204 |
| 2015/0082222 A1 | 3/2015 | Yamada | |
| 2015/0154521 A1* | 6/2015 | Mu | H04L 12/1818 705/7.12 |
| 2015/0256605 A1* | 9/2015 | Hashimoto | H04L 43/06 709/203 |
| 2016/0070557 A1 | 3/2016 | Yamada | |
| 2016/0099947 A1* | 4/2016 | Asai | H04L 51/043 726/28 |
| 2016/0261769 A1 | 9/2016 | Yamada | |
| 2017/0099570 A1 | 4/2017 | Yamada | |
| 2018/0015755 A1 | 1/2018 | Yamada | |
| 2018/0020120 A1 | 1/2018 | Yamada | |
| 2018/0082264 A1* | 3/2018 | Szeto | G06Q 10/1095 |
| 2019/0289047 A1* | 9/2019 | Bai | H04L 65/1069 |

FOREIGN PATENT DOCUMENTS

| | | |
|---|---|---|
| JP | 2012-185568 A | 9/2012 |
| JP | 2013-061929 | 4/2013 |
| JP | 2013-206024 A | 10/2013 |
| JP | 2015-180992 A | 10/2015 |
| JP | 2016-004511 A | 1/2016 |
| JP | 2016-045634 | 4/2016 |
| JP | 2016-103148 A | 6/2016 |
| WO | 2017/008014 A1 | 1/2017 |

OTHER PUBLICATIONS

Office Action dated Jan. 25, 2022 in Japanese Patent Application No. 2018-047353, 3 pages.

* cited by examiner

FIG. 13A
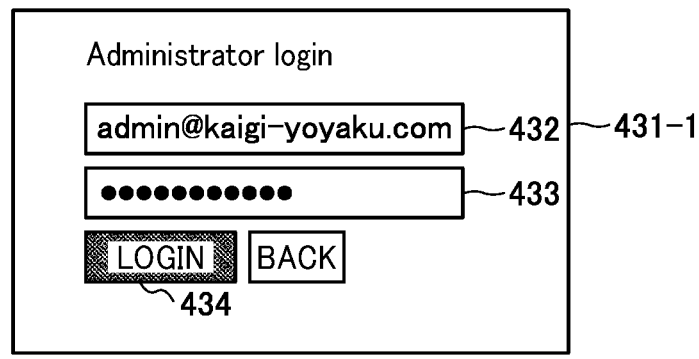
FIG. 13B
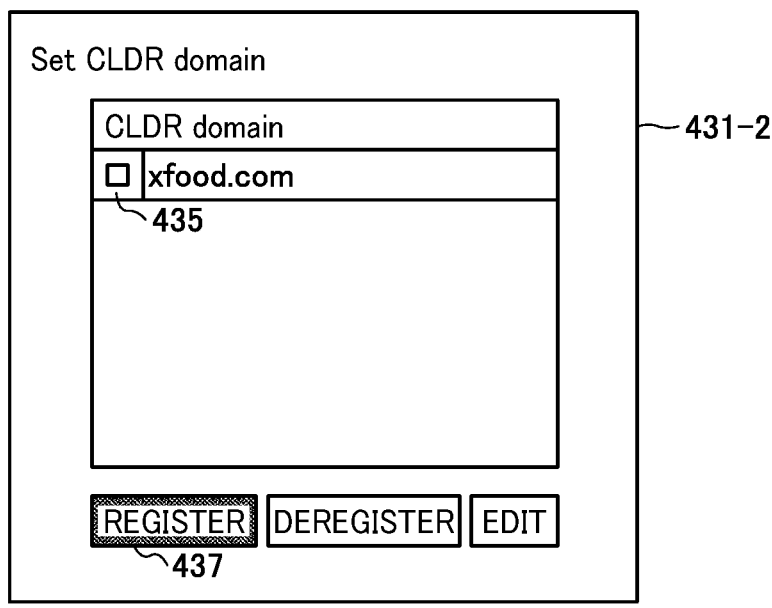
FIG. 13C
| CLDR domain | CLDR administrator account |
|---|---|
| ☐ xfood.com | a@xfood.com |
| 435 | 436 |

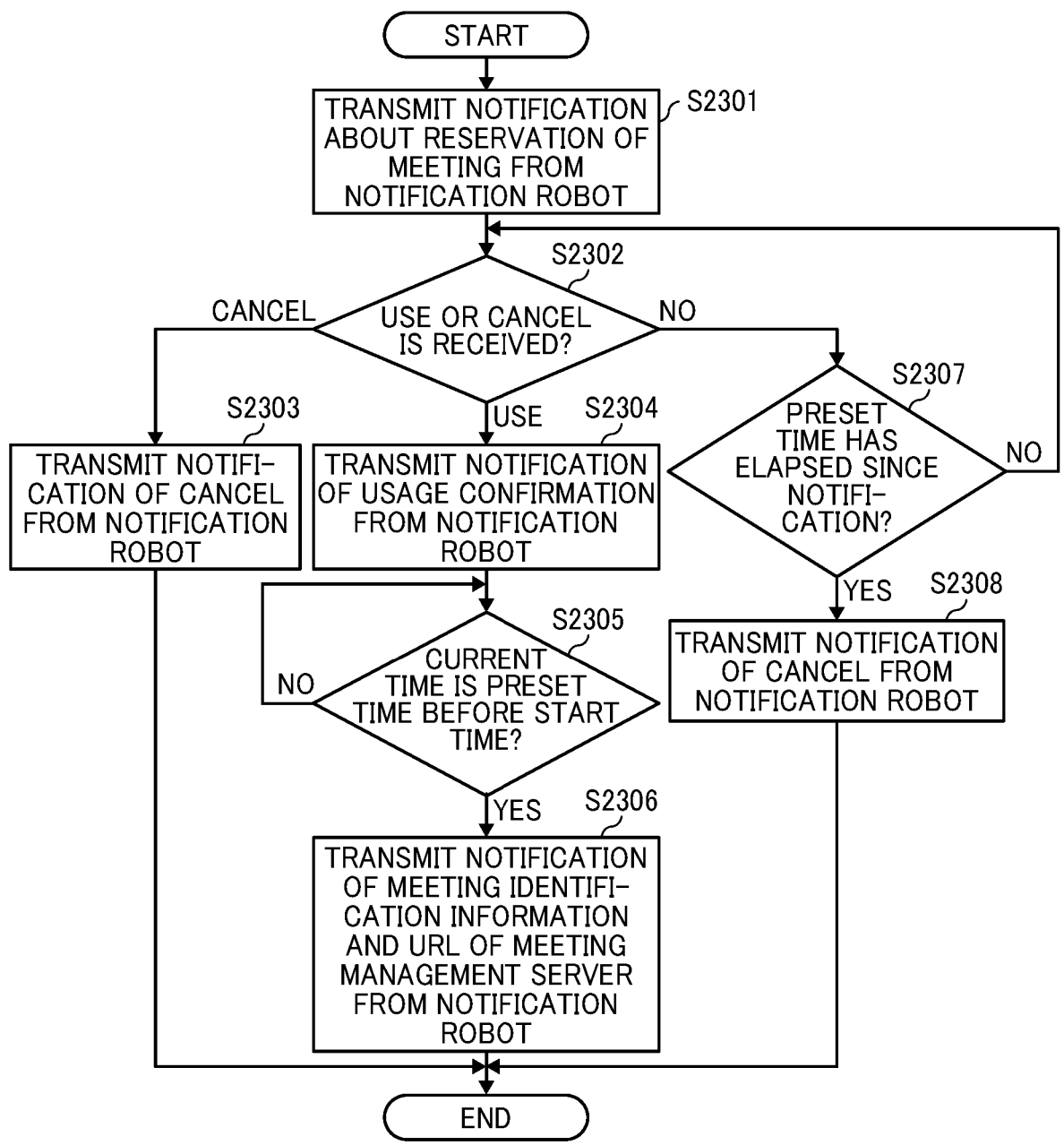

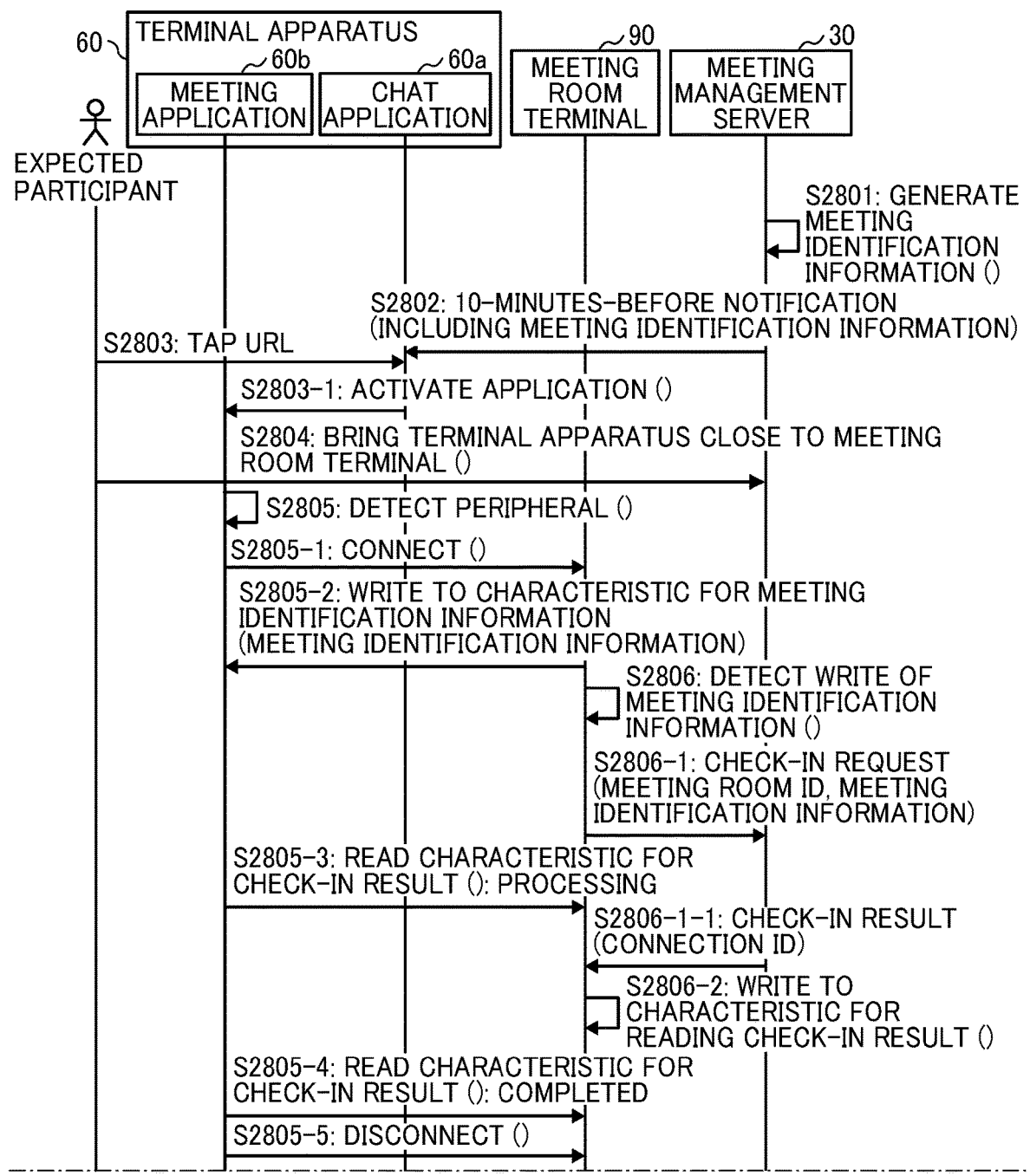

SYSTEM AND METHOD FOR RESERVING RESOURCES AND NOTIFYING GROUP MEMBERS

CROSS-REFERENCE TO RELATED APPLICATIONS

This patent application is based on and claims priority pursuant to 35 U.S.C. § 119 (a) to Japanese Patent Application Nos. 2017-135004, filed on Jul. 10, 2017, 2018-047353, filed on Mar. 14, 2018, and 2017-133152, filed on Jul. 6, 2017, the entire disclosures of which are incorporated herein by reference.

BACKGROUND

Technical Field

The present disclosure relates to an information processing apparatus, a resource reservation system, and an information transmission method.

Description of the Related Art

A system for reserving resources such as a meeting room is known. A person who is going to hold a meeting operates a terminal apparatus to control the terminal apparatus to communicate with a reservation management server, to book a meeting room using a browser that operates on the terminal apparatus. Further, the person who made a reservation for the meeting and other participants who are invited to attend the meeting can communicate with the reservation management server by operating the terminal apparatus, to confirm the date and/or the location of the scheduled meeting.

Such resource reservation system simplifies a reservation of resources. On the other hand, in a case where the meeting is postponed or canceled, the person who made a reservation for the meeting or other participants who are invited to attend the meeting can sometimes forget to cancel or change the reservation of the meeting room set in the resource reservation system. Further, even when the meeting is not postponed or canceled, the participants can just forget that the scheduled meeting. In a case where a small number of participants are scheduled to the meeting, the meeting can be cancelled because there are not enough participants for the holding of the meeting. Reserving a meeting room that is not actually used is called an "empty reservation". The empty reservation deprives an opportunity to use a meeting room from others who wanted to use the meeting room. In addition, the empty reservation deprives a provider that provides the meeting room of an opportunity to provide the meeting room.

One example way to reduce the empty reservation is to send a reminder indicating that a meeting room has been booked, from the reservation management server to the participants who are scheduled to attend a meeting, at appropriate timings. Examples of the reminder transmitted to the participants can include a schedule of the meeting to be held. The expected participants who are reminded of the reservation for the meeting room will attend the meeting. Otherwise, any one of the participants can operate the terminal apparatus to control the terminal apparatus to communicate with the reservation management server, to cancel the reservation of the meeting room using the browser that operates on the terminal apparatus.

A technique is known that emails a reminder of a scheduled meeting to expected participants.

SUMMARY

An information processing apparatus is communicable with a reservation management apparatus and an information providing apparatus via a network. The information processing apparatus includes a memory and circuitry. The memory stores association information associating notification destination information and identification information for reservation with each other. The notification destination information is information used for transmitting notification to one or more target persons belonging to a same group. The circuitry obtains reservation information from the reservation management apparatus, and obtains, from the obtained reservation information, particular identification information for reservation identifying a user who requested a reservation of a resource indicated by the obtained reservation information. The circuitry identifies, from the association information in the memory using the particular identification information for reservation, particular notification destination information used for transmitting the notification information relating to the obtained reservation information. The circuitry requests the information providing apparatus to send the notification information to a group associated with the identified notification destination information.

BRIEF DESCRIPTION OF THE DRAWINGS

A more complete appreciation of the embodiments and many of the attendant advantages and features thereof can be readily obtained and understood from the following detailed description with reference to the accompanying drawings, wherein:

FIGS. 13A to 13C each illustrates an example of a domain management screen displayed at the registration terminal, according to an embodiment of the present disclosure;

FIG. 23 is a flowchart illustrating an example of an operation, performed by the meeting management server, of notifying the information about the reservation for the meeting room, according to an embodiment of the present disclosure;

FIGS. 28A and 28B are a sequence diagram illustrating an example of an operation in which an expected participant checks in using a short-range wireless communication network, according to an embodiment of the present disclosure;

Figure 1:
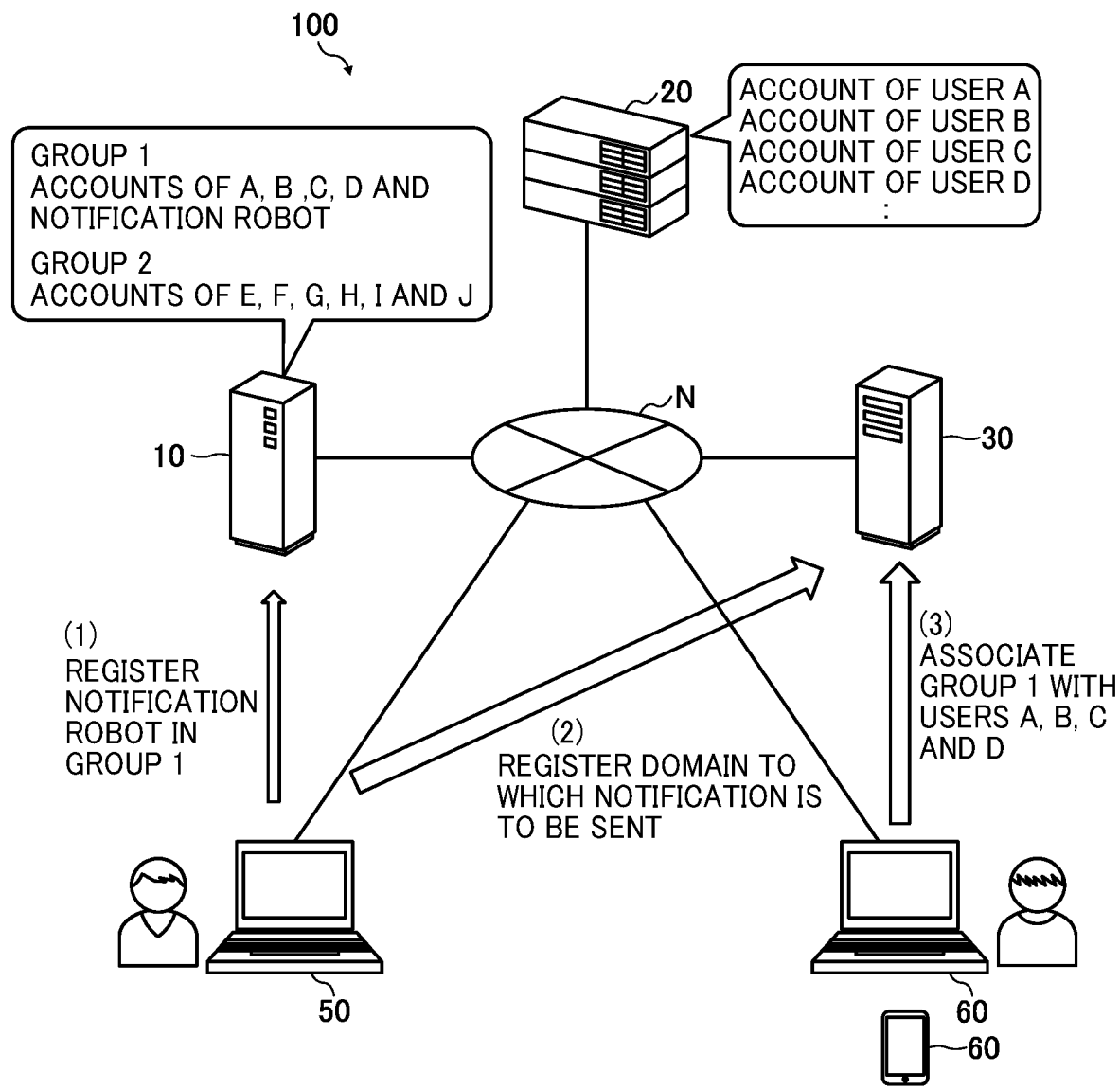
FIG. 1 is an example illustration for explaining a preliminary registration process relating to a resource reservation system, according to an embodiment of the present disclosure.

The accompanying drawings are intended to depict embodiments of the present invention and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the multiple forms as well, unless the context clearly indicates otherwise.

Hereinafter, a description is given of a resource reservation system and an information notification process, performed by the resource reservation system, according to example embodiments of the present disclosure.

Embodiment 1

<Preliminary Registration Process>

First, a description is given of a preliminary registration process for enabling a resource reservation system configured to reduce empty reservations to operate.

FIG. 1 is an example illustration for explaining a preliminary registration process relating to a resource reservation system 100, according to the present embodiment. A chat server 10, a reservation management server 20, and a meeting management server 30 are communicably connected with each other via a network N. The chat server 10 controls a chat system. The reservation management server 20 manages reservations of resources such as a meeting room. The meeting management server 30 manages meetings to be held in a meeting room. The chat server 10 is an example of an information providing apparatus. The reservation management server 20 is an example of a reservation management apparatus.

The chat system is a system that transmits and receives data such as texts in real time in one to one or one to many (group). In FIG. 1, accounts of users A, B, C and D are associated with a group 1. In other words, the users A, B, C and D constitute the group 1. Text entered by the user A is displayed on a terminal apparatus 60 of the user A, and transmitted to terminal apparatuses 60 of the users B, C, and D. Similarly, text entered by the user B is displayed on the terminal apparatus 60 of the user B, and transmitted to the terminal apparatuses 60 of the users A, C, and D. Text entered by each of the user C and the user D is displayed and transmitted in substantially the same manner. In the present embodiment, using the chat system like this, the meeting management server 30 sends information about a reservation of a meeting room, to the users A, B, C, and D, each being an expected participant.

The reservation management server 20 is a server (information processing apparatus) that provides a web service for performing overall schedule management. The reservation management server 20 accepts reservation for a meeting room. The expected participants can confirm the schedule of meeting at a desired timing. The resource reservation system 100 associates the group of the chat system with the expected participants of the meeting (the expected participant of the meeting who made reservation for the meeting to the reservation management server 20), using an account of the reservation management server 20. This is one of features of the present embodiment. Hereinafter, a description is given of an overview of the preliminary registration process.

(1) An administrator of the resource reservation system 100 operates a registration terminal 50 to control the registration terminal 50 to communicate with the chat server 10, to obtain an account of a notification robot. The notification robot is a program generally called a "bot". The notification robot enters a comment in the group, behaving as an agent of the meeting management server 30 registered in the chat system. A group for which the notification robot is registered is a group of expected participants who are slated to attend a meeting. In an example of FIG. 1, the notification robot is registered in the group 1. In other words, the group 1 contains expected participants who are slated to participate in a meeting.

(2) Further, the administrator of the resource reservation system 100 operates the registration terminal 50 to control the registration terminal 50 to communicate with the meeting management server 30, to register a domain to which information, such as text, is to be notified. This domain is a domain common to accounts issued by the reservation management server 20 to the expected participants. For example, when the accounts are email addresses, the domain registered in the meeting management server 30 is a domain part of each email address. For example, a domain is issued for each company. As a rule, the reservation information of a meeting room can be retrieved by this domain. In addition, when obtaining the reservation information, not only the domain, but also account information such as an email address and password of the administrator having administrator authority are used. A range of the reservation information that can be obtained is determined based on the authority that the administrator has. For example, when the administrator's authority covers the domain in its entirety, the registration information of the domain in its entirety is obtained.

(3) Next, one of the expected participants associates the group 1 with each of the users A, B, C, and D. Specifically, the one of the expected participants operates a terminal apparatus 60 to control the terminal apparatus 60 to communicate with the meeting management server 30, to register the account of the user (expected participant) of the resource reservation system 100 issued by the reservation management server 20 with a group name of the group 1. More specifically, the account issued by the reservation management server 20 is associated with information such as a group name, the information specifying a destination to which a message is to be sent in the chat system. For example, in Slack (registered trademark), a channel name and a team name are required as the information specifying the destination to which a message is to be sent.

With the above-described preliminary registration process, the meeting management server 30 can notify the expected participants of information about the reservation of a meeting room, using the chat server 10.

<Overview of Notification>

Figure 2:
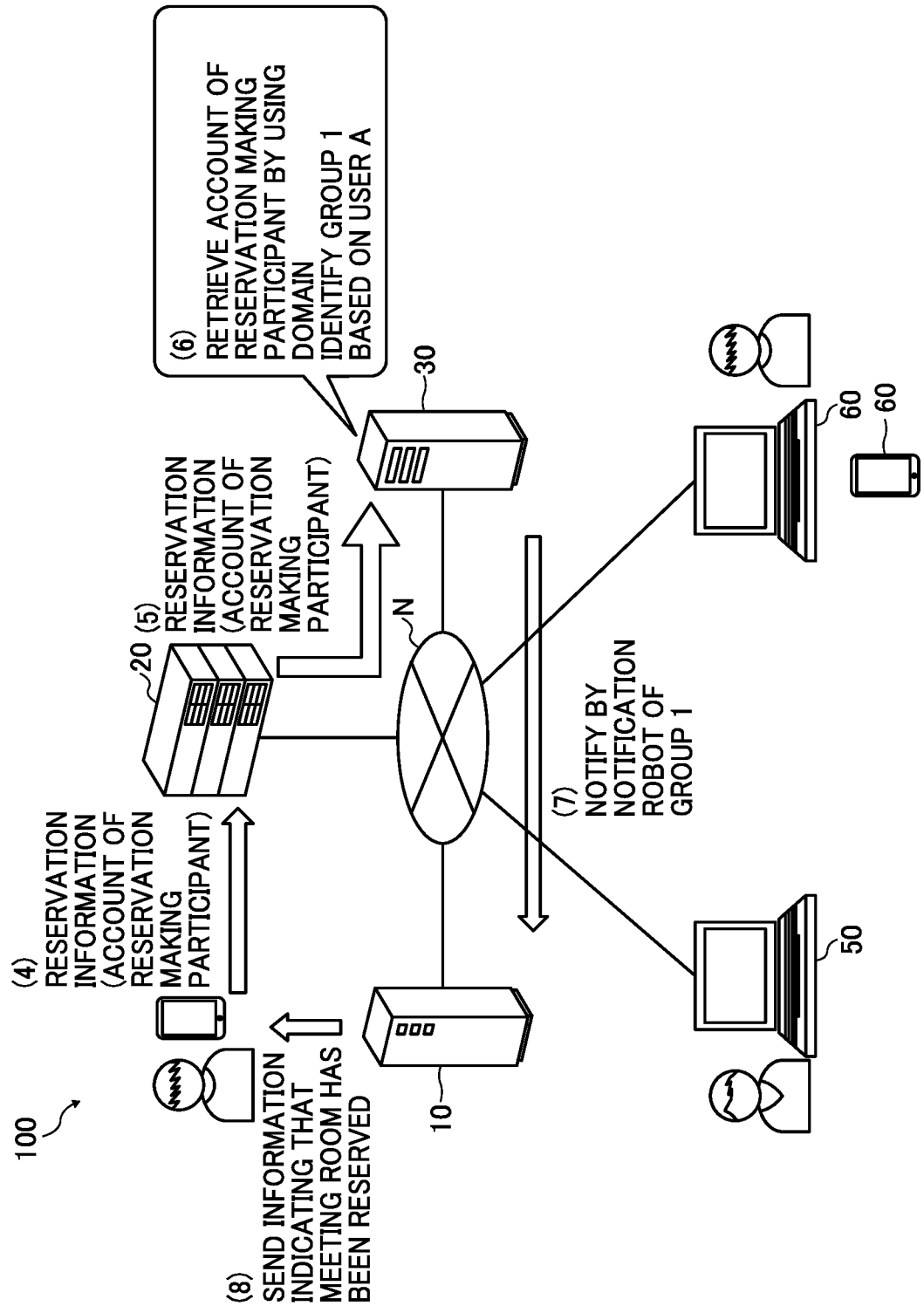
FIG. 2 is an example illustration for explaining an operation in which a meeting management server notifies expected participants of information about a reservation for a meeting room, according to an embodiment of the present disclosure.

FIG. 2 is an example illustration for explaining an operation in which the meeting management server 30 notifies the expected participants of the information about the reservation of a meeting room.

(4) At least one of the expected participants operates the terminal apparatus 60 to control the terminal apparatus 60 to communicate with the reservation management server 20, to reserve a meeting room. Reservation information about the reservation of the meeting room is stored in the reservation management server 20. The reservation information includes at least an account of the expected participant who made the reservation. The expected participant who made a reservation can be referred to as a "reservation-making participant" hereinafter. In other words, the reservation information includes at least an account of the reservation-making participant.

(5) The meeting management server 30 determines an arbitrary domain to send a notification to one or more expected participants whose account includes this domain. The meeting management server 30 periodically communicates with the reservation management server 20 to acquire reservation information from the reservation management server 20.

(6) In this example, it is assumed that the meeting management server 30 acquires the reservation information of the user A. This enables the meeting management server 30 to identify a destination associated with the user A, to which destination the notification robot is to enter a comment. In this example, it is assumed that the group 1 associated with the user A is identified.

(7) The meeting management server 30 communicates with the chat server 10, to control the chat server 10 as the notification robot registered in the group 1 to notify the expected participants belonging to the group 1 of the information about the reservation of the meeting room. In other words, the meeting management server 30 causes the chat server 10 to send suitable text to the other expected participants.

(8) The chat system sends the text entered by the notification robot to all members belonging to the group. Thus, the information about the reservation of the meeting room is notified to all the expected participants.

Therefore, the resource reservation system 100 according to the present embodiment can notify the expected participants of the information about the reservation of the meeting room by using the chat system instead of sending an email. According to statistics, people are much more likely to view (read) text of the chat system than email messages. Accordingly, by using the chat system, the risk that expected participants overlook the information about the reservation for the meeting room can be reduced. Further, in the chat system, a group is created in a simple manner. Accordingly, an administrator of the resource reservation system 100 or expected participants who are slated to attend a meeting can create a group of the expected participants.

<Terms Used in the Disclosure>

The expected participants become participants after they check in. However, in this disclosure, the term "expected participant" can refer to both of an expected participant and an actual participant.

Information about the reservation of a resource can include any information relating to the reservation of resource. For example, the information about the reservation of the resource just indicates that the reservation has been made. In another example, the information can include information about a target of the reservation and/or a start time of utilization of the resource. A term "remind" can refer to transmission of the information regarding the reservation of the resource.

The term "customer" refers to a company that uses the resource reservation system 100. An expected participant is assumed to be an employee of this customer. In another example, the customer can be an individual.

The term "resource" refers to something that can be reserved, e.g., a physical place such as a room, a building, or a location, or some type of device or equipment. In the present embodiment, the term "meeting room" is used as an example to describe such a resource.

The term "group" refers to several persons assembled together. A "target person" belonging to the group refers to a person who belongs to any arbitrary group in the chat server 10. Alternatively, the target person refers to a member of a group to which notification information is transmitted. The group specifies to which members in the chat system, generally called a "room," the notification information is to be transmitted. In Slack (registered trademark), which is an example of a chat system, the "group" is referred to as a channel. In another chat system, the "group" is referred to as a group.

The term "notification information" refers to information transmitted from the meeting management server 30 to the chat server 10, the information being shared by the group.

The term "resource terminal" refers to any information processing apparatus that is provided (located) in the resource and has a communication capability with the meeting management server 30. The resource terminal preferably includes a display and has a communication capability with the terminal apparatus 60.

<Example of System Configuration>

Figure 3:
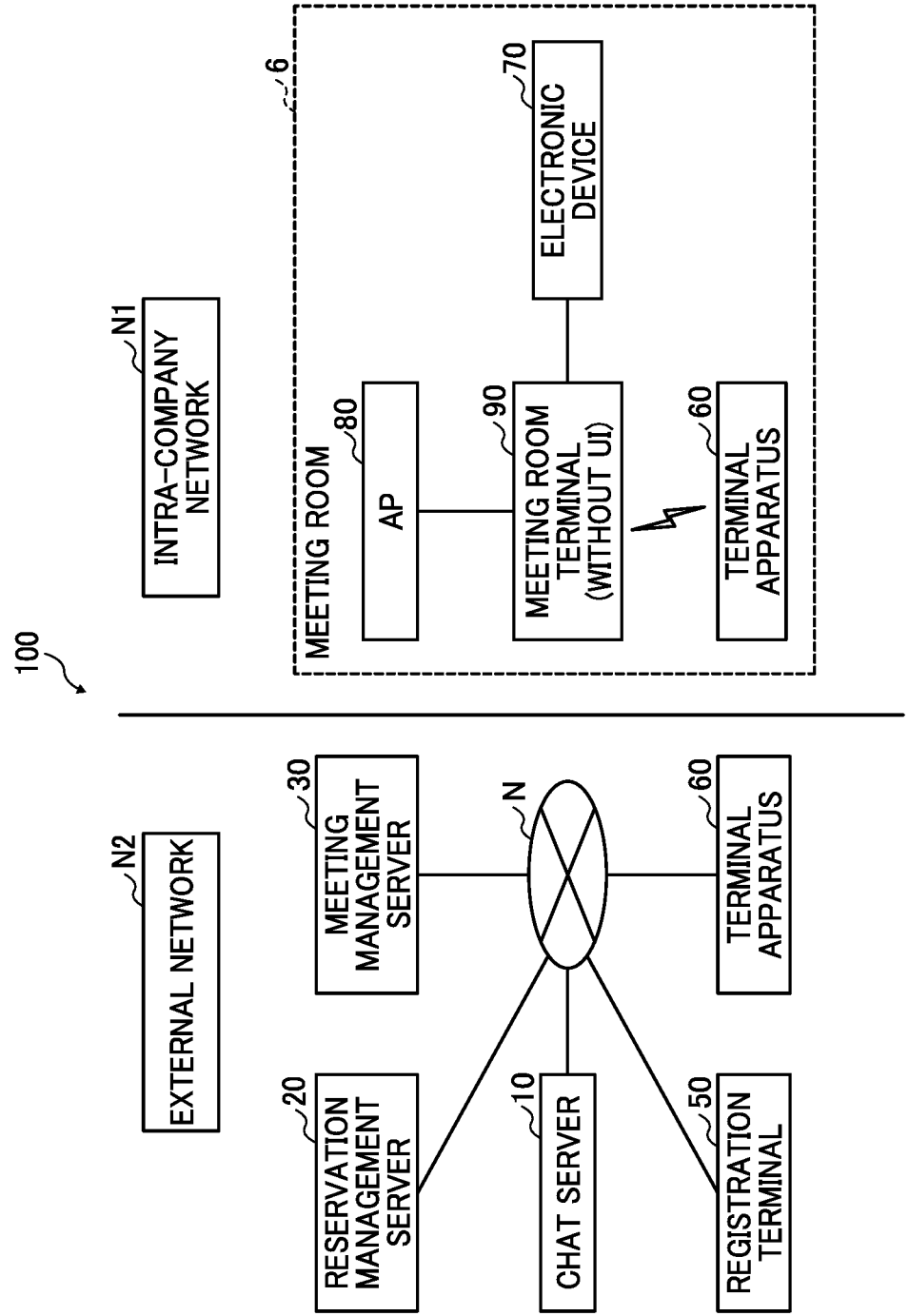
FIG. 3 is a schematic view illustrating an example of a system configuration of the resource reservation system, according to an embodiment of the present disclosure.

FIG. 3 is a schematic view illustrating an example of a system configuration of the resource reservation system 100. The resource reservation system 100 is mainly divided into an external network N2 and an intra-company network N1. In this disclosure, the intra-company network N1 refers to a network inside a firewall. The external network N2 is a network (including the Internet) through which an unspecified number of communications are transmitted.

The reservation management server 20, the meeting management server 30, and the chat server 10 are communicably connected to the external network N2. In addition, the registration terminal 50 operated by an administrator of the resource reservation system 100 and the terminal apparatus 60 operated by an expected participant of the meeting are connected to the external network N2 as needed. In another example, the registration terminal 50 and the terminal apparatus 60 are configured to connect to the external network N2 from the intra-company network N1.

The reservation management server 20 is implemented by one or more information processing apparatuses (computer systems), each including a general-purpose server operating system (OS) or the like. A system relating to the reservation for a resource, which system is provided by the reservation management server 20, is referred to as a reservation management system. The reservation management server 20 has a calendar system and provides a web application for managing various schedules. Specifically, the web application provides the following functions, for example.

To accept schedule registration, and enable a reservation-making participant to confirm the reservation from anywhere at any time;

To send a reminder email at the preset date and time, such as 30 minutes before the schedule time;

To enable one person to manage schedules using plural calendars (for business, for private, etc.);

To share a calendar with users belonging to the same group.

The reservation management server 20 manages a user using an account. The account refers to a right for a user to use a service. In many systems, the user logs in to a system using the account. For this reason, the account has a function (function of identification information) to enable the system to uniquely identify the user. In the present embodiment, the meeting management server 30 can obtain the reservation information of a meeting room by using the account of the reservation management server 20. Examples of the accounts include an email address, an ID, and a telephone number. The meeting management server 30 logs in to the reservation management server 20 using, for example, the account and a password.

Although in the present embodiment, the reservation management server 20 manages the holding of a meeting according to a schedule, the reservation management server 20 is configured to manage various types of schedules in addition to the holding of a meeting. The reservation management server 20 can be used for reservations for various types of resources other than a meeting room, such as a reservation for rental of various electronic devices, or a reservation for a parking lot. Although G Suite (registered trademark), Office 365 (registered trademark), and the like are known as reservation management systems, any other suitable reservation management server having functions described in the present embodiment will suffice.

Further, in the present embodiment, information relating to one or more meeting rooms 6 within the intra-company network N1 is registered in advance in the reservation management server 20. In other words, the web application of the reservation management server 20 is customized according to a meeting room name, a meeting room ID, a reservation available time, a unit of reservation and the like of each meeting room 6 residing within the intra-company network N1 of a company using the resource reservation system 100. Accordingly, each meeting room 6 of the company using the resource reservation system 100 is associated with the reservation information.

The chat server 10 is implemented by one or more information processing apparatuses (computer systems), each including a general-purpose server OS or the like. A system for real-time sharing of information, such as text, by a plurality of users provided by the chat server 10 is referred to as a chat system. The chat server 10 notifies the terminal apparatus 60 of the information about the reservation of a meeting room.

The information to be shared includes image data, audio data, etc., in addition to text. In the present embodiment, a description is given of an example case in which text is mainly used for the notification, for the sake of explanatory convenience. For example, the chat system can provide a voice chat capability for the group. The voice chat can be a one-to-one voice chat or a one-to-N voice chat, where N≥2. In other words, according to the present embodiment, the chat system notifies the information about the reservation of a meeting room by outputting a voice message, in addition to or in alterative to, displaying text. LINE (registered trademark), Slack (registered trademark), and the like are known as chat systems, but any chat system having a capability of transmitting notification to one or a plurality of users from the notification robot will suffice.

The chat server 10 also manages a user using an account, which is different from the account of the reservation management server 20. However, the meeting management server 30 does not need to recognize the account of the chat server 10.

The meeting management server 30 is implemented by one or more information processing apparatuses (computer systems), each including a general-purpose server OS or the like. As a process relating to the external network N2, the meeting management server 30 acquires the reservation information of a meeting room from the reservation management server 20. Further, in a case where the meeting management server 30 detects the expected participant in the reservation information, the meeting management server 30 transmits the notification to the group of the chat server 10 associated with the detected expected participant at a preset time. As a process related to the intra-company network N1, the meeting management server 30 manages a check-in and a check-out to and from a meeting room. Further, the meeting management server 30 controls turning on or off an electronic device 70, based on the reservation information of a meeting room acquired from the reservation management server 20.

Each of the terminal apparatus 60 and the registration terminal 50 is implemented by one or more information processing apparatuses (computer systems), each including a general-purpose server OS or the like. Although in the above, a description is given of an example case in which the registration terminal 50 is a terminal operated by an administrator of the resource reservation system 100 and the terminal apparatus 60 is an apparatus operated by an expected participant, the registration terminal 50 and the terminal apparatus 60 might not be clearly distinguished from each other. Examples of the terminal apparatus 60 include a smartphone, a tablet terminal, a personal computer (PC), a personal digital assistant (PDA), a wearable PC such as smartglasses, and a smartwatch. Further, the terminal apparatus 60 can be any suitable device, terminal or apparatus, provided that the device, terminal or apparatus has a communication capability and browser software or application software dedicated to the chat server 10 or the reservation management server 20 that operates on the device, terminal or apparatus. For example, the terminal apparatus 60 can be a car navigation system, a game machine, a television receiver, and or like.

In the terminal apparatus 60, application software dedicated to the chat server 10 and application software dedicated to the resource reservation system 100 operate. The application software dedicated to the chat server 10 is referred to as a chat application hereinafter. The application software dedicated to the resource reservation system 100 is referred to as a meeting application hereinafter. Browser software can be substituted for either one or both of the chat application and the meeting application.

An access point (AP) 80, a meeting room terminal 90, and the electronic device 70 are connected to the intra-company network N1. The meeting room terminal 90 and the electronic device 70 are communicable with each other via the AP 80. Examples of the intra-company network N1 include a local area network (LAN). The terminal apparatus 60 is brought into the intra-company network N1 by an expected participant.

The AP 80 is a base station to enable the meeting room terminal 90 and the electronic device 70 to communicate using a wireless LAN. The AP 80 can have a router function. In this case, the AP 80 determines whether a destination of communication is the external network N2 or the intra-company network N1 based on a destination internet protocol (IP) address of the communication, and switches a transfer destination of the communication based on the determination result. Since the intra-company network N1 is inside the firewall, it is difficult to perform direct communication from the external network N2 to the intra-company network N1.

The meeting room terminal 90 is an information processing apparatus (resource terminal) operated by an expected participant who uses the meeting room 6. For example, the meeting room terminal 90 is provided on a desk in the meeting room 6 or at an entrance of the meeting room 6. A plurality of the meeting room terminals 90 can be provided in one meeting room 6. The meeting room terminal 90 is implemented by one or more information processing apparatuses (computer systems), each including a general-purpose server OS or the like. The meeting room terminal 90 displays a menu for check-in, check-out, etc. Further, the meeting room terminal 90 communicates with the meeting management server 30, to notify the meeting management server 30 of the check-in or the check-out. Further, for example, the meeting room terminal 90 transmits the meeting room ID to the meeting management server 30, and displays the reservation information of the meeting room of a meeting currently being held. Furthermore, the meeting room terminal 90 acquires control information such as turning on or off the electronic device 70 from the meeting management server 30. The meeting room terminal 90 turns on or off the electronic device 70 using the acquired control information.

The meeting application operating on the terminal apparatus 60 communicates with the meeting room terminal 90 via a short-range wireless communication network, for example. As described later, the information about a reservation of a meeting room acquired by the terminal apparatus 60 includes meeting identification information. The meeting room terminal 90 acquires the meeting identification information by short-distance wireless communication, manual input, a two-dimensional code, etc. Further, the meeting room terminal 90 transmits the acquired meeting identification information to the meeting management server 30. This enables the meeting room terminal 90 to determine whether an expected participant who has a reservation for the meeting room of a most recent time slot from the current time has checked in.

Since the meeting room terminal 90 transmits the meeting identification information and the meeting room ID to the meeting management server 30, the meeting management server 30 can confirm, using the transmitted meeting identification information and meeting room ID, that an expected participant who made a reservation for the meeting room and/or other expected participants slated to attend the meeting together with this reservation-making participant uses the reserved meeting room.

The electronic device 70 is office equipment of various types that can be used in a meeting room. Examples of the electronic device 70 include an electronic whiteboard, a multifunction peripheral, a projector, a digital signage, and a digital camera. The electronic whiteboard includes a large-sized display that supports a touch panel system. The electronic whiteboard detects coordinates of positions on a screen touched by such as a user's finger or a stylus, and connects the detected coordinates to display a stroke. In addition, the electronic whiteboard is configured to display an image in accordance with data output from a PC that is connected to the electronic whiteboard. Further, the electronic whiteboard is configured to communicate with other electronic whiteboard located in a remote site to share the displayed stroke in a synchronous manner. The electronic whiteboard can be referred to as an electronic information board, etc.

The multifunction peripheral has multiple functions, such as a copier function, a scanner function, a printer function, and/or a facsimile transmitting/receiving function. The multifunction peripheral is used for printing or copying documents, scanning documents for conversion to digital data, and faxing documents during the meeting. The projector is a device that projects an image. For example, the projector projects an image (still image or moving image) displayed on a display of the terminal apparatus 60 onto a screen, etc., to enable the participants to share the image. The digital signage is a large-sized display, and is used for displaying any arbitrary still images or moving images. The digital camera is used by each participant to capture an image formed on paper documents or presentation materials displayed on the electronic whiteboard for storage.

Figure 4:
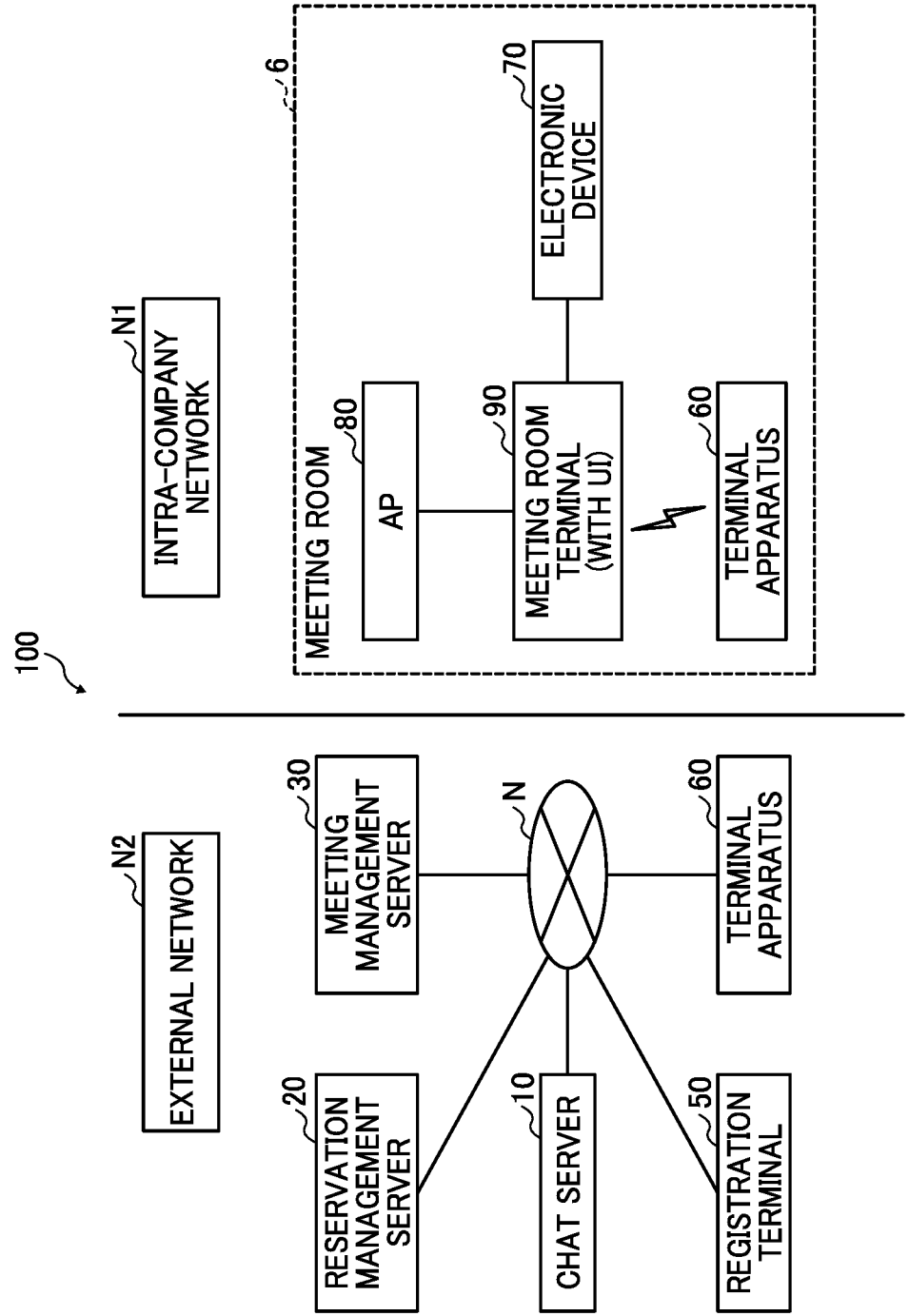
FIG. 4 is a schematic view illustrating another example of a system configuration of the resource reservation system, according to an embodiment of the present disclosure.

In one example, the meeting room terminal 90 supports a user interface (UI), as illustrated in FIG. 3. In another example, the meeting room terminal 90 does not support a UI, as illustrated in FIG. 4. In this disclosure, the UI means a display. In other words, in one example, the meeting room terminal 90 includes a display, while in another example, the meeting room terminal 90 does not include a display. Some of functions implemented by the meeting room terminal 90 differ depending on whether it supports the UI. For example, since the meeting room terminal 90 that does not support the UI cannot accept a user's direct operations, there is a restriction on how the check-in is performed. In the present embodiment, a description is given assuming that the meeting room terminal 90 supports the UI as illustrated in FIG. 4, for the sake of explanatory convenience.

<Hardware Configuration>
<<Hardware Configuration of Meeting Management Server 30>>

Figure 5:
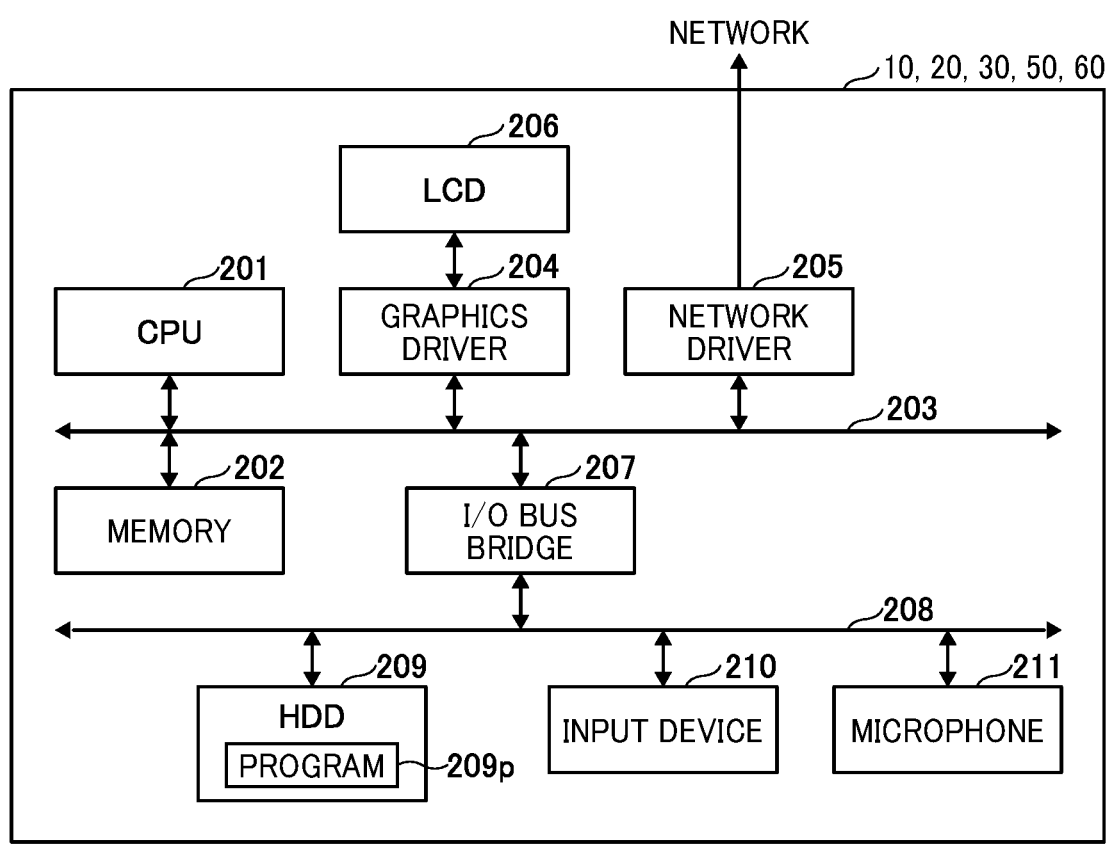
FIG. 5 is a block diagram illustrating an example of a hardware configuration of the meeting management server, according to an embodiment of the present disclosure.

FIG. 5 is a block diagram illustrating an example of a hardware configuration of the meeting management server 30. The meeting management server 30 includes a central processing unit (CPU) 201 and a memory 202 that enables high-speed access to data by the CPU 201. The CPU 201 and the memory 202 are connected to other devices or drivers of the meeting management server 30, such as a graphics driver 204 and a network driver (NIC) 205, via a system bus 203.

The graphics driver 204 is connected to a liquid crystal display (LCD) 206 as an example of a display device via a bus. The graphics driver 204 monitors a processing result by the CPU 201. The LCD 206 is an example of a display device. Further, the network driver 205 connects the meeting management server 30 to the external network N2 at a transport layer level and a physical layer level to establish a session with other devices or apparatuses.

An input/output (I/O) bus bridge 207 is further connected to the system bus 203. On the downstream side of the I/O bus bridge 207, a storage device such as a hard disc drive (HDD) 209 is connected via an I/O bus 208 such as a peripheral component interconnect (PCI), in compliance with the Integrated Drive Electronics (IDE), Advanced Technology Attachment (ATA), AT Attachment Packet Interface (ATAPI), serial ATA, Small Computer System Interface (SCSI), Universal Serial Bus (USB), etc. The HDD 209 stores a program 209p for controlling an overall operation of the meeting management server 30. A solid state drive (SSD) can be used in alternative to the HDD 209. The program 209p can be distributed on a storage medium. Alternatively, the program 209p can be distributed from a server for program distribution.

An input device 210, such as a keyboard and a mouse (called a pointing device), as well as a microphone 211, are connected to the I/O bus 208 via a bus such as a USB. The input device 210 accepts inputs or instructions by an operator such as a system administrator.

It should be noted that the illustrated hardware configuration of the meeting management server 30 indicates hardware elements preferably included in the meeting management server 30.

Each of the reservation management server 20, the chat server 10, the registration terminal 50, and the terminal apparatus 60 has the same or substantially the same hardware configuration as that of the meeting management server 30 illustrated in FIG. 5. Any of those servers, terminal, or devices can have a different hardware configuration as long as such differences cause no problem in describing the resource reservation system 100 of the present embodiment. In addition, the hardware configurations of the meeting management server 30, the reservation management server 20, and the chat server 10 of the present embodiment do not have to be static, since they support cloud computing. In other words, any of those servers can be configured as hardware resources that are dynamically connected/disconnected according to load. The term cloud computing refers to computing where resources on a network are used or accessed without identifying specific hardware resources.

<<Hardware Configuration of Meeting Room Terminal 90>>

Figure 6:
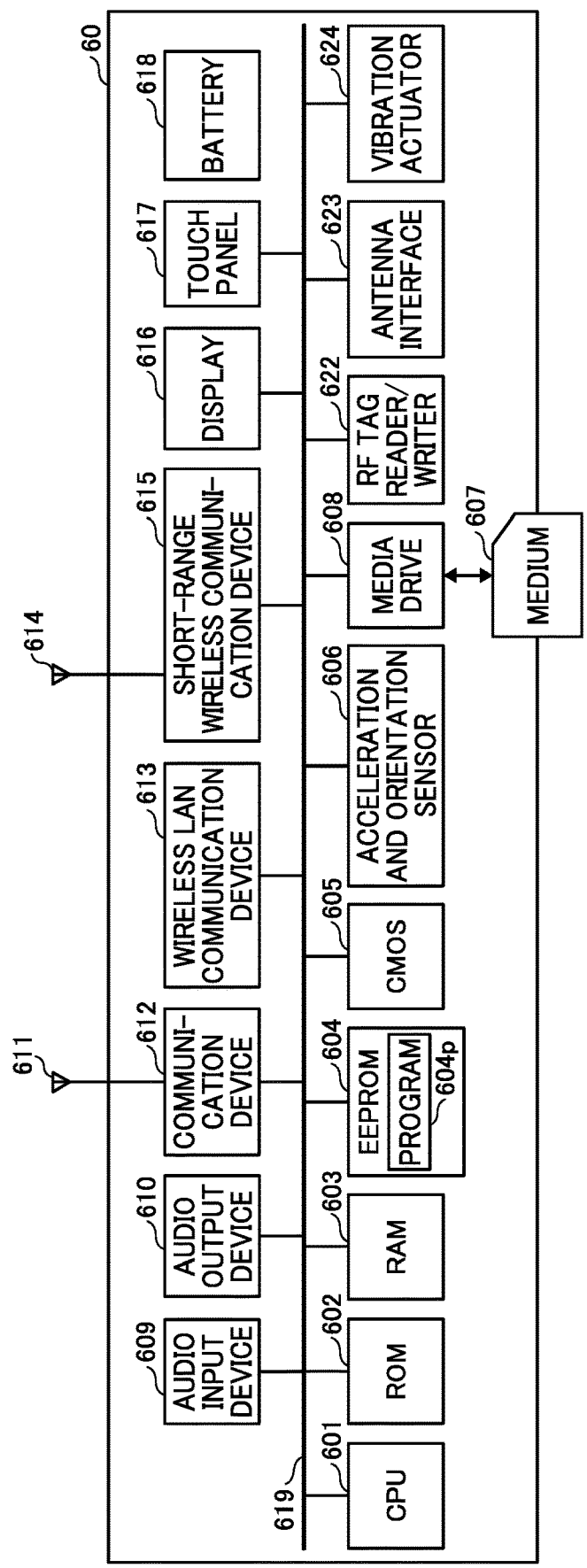
FIG. 6 is a block diagram illustrating an example of a hardware configuration of a meeting room terminal, according to an embodiment of the present disclosure.

FIG. 6 is a block diagram illustrating an example of a hardware configuration of the meeting room terminal 90. FIG. 6 illustrates a hardware configuration of a tablet, as an example of the meeting room terminal 90. Further, the meeting room terminal 90 of FIG. 6 supports the UI, as illustrated in FIG. 4. The meeting room terminal 90 includes a CPU 601, a read only memory (ROM) 602, a random access memory (RAM) 603, an electrically erasable and programmable ROM (EEPROM) 604, a complementary metal oxide semiconductor (CMOS) sensor 605, an acceleration and orientation sensor 606, and a media drive 608.

The CPU 601 controls entire operation of the meeting room terminal 90. The ROM 602 stores a basic input/output program. The RAM 603 is used as a work area for the CPU 601. The EEPROM 604 reads or writes data under control of the CPU 601. The CMOS sensor 605 captures an object under control of the CPU 601 to obtain image data. Examples of the acceleration and orientation sensor 606 includes an electromagnetic compass or gyrocompass for detecting geomagnetism, and an acceleration sensor. The media drive 608 controls reading and writing (storing) of data from and to a medium 607 such as a flash memory. The medium 607 is removably mounted to the media drive 608. Accordingly, under control of the media drive 608, data recorded in the medium 607 is read from the medium 607 and new data is written (stored) into the medium 607.

The EEPROM 604 stores a program 604p executed by the CPU 601. The program 604p is application software of an OS for executing various processes of the embodiment.

The program 604p can be distributed on the medium 607. Alternatively, the program 604p can be distributed from a server for program distribution.

The CMOS sensor 605 is a charge-coupled device that converts an image of an object into electronic data through photoelectric conversion. As an alternative to the CMOS sensor 605, a charge-coupled device (CCD) can be used, provided that it is configured to capture an object. The CMOS sensor 605 is configured to read bar codes and two-dimensional barcodes.

Furthermore, the meeting room terminal 90 includes a radio-frequency (RF) tag reader/writer 622, an antenna interface 623, and a vibration actuator 624. The RF tag reader/writer 622 performs communication in compliance a standard such as near-field communication (NFC).

The vibration actuator 624 is a motor configured to vibrate the meeting room terminal 90. For example, the vibration actuator 624 causes the meeting room terminal 90 to vibrate, to notify the participants that the end time of a meeting is approaching. The meeting room terminal 90 further includes an audio input device 609, an audio output device 610, an antenna 611, a communication device 612, a wireless LAN communication device 613, an antenna 614 for short-range wireless communication, a short-range wireless communication device 615, a display 616, a touch panel 617, and a bus line 619.

The audio input device 609 converts sound into an audio signal. The audio output device 610 converts an audio signal into sound. The communication device 612 communicates with a nearest base station apparatus by radio communication signals using the antenna 611. The wireless LAN communication device 613 performs wireless LAN communication complying with the IEEE 802.11 standard.

The short-range wireless communication device 615 is a communication device complying with communication standards such as NFC or Bluetooth (registered trademark). The short-range wireless communication device 615 performs communication using the antenna 614 for short-range wireless communication.

The display 616 displays an image of an object, various kinds of icons, etc. Examples of the display 616 include an LCD or an organic electroluminescence display. The touch panel 617 is disposed on the display 616. Examples of the touch panel 617 include a pressure-sensing panel and an electrostatic panel. The touch panel 617 detects a position on the display 616 touched by a finger, a stylus, etc. The bus line 619 is an address bus or a data bus, which electrically connects these hardware elements of the meeting room terminal 90.

The meeting room terminal 90 further includes a battery 618 dedicated to the meeting room terminal 90. The meeting room terminal 90 can be driven by either the battery 618 or a commercial power supply. The audio input device 609 includes a microphone to collect sound. The audio output device 610 includes a speaker to output sound.

<<Hardware Configuration of Electronic Device 70>>

Figure 7:
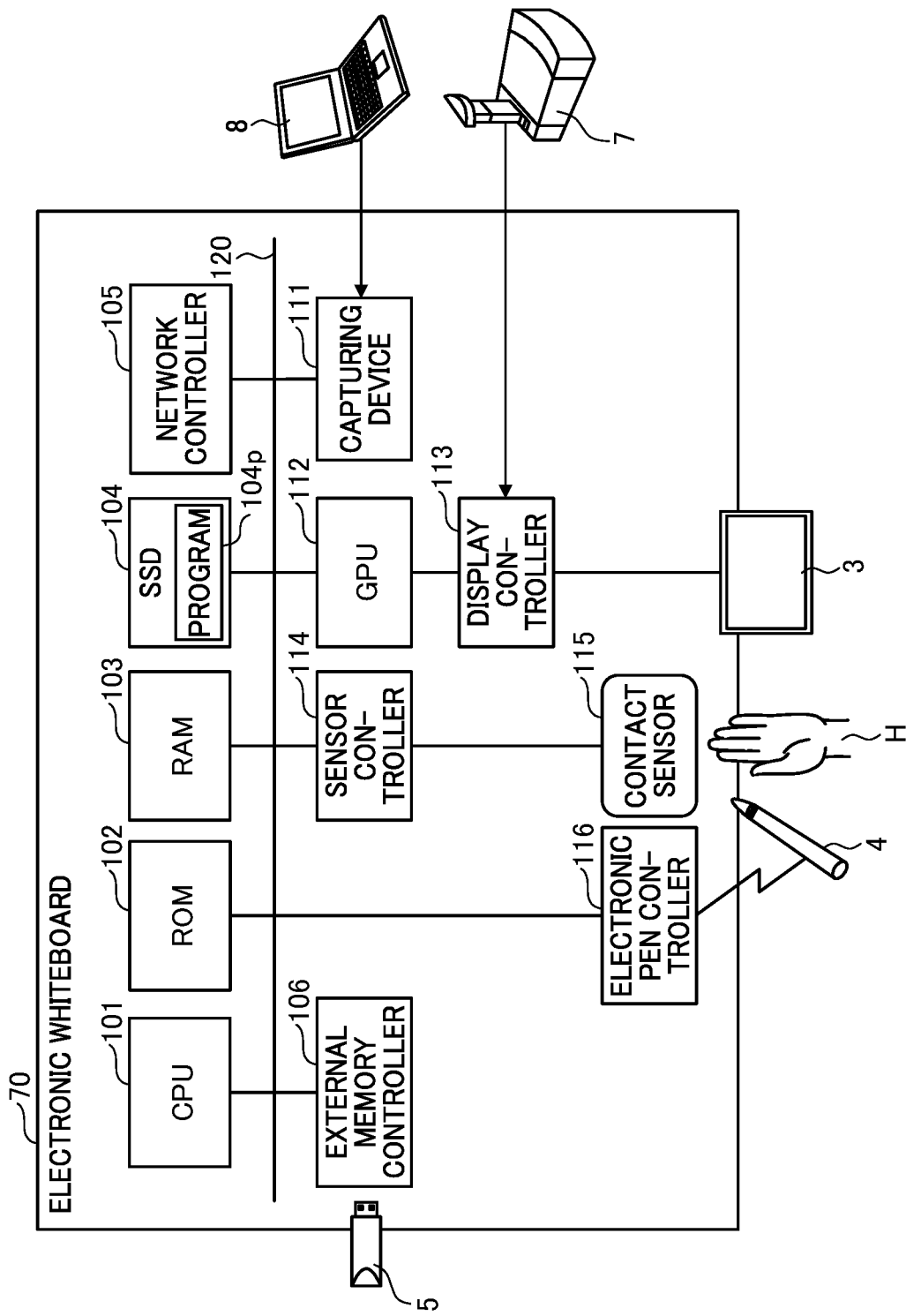
FIG. 7 is a block diagram illustrating an example of a hardware configuration of an electronic whiteboard, which is an example of an electronic device, according to an embodiment of the present disclosure.

FIG. 7 is a block diagram illustrating an example of a hardware configuration of an electronic whiteboard, which is an example of the electronic device 70. As illustrated in FIG. 7, the electronic whiteboard includes a CPU 101, a ROM 102, a RAM 103, an SSD 104, a network controller 105, and an external memory controller 106. The CPU 101 controls entire operation of the electronic whiteboard. The ROM 102 stores programs such as an initial program loader (IPL) to boot the CPU 101. The RAM 103 is used as a work area for the CPU 101. The SSD 104 stores a program 104p. The network controller 105 controls communication between the electronic whiteboard and an external device through the intra-company network N1. The external memory controller 106 controls communication between the electronic whiteboard and a USB memory 5.

The electronic whiteboard further includes a capturing device 111 for capturing a still image or a moving image displayed on a display of a PC 8 by the PC 8. Furthermore, the electronic whiteboard includes a graphics processing unit (GPU) 112 and a display controller 113. The GPU 112 is dedicated to processing graphics, such as processing of images to be displayed on a display 3. The display controller 113 controls and manages a screen display to output images or video from the GPU 112 to the display 3 or a videoconference terminal 7.

The electronic whiteboard further includes a sensor controller 114 and a contact sensor 115. The sensor controller 114 controls processing of the contact senor 115. The contact sensor 115 detects a touch onto the display 3 with a pointer 4 or a hand H. The electronic whiteboard further includes an electronic pen controller 116. The electronic pen controller 116 communicates with the pointer 4 to detect a touch by the tip or bottom of the pointer 4 to the display 3. In addition to or in alternative to detecting a touch by the tip or bottom of the pointer 4, the electronic pen controller 116 can also detect a touch by another part of the pointer 4, such as a part held by a user.

The electronic whiteboard further includes a bus line 120, such as an address bus or a data bus, which electrically connects the CPU 101, the ROM 102, the RAM 103, the network controller 105, the external memory controller 106, the capturing device 111, the GPU 112, the sensor controller 114, and the electronic pen controller 116, as illustrated in FIG. 7.

<Functions>

Figure 8:
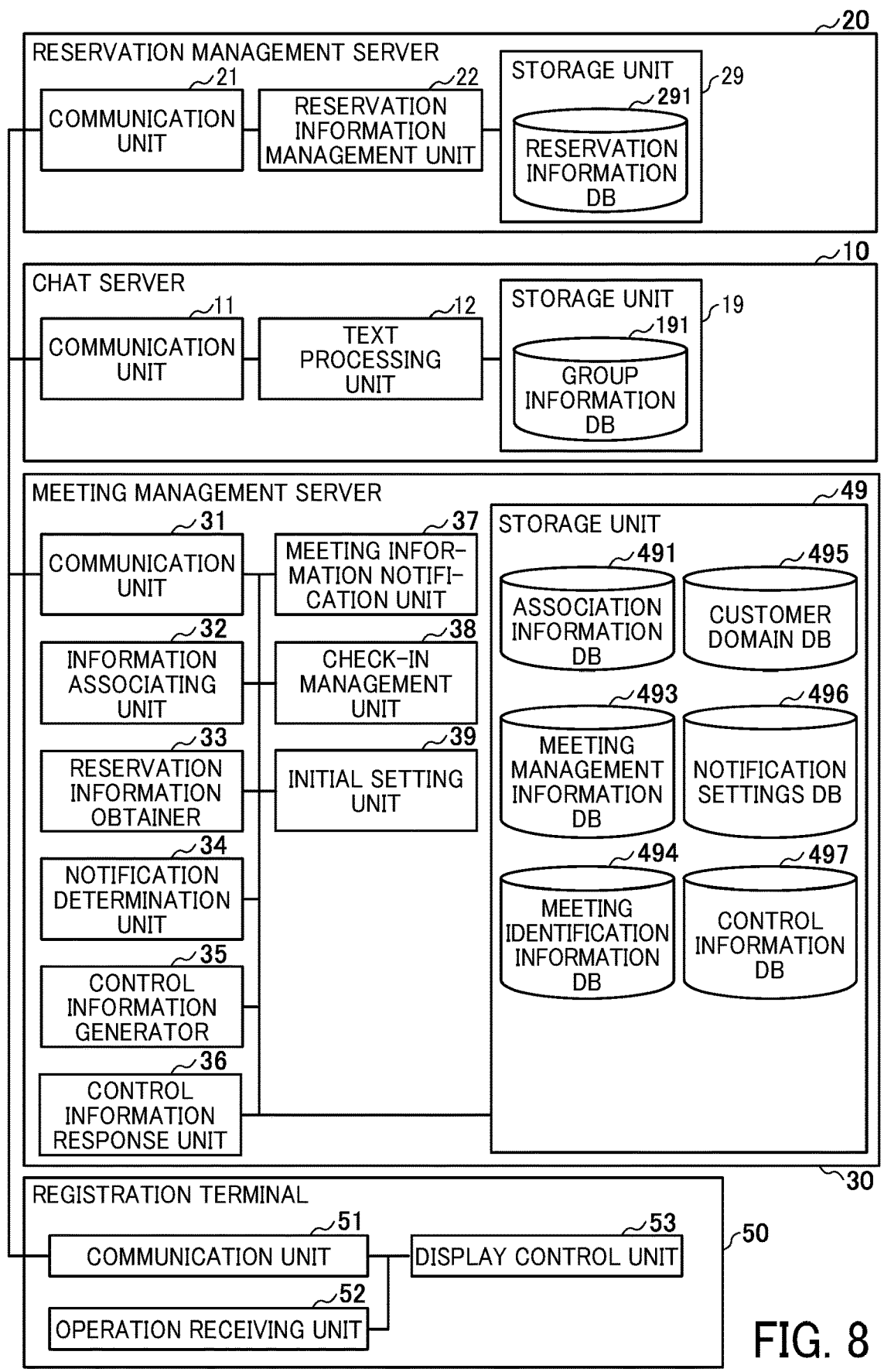
FIG. 8 is a block diagram illustrating functional configurations of a reservation management server, a chat server, the meeting management server, and a registration terminal, according to an embodiment of the present disclosure.

FIG. 8 is a block diagram illustrating functional configurations of the reservation management server 20, the chat server 10, the meeting management server 30, and the registration terminal 50.

<<Reservation Management Server 20>>

The reservation management server 20 includes a communication unit 21 and a reservation information management unit 22. These functions of the reservation management server 20 are functions that are implemented by operating one or more hardware elements illustrated in FIG. 5 in cooperation with instructions of the CPU 201 according to the program 209p expanded from the HDD 209 to the memory 202.

The communication unit 21 transmits and receives various kinds of information to and from the meeting management server 30. In the present embodiment, the communication unit 21 receives a request for reservation information from the meeting management server 30. Further, the communication unit 21 transmits the reservation information to the meeting management server 30. The communication unit 21 is implemented by the CPU 201 of FIG. 5 executing the program 209p to control the network driver 205.

Figure 10:
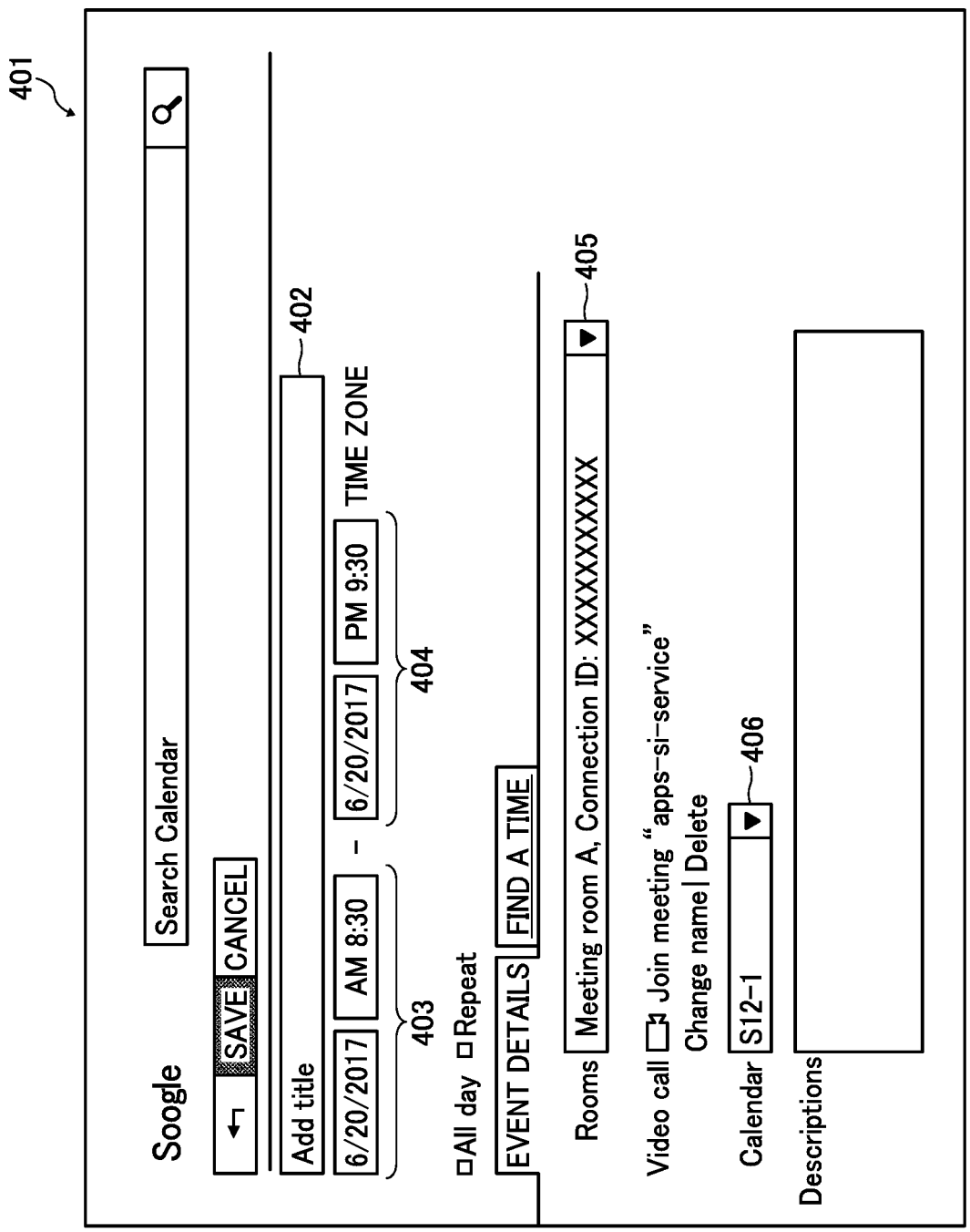
FIG. 10 illustrates an example of a meeting room reservation screen, which is provided by the reservation management server and displayed at the terminal apparatus, according to an embodiment of the present disclosure.

The reservation information management unit 22 manages reservation information registered by a user. The reservation information management unit 22 reads out the reservation information of a meeting room requested from the meeting management server 30 from a reservation information database (DB) 291. Further, the reservation information management unit 22 transmits the reservation information that is read out from the reservation information DB 291 to the meeting management server 30. A general-purpose web application can be used to enable an expected participant to register a reservation for a meeting room in the reservation management server 20. FIG. 10 is an illustration of an example of a screen displayed on the terminal apparatus 60 of the expected participant by the web application.

The reservation information management unit 22 is implemented by the CPU 201 of FIG. 5 executing the program 209p.

The reservation management server 20 further includes a storage unit 29. The storage unit 29 is implemented by, for example, the memory 202 and the HDD 209 of FIG. 5. The storage unit 29 stores the reservation information DB 291.

TABLE 1

| Reservation ID | Account of Reservation-Making Participant | Meeting Name | Meeting Room ID | Start Time | End Time | Expected Participant Account |
|---|---|---|---|---|---|---|
| 001 | a@xfood.com | Product Z Development Meeting | K-001 | 2017/ 07/07 10:00 | 2017/ 07/07 12:00 | b@xfood.com c@xfood.com d@xfood.com |
| 002 | e@xfood.com | Product Y Development Meeting | K-001 | 2017/ 07/07 13:00 | 2017/ 07/07 14:00 | f@xfood.com g@xfood.com |
| ... | ... | ... | ... | ... | ... | ... |

Table 1 illustrates an example data structure of reservation information stored in the reservation information DB 291. The reservation information is information for managing a reservation state of a meeting room. The reservation information includes, for each of reservation IDs, an account of a reservation-making participant, a meeting name, a meeting room ID, a start time of the meeting, an end time of the meeting, and accounts of expected participants in association with the reservation ID. The reservation ID is identification information for identifying one record of the reservation information. The reservation information is an example of the reservation identification information. ID is an abbreviation for "identification," and means an identifier or identification information. ID is any one of a name, a symbol, a character string, a numerical value, or a combination of at least two of these items, which is used to uniquely identifying a specific object from among a plurality of objects. The same applies to other IDs than the reservation ID. The account of the reservation-making participant is an account of an expected participant who made a reservation for the meeting room. The meeting name is a name of a meeting, which is given by the expected participant arbitrarily. The meeting room ID is identification information for identifying a meeting room that resides on the intra-company network N1. The meeting management server 30 assigns the meeting room ID. The start time is the beginning of a time slot during which the meeting room is reserved. In other words, the start time is a time when the meeting is to be started. The end time is the end of the time slot during which the meeting room is reserved. In other words, the end time is a time when the meeting is to be ended. The accounts of expected participants are accounts of expected participants who are scheduled to attend the meeting. Each of the accounts in Table 1 is issued by the reservation management server 20.

<<Chat Server 10>>

The chat server 10 includes a communication unit 11 and a text processing unit 12. These functions of the chat server 10 are functions that are implemented by operating one or more hardware elements illustrated in FIG. 5 in cooperation with instructions of the CPU 201 according to the program 209p expanded from the HDD 209 to the memory 202.

The communication unit 11 transmits and receives various kinds of information to and from the meeting management server 30. In the present embodiment, the communication unit 11 receives, from the meeting management server 30, information about reservation of a meeting room, information for identifying the notification robot, and information for specifying a group as a destination to which a notification is to be sent. This information for identifying the notification robot is notified in advance as identification information of the notification robot from the chat server 10, when generating the notification robot of the meeting management server 30. Further, the communication unit 11 transmits, to the meeting management server 30, information indicating that an expected participant has read the information about the reservation of the meeting room or a response made by an expected participant to the displayed information about the reservation of the meeting room. The communication unit 11 is implemented by the CPU 201 of FIG. 5 executing the program 209p to control the network driver 205.

The text processing unit 12 identifies a group to which a notification is to be sent from among groups listed in group information stored in a group information DB 191 of Table 2, based on the information transmitted from the meeting management server 30, i.e., the information identifying the notification robot and the information for identifying the group as a destination to which the notification is to be sent. Further, the text processing unit 12 transmits, as the notification robot, the information about the reservation of the meeting room to expected participants belonging to the identified group. Accordingly, the number of notifications transmitted by the text processing unit 12 is equal to the number of the expected participants. The text processing unit 12 is configured to send a so-called "push notification". An example of a mechanism implementing the push notification is as follows. The chat application 60a receives an ID (token) for a push notification from a server operated by a manufacturer of an OS. This server associates the token with a device (terminal apparatus 60). The chat application 60a registers the token and an account of the chat application 60a in the chat server 10. Since the chat server 10 identifies an account of the chat application 60a when sending a push notification, the token associated with the account is identified. The chat system designates the token and transmits a notification content to the server operated by the manufacturer of the OS. This server sends a push notification to a device (terminal apparatus 60) associated with this token.

The chat server 10 further includes a storage unit 19. The storage unit 19 is implemented by, for example, the memory 202 and the HDD 209 of FIG. 5. The storage unit 19 stores the group information DB 191.

a team for Company A), and the team has a plurality of groups according to purposes or the like (e.g., a group for product A, a group for product B). Any one or more members (including all members) belonging to the team belong to the group. Accordingly, the notification destination is identified by the team ID and the group name. However, the notification destination is identified in different ways depending on what chat system is used for notification. Accordingly, if there is any identification information based on which a group is uniquely identified, such information can be used to identify the notification destination. In another example, three or more items of information can be used for identifying a group as the notification destination.

The group name is a unique name assigned to a group, of which members share text by the chat system. The member accounts 1 to n are accounts of members belonging to the group. Each of these accounts is issued by the chat server 10. In the present embodiment, the notification robot is registered as a member for notifying other members belonging to the same group of information about the reservation of a meeting room. In other words, the notification robot is a kind of a proxy of the meeting management server 30 or a fictitious member. A comment (text) by the notification robot is transmitted to the terminal apparatus 60 of each of the member accounts 1 to n.

<<Meeting Management Server 30>>

The meeting management server 30 includes a communication unit 31, an information associating unit 32, a reservation information obtainer 33, a notification determination unit 34, a control information generator 35, a control information response unit 36, a meeting information notification unit 37, a check-in management unit 38, and an initial setting unit 39. These functions of the meeting management server 30 are functions that are implemented by operating one or more hardware elements illustrated in FIG. 5 in cooperation with instructions of the CPU 201 according to the program 209p expanded from the HDD 209 to the memory 202. The program 209p can be distributed from a server for program distribution. Alternatively, the program 209p can be distributed on a storage medium.

The communication unit 31 transmits and receives various kinds of information to and from the reservation management server 20, the chat server 10, the registration terminal 50, and the terminal apparatus 60. In the present embodiment, the communication unit 31 receives the reservation information from the reservation management server

TABLE 2

| Team ID | Group Name | Member Account 1 | Member Account 2 | Member Account 3 | Member Account 4 | Notification Robot Account |
|---------|------------|------------------|------------------|------------------|------------------|----------------------------|
| project-z | @a | a@chat.com | b@chat.com | c@chat.com | d@chat.com | robo@chat.com |
| project-z | @z-1team | b@chat.com | d@chat.com | | | |
| project-y | @group1 | f@chat.com | g@chat.com | h@chat.com | | robo@chat.com |
| . . . | . . . | . . . | . . . | . . . | . . . | . . . |

Table 2 illustrates an example data structure of the group information stored in the group information DB 191. The group information is information in which accounts of members belonging to the same group are registered. In the group information, a group name, member accounts 1 to n (n=4 in Table 2), and a notification robot account are registered in association with a team ID.

The team ID is an ID for identifying a team. In the present embodiment, a plurality of members belong to a team (e.g., 20. Further, the communication unit 31 transmits the information about the reservation of a meeting room to the chat server 10. Furthermore, the communication unit 31 receives a group in which the notification robot is to be registered from the registration terminal 50. Furthermore, the communication unit 31 receives a request for associating the group of the chat system with the account of the reservation management server 20 from the terminal apparatus 60. In addition, the communication unit 31 also communicates with the meeting room terminal 90. The communication unit 31 is implemented by the CPU 201 of FIG. 5 executing the program 209p to control the network driver 205.

The information associating unit 32 mainly performs processing relating to the preliminary registration process. Specifically, the information associating unit 32 receives a request for registering a domain from the registration terminal 50, and registers the domain in a customer domain DB 495. Further, the information associating unit 32 stores the group name of the chat system transmitted from the terminal apparatus 60 in association with the account of the reservation management server 20 in an association information DB 491. A detailed description of this process is provided below. The information associating unit 32 is implemented by the CPU 201 of FIG. 5 executing the program 209p.

The reservation information obtainer 33 designates an account of a customer who uses the resource reservation system 100 to obtain the reservation information from the reservation management server 20. The reservation information obtainer 33 registers the obtained reservation information in the reservation information DB 291. More specifically, the reservation information obtainer 33 obtains the reservation information for a predetermined period in the future from the current time among the reservation information stored in the reservation management server 20. The predetermined period is determined depending on how long a period ahead is set to future meetings for which the information about the reservation of the meeting room is to be notified. The reservation information obtainer 33 is implemented by the CPU 201 of FIG. 5 executing the program 209p.

The notification determination unit 34 determines whether the obtained reservation information includes a reservation whose start time satisfies a condition for notification. For example, the notification determination unit 34 refers to a notification settings DB 496 to determine whether the current time matches a date and time obtained by subtracting a period set in the notification settings DB 496 from the start time of the reservation. When the current time matches the obtained date and time by this subtraction, the notification determination unit 34 determines that a notification is to be sent. For example, when there are a plurality of notification robots according to different roles, such as the notification robot for sending a reminder or the notification robot for receiving a reservation, the notification determination unit 34 determines a suitable notification robot according to processing to be performed. The notification determination unit 34 is implemented by the CPU 201 of FIG. 5 executing the program 209p.

When the notification determination unit 34 determines that the notification is to be sent, the meeting information notification unit 37 designates information identifying the notification robot and information identifying the group as the notification destination, to request the chat server 10 to transmit a notification of the information about the reservation of the meeting room. It should be noted that the notification is performed several times, and the meeting identification information is included in at least one of the notifications. The meeting identification information is information based on which the meeting management server 30 confirms whether the expected participant has a right to use the reserved meeting room during the reserved time slot. The meeting information notification unit 37 generates the meeting identification information by the final notification at the latest. The meeting identification information is registered in a meeting identification information DB 494. The meeting information notification unit 37 is implemented by the CPU 201 of FIG. 5 executing the program 209p.

The control information generator 35 refers to the reservation information to generate control information for the electronic device 70, and registers the generated control information in a control information DB 497. For example, the control information generator 35 generates control information for turning on the power of the electronic device 70 several minutes before the start time of the meeting. Further, the control information generator 35 generates control information for turning off the power of the electronic device 70 in response to detection of the check-out. The control information is stored in the control information DB 497. The control information generator 35 is implemented by the CPU 201 of FIG. 5 executing the program 209p.

In response to receiving an inquiry from the meeting room terminal 90 provided in a meeting room as to whether there is control information, the control information response unit 36 refers to the control information DB 497 to transmit the control information corresponding to the meeting room to the meeting room terminal 90. The control information response unit 36 is implemented by the CPU 201 of FIG. 5 executing the program 209p.

The check-in management unit 38 communicates with the meeting room terminal 90 to determine whether check-in is permitted or not. Further, the check-in management unit 38 registers a status of a meeting in the meeting management information DB 493. The check-in is permitted when a pair of the meeting room ID and the meeting identification information is registered in the meeting identification information DB 494 and it is 5 to 10 minutes before the start time of the meeting identified by the reservation ID. The check-in management unit 38 is implemented by the CPU 201 of FIG. 5 executing the program 209p.

The initial setting unit 39 performs processing of configuring initial settings of the meeting room terminal 90. For example, the initial setting unit 39 provides a list of meeting rooms to the registration terminal 50 of the administrator of the resource reservation system 100, and specifies the meeting room ID and the meeting room name of the meeting room selected by the administrator of the resource reservation system 100. Further, the initial setting unit 39 transmits a uniform resource locator (URL) of the meeting management server 30 to the registration terminal 50. The URL is an example of address information of the meeting management server 30. The initial setting unit 39 is implemented by the CPU 201 of FIG. 5 executing the program 209p.

The meeting management server 30 further includes a storage unit 49. The storage unit 49 is implemented by, for example, the memory 202 and the HDD 209 of FIG. 5. The storage unit 49 stores the association information DB 491, the meeting management information DB 493, the meeting identification information DB 494, the customer domain DB 495, the notification settings DB 496, and the control information DB 497.

TABLE 3

| Group Name | Team ID | Member Account 1 | Member Account 2 | Member Account 3 | Member Account 4 |
|---|---|---|---|---|---|
| @z-all | project-z | a@xfood.com<br>a@chat.com | b@xfood.com<br>b@chat.com | c@xfood.com<br>c@chat.com | d@xfood.com<br>d@chat.com |
| @group1 | project-y | f@xfood.com<br>f@chat.com | g@xfood.com<br>g@chat.com | h@xfood.com<br>h@chat.com | |
| ... | | ... | ... | ... | ... |

Table 3 illustrates an example data structure of association information stored in the association information DB 491. The association information is information associating the account of the reservation management system with the group name of the chat system. The association information includes items of the group name, the team ID and the member accounts 1 to n (n=4 in Table 3). The group name is a group name of the chat system. In the member accounts 1 to n, the accounts of expected participants issued by the reservation management server 20 are registered. In addition of the accounts issued by the reservation management server 20, the accounts of the chat system can be registered in the association information, as indicated in Table 3. To send a notification to the group, the information identifying the account, issued by the reservation management server 20, of the user who made a reservation of a meeting to the reservation management server 20 and information identifying the group and the channel of the notification destination (in this embodiment, the team ID and the group (channel) name) will suffice. In other words, the accounts of all the members belonging to the group are not necessarily registered in the association information. However, the account information of the chat system of each individual user is required when sending a notification to the individual user. Accordingly, the account of the user of the chat system can also be registered in the association information, as indicated in Table 3.

TABLE 4

| Reservation ID | Account of Reservation-Making Participant | Meeting Name | Meeting Room ID | Start Time | End Time | Expected Participant Account | Status |
|---|---|---|---|---|---|---|---|
| 001 | a@xfood.com | Product Z Development Meeting | K-001 | 2017/07/07 10:00 | 2017/07/07 12:00 | b@xfood.com<br>c@xfood.com<br>d@xfood.com | Check-in has been performed |
| 002 | e@xfood.com | Product Y Development Meeting | K-001 | 2017/07/07 13:00 | 2017/07/07 14:00 | f@xfood.com<br>g@xfood.com | Notification has been sent |
| ... | ... | ... | ... | ... | ... | ... | |

Table 4 illustrates an example data structure of the reservation information stored in the meeting management information DB 493 of the meeting management server 30. A description is given hereinafter of differences between the reservation information of Table 4 stored in the meeting management information DB 493 and that of Table 1 stored in the reservation information DB 291. The reservation information of Table 4 includes an item of a status. The status indicates the status of a reservation. For example, the status registered in the reservation information of Table 4 indicates whether a notification of the information about the reservation of the meeting room has been sent, whether the use of the meeting room has been confirmed, whether the check-in operation has been performed, whether the checkout operation has been performed, or whether the reservation has been cancelled.

TABLE 5

| Reservation ID | Meeting Room ID | Meeting Identification Information |
|---|---|---|
| 001 | K-001 | 1234 |
| 002 | K-002 | 5678 |
| ... | ... | ... |

Table 5 illustrates an example data structure of meeting identification information management information stored in the meeting identification information DB 494. The meeting identification information management information is information for managing the meeting identification information for each reservation of a meeting room. The meeting identification information management information includes items of the reservation ID, the meeting room ID, and the meeting identification information. The reservation ID, the meeting room ID, and the meeting identification information of Table 4 are the same or substantially the same as those described above. Accordingly, the redundant description thereof is omitted. It should be noted that the reservation ID is registered in order to identify the reservation of the same meeting room.

TABLE 6

| Customer Domain Name | Account of Administrator of Customer |
|---|---|
| xfood.com | a@xfood.com |
| ycar.com | f@xfood.com |
| ... | ... |

Table 6 illustrates an example data structure of customer domain information stored in the customer domain DB 495. The customer domain information is information for managing a customer's domain and an account of an administrator of the customer. The customer domain information stores a domain name of a customer with an administrator's account. The domain of the customer in Table 6 is the domain of the account (email address) issued by the reservation management server 20. The administrator's account is an account of an administrator (representative) of the customer. The reservation management server 20 issues the accounts in Table 6.

TABLE 7

| Customer Domain Name | Notification Setting |
|---|---|
| xfood.com | 1 day before |
| ycar.com | 12 hours before |
| ... | ... |

Table 7 illustrates an example data structure of notification setting information stored in the notification settings DB 496. The notification setting information includes, for each of the customers, settings related to a notification. The notification setting information stores the domain name of the customer in association with a notification setting. The notification setting indicates a timing at which the information about the reservation of the meeting room is notified. In this example, the timing defines how long ahead the start time of the meeting the notification of the information about the reservation of the meeting room is to be sent. In another example, a fixed date and time can be set to the notification setting. Further, the number of the timings set in the notification setting is not necessarily one. In another example, a plurality of notification settings can be set in association with one customer.

TABLE 8

| Meeting Room ID | Control Content |
|---|---|
| K-001 | Power On |
| K-002 | Power Off |
| ... | ... |

Table 8 illustrates an example data structure of control information stored in the control information DB 497. The control information is information for controlling the electronic device 70 provided in the meeting room. The control information includes items of the meeting room ID and a control content. The control content indicates a specific control operation of the electronic device 70. The meeting management server 30 can set a detailed control content for each electronic device 70. This control information does not include information indicating a time at which the electronic device 70 is to be controlled. This is because it is difficult for the meeting management server 30 to access the meeting room terminal 90, since the meeting management server 30 resides on the external network N2. Accordingly, the meeting room terminal 90 accesses the meeting management server 30. The meeting management server 30 transmits the control content, when the control information has already been generated when being accessed from the meeting room terminal 90.

<<Registration Terminal 50>>

The registration terminal 50 includes a communication unit 51, an operation receiving unit 52, and a display control unit 53. These functions of the registration terminal 50 are functions that are implemented by operating one or more hardware elements illustrated in FIG. 5 in cooperation with instructions of the CPU 201 according to the program 209p expanded from the HDD 209 to the memory 202. The program 209p can be distributed from a server for program distribution. Alternatively, the program 209p can be distributed on a storage medium.

The functions of the communication unit 51, the operation receiving unit 52, and the display control unit 53 are the same or substantially the same as those of the terminal apparatus 60. A detailed description thereof will be given below, with reference to the description of the terminal apparatus 60.

<<Terminal Apparatus 60>>

Figure 9A:
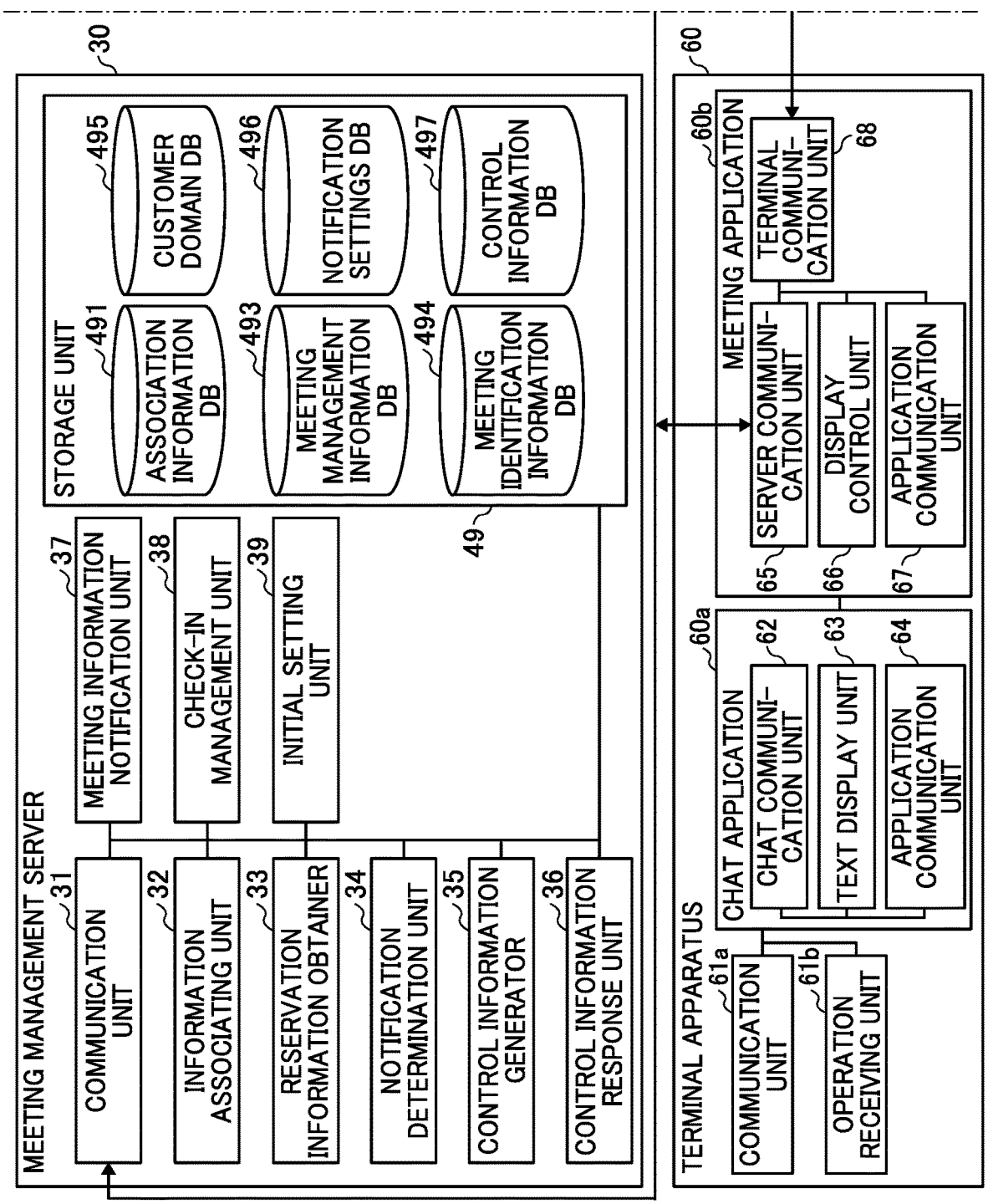
FIGS. 9A and 9B are block diagrams illustrating functional configurations of a terminal apparatus, a meeting room terminal, and an electronic device, according to an embodiment of the present disclosure.
Figure 9B:
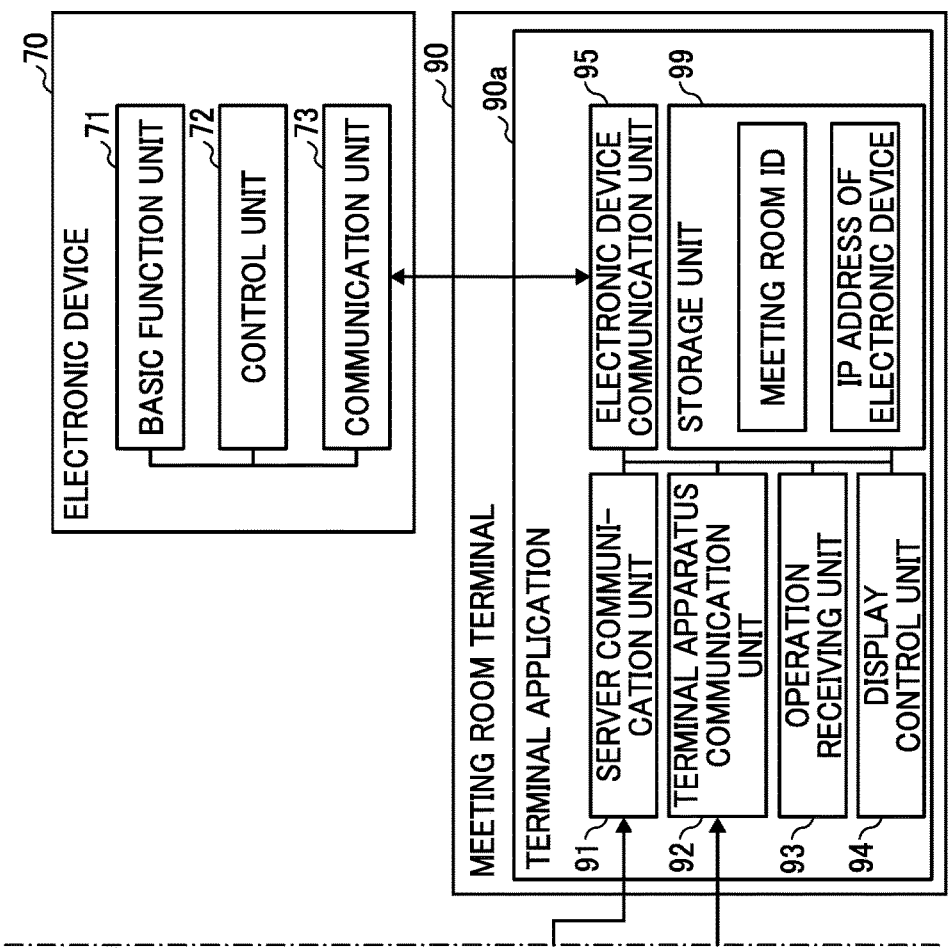

FIGS. 9A and 9B are a block diagram illustrating functional configurations of the terminal apparatus 60, the meeting room terminal 90, and the electronic device 70. The function configuration of the meeting management server 30 illustrated in FIG. 8 is also illustrated in FIGS. 9A and 9B, for the sake of explanatory convenience.

The terminal apparatus 60 includes a communication unit 61a, an operation receiving unit 61b, a chat communication unit 62, a text display unit 63, an application communication unit 64, a server communication unit 65, a display control unit 66, an application communication unit 67, and a terminal communication unit 68. These functions of the terminal apparatus 60 are functions that are implemented by operating one or more hardware elements illustrated in FIG. 5 in cooperation with instructions of the CPU 201 according to the program 209p expanded from the HDD 209 to the memory 202. The program 209p can be distributed from a server for program distribution. Alternatively, the program 209p can be distributed on a storage medium. Since the chat application 60a and the meeting application 60b operate on the terminal apparatus 60, the program 209p includes the chat application 60a and the meeting application 60b.

The communication unit 61a transmits and receives various kinds of information to and from the meeting management server 30. The communication unit 61a is implemented by the CPU 201 of FIG. 5 executing the program 209p to control the network driver 205.

The operation receiving unit 61b receives various operations input by an expected participant to the terminal apparatus 60. The operation receiving unit 61b is implemented by the CPU 201 of FIG. 5 executing the program 209p to control the input device 210.

The chat communication unit 62 of the chat application 60a transmits and receives various kinds of information to and from the chat server 10. In the present embodiment, the chat communication unit 62 receives information about the reservation of the meeting room from the chat server 10. Further, the chat communication unit 62 notifies the chat server 10 whether the meeting room is to be used or canceled. The chat communication unit 62 is implemented by the CPU 201 of FIG. 5 executing the program 209p to control the network driver 205.

The text display unit 63 of the chat application 60a displays text (the information about the reservation of the meeting room) transmitted from the chat server 10. For example, the text display unit 63 displays text as if a source from which a comment is entered is the notification robot and the notification robot inputs the text. The text display unit 63 is implemented by the CPU 201 of FIG. 5 executing the chat application 60a.

The application communication unit 64 of the chat application 60a calls the meeting application 60b and transmits the meeting identification information to the meeting application 60b. The chat server 10 transmits the information identifying the meeting application 60b to the terminal apparatus 60, when notifying the terminal apparatus 60 of the information about the reservation of the meeting room. Accordingly, the chat application 60a designates the meeting application 60b to the OS and requests notification of the meeting identification information. The OS activates the meeting application 60b. The application communication unit 64 is implemented by the CPU 201 of FIG. 5 executing the chat application 60a.

The server communication unit 65 of the meeting application 60b communicates with the meeting management server 30. In the present embodiment, the server communication unit 65 obtains a two-dimensional code including the meeting identification information from the meeting management server 30. The server communication unit 65 is implemented by the CPU 201 of FIG. 5 executing the meeting application 60b.

The display control unit 66 of the meeting application 60b displays the two-dimensional code transmitted from the meeting management server 30 on the LCD 206. The display control unit 66 is implemented by the CPU 201 of FIG. 5 executing the meeting application 60b to control the graphics driver 204.

The application communication unit 67 of the meeting application 60b obtains various kinds of information from the chat application 60a via the OS. Examples of the various kinds of information obtained from the chat application 60a include the meeting identification information included in the information about the reservation of the meeting room. The application communication unit 67 is implemented by the CPU 201 of FIG. 5 executing the meeting application 60b.

The terminal communication unit 68 communicates with the meeting room terminal 90 to transmit the meeting identification information, etc. The terminal communication unit 68 detects the meeting room terminal 90 using a short-range wireless communication network such as Bluetooth (registered trademark). In response to detecting the meeting room terminal 90, the terminal communication unit 68 transmits the meeting identification information to the detected meeting room terminal 90. Further, the terminal communication unit 68 provides a function of displaying the two-dimensional code to the meeting room terminal 90. The terminal communication unit 68 is implemented by the CPU 201 of FIG. 5 executing the meeting application 60b.

<<Meeting Room Terminal 90>>

The meeting room terminal 90 includes a server communication unit 91, a terminal apparatus communication unit 92, an operation receiving unit 93, a display control unit 94, and an electronic device communication unit 95. These functions of the meeting room terminal 90 are functions that are implemented by operating one or more hardware elements illustrated in FIG. 6 in cooperation with instructions of the CPU 601 according to the program 604p expanded from the EEPROM 604 to the RAM 603. The program 604p can be distributed from a server for program distribution. Alternatively, the program 604p can be distributed on a storage medium.

The server communication unit 91 communicates with the meeting management server 30. Since the meeting room terminal 90 resides on the intra-company network N1, accessing from the meeting management server 30 to the meeting room terminal 90 is difficult. Therefore, the server communication unit 91 polls the meeting management server 30 to periodically communicate with the meeting management server 30. In addition to or in alternative to the polling, the server communication unit 91 communicates with the meeting management server 30 using a communication technology such as WebSocket. In the present embodiment, the server communication unit 91 transmits, to the meeting management server 30, the meeting identification information or the meeting room ID received by the terminal apparatus communication unit 92 from the terminal apparatus 60. Further, the server communication unit 91 receives the current time and the reservation information for the meeting room of the current day. Furthermore, the server communication unit 91 receives the control information from the meeting management server 30. The server communication unit 91 is implemented by the CPU 601 of FIG. 6 executing the program 604p to control the wireless LAN communication device 613.

The terminal apparatus communication unit 92 communicates with the terminal apparatus 60. In the present embodiment, the terminal apparatus communication unit 92 receives the meeting identification information, etc. The terminal apparatus communication unit 92 is implemented by the CPU 601 of FIG. 6 executing the program 604p to the short-range wireless communication device 615 or the RF tag reader/writer 622.

The electronic device communication unit 95 communicates with the electronic device 70. In this embodiment, the electronic device communication unit 95 transmits, to the electronic device 70, the control information received by the server communication unit 91. The electronic device communication unit 95 is implemented by the CPU 601 of FIG. 6 executing the program 604p to control the wireless LAN communication device 613.

The display control unit 94 displays a screen generated by the terminal application 90a on the display 616. On this screen, menus such as the check-in or the check-out are displayed. The display control unit 94 is implemented by the CPU 601 of FIG. 6 executing the program 604p to control the display 616.

The operation receiving unit 93 receives various operations input to the meeting room terminal 90. The operation receiving unit 93 is implemented by the CPU 601 of FIG. 6 executing the program 604p to control the touch panel 617.

The meeting room terminal 90 further includes a storage unit 99. The storage unit 99 is implemented by, for example, the ROM 602 and the EEPROM 604 of FIG. 6. In the storage unit 99, the meeting room ID and an IP address of the electronic device 70 are stored.

<<Electronic Device 70>>

The electronic device 70 includes a basic function unit 71, a control unit 72, and a communication unit 73. These functions of the electronic device 70 are functions that are implemented by operating one or more hardware elements illustrated in FIG. 7 in cooperation with instructions of the CPU 101 according to the program 104p expanded from the SSD 104 to the RAM 103. The program 104p can be distributed from a server for program distribution. Alternatively, the program 104p can be distributed on a storage medium.

The communication unit 73 communicates with the meeting room terminal 90. In the present embodiment, the communication unit 73 receives the control information. The communication unit 73 is implemented by the CPU 101 of FIG. 7 executing the program 104p to control the network controller 105.

The control unit 72 controls entire operation of the electronic device 70. In the present embodiment, the control unit 72 turns on or off the power of the electronic device 70 according to the control information. The control unit 72 is implemented by the CPU 101 of FIG. 7 executing the program 104p.

The basic function unit 71 provides basic functions of the electronic device 70. For example, the basic function unit 71 displays a stroke drawn by hand by a user, or displays an image or video on the display 3 in accordance with image or video data input from the PC 8. The basic function unit 71 is implemented by the CPU 101 of FIG. 7 executing the program 104p to one or more hardware elements of FIG. 7.

<Reservation of Meeting Room>

A description is given hereinafter of reservation of a meeting room, with reference to FIG. 10. FIG. 10 illustrates an example of a meeting room reservation screen 401, which is provided by the reservation management server 20 and displayed by the terminal apparatus 60. The reservation screen 401 includes a meeting name entry field 402, a start time entry field 403, an end time entry field 404, and a meeting room entry field 405. An expected participant logs in to the reservation management server 20 using the account issued by the reservation management server 20 and enters necessary information on the reservation screen 401. The meeting room entry field 405 provides a drop-down list, which displays a list of meeting rooms or meeting room IDs, etc., from which a user may select a desired meeting room name to select the meeting room.

Further, "Connection ID: XXX . . . X" is set in the meeting room entry field 405. The connection ID is an example of connection destination information based on which the electronic device 70 provided at one site to connect to another electronic device 70 provided at a different site. The connection ID corresponds to a telephone number of a telephone. In other words, the connection ID is information for connecting one electronic device 70 at one site and another electronic device 70 at a different site. The connection destination information is information for identifying a remote meeting apparatus as a connection destination. Two or more remote meeting apparatuses connect with each other using the connection destination information. The connection destination information can be any information that can identify a connection destination. Examples of the connection destination information include identification information of the remote meeting apparatus itself, identification information identifying the remote meeting apparatus on a network such as an IP address, and identification information associated with a user who uses the remote meeting apparatus, such as a user ID.

The expected participant sets, on the reservation screen 401 on which he/she is making a reservation for one meeting room, the connection ID of the electronic device 70 provided at the other meeting room as a connection destination. It will suffice that either one of the electronic devices 70 connects to the other electronic device 70 as the connection destination. Accordingly, on the reservation screen 401 for reserving the other meeting room, the connection ID of the electronic device 70 provided at the one meeting room does not need to be set. In another example, the connection ID can be set on each of the reservation screens 401 for reserving each of the one meeting room and the other meeting room where a remote meeting is to be held.

Further, on the reservation screen 401, a calendar selection field 406 is displayed. The calendar selection field 406 is a field in which a user selects a calendar shared by the group. This enables the user to select a suitable calendar to be used.

<Example of Screen for Preliminary Registration Process>

A description is given of an example of a screen on which an administrator of the resource reservation system 100 or an expected participant enters information in the preliminary registration process, which is described above with reference to FIG. 1.

Figure 11:
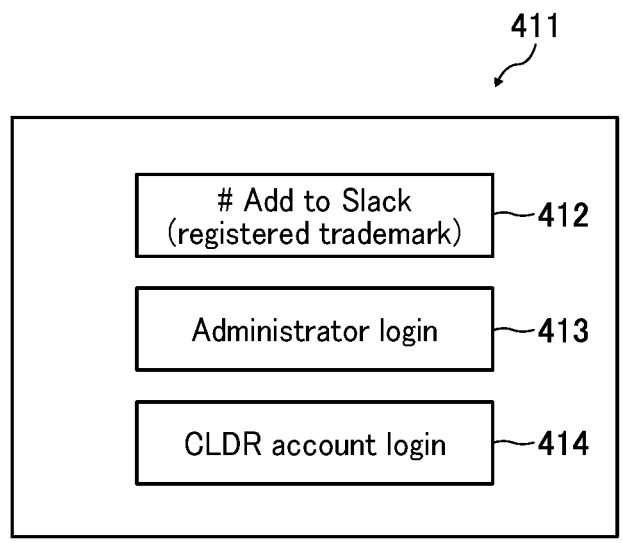
FIG. 11 illustrates an example of a registration operation initial screen displayed at the registration terminal or the terminal apparatus, according to an embodiment of the present disclosure.

FIG. 11 illustrates an example of a registration operation initial screen 411 displayed on the registration terminal 50 or the terminal apparatus 60. The registration operation initial screen 411 is, for example, a web page provided by the meeting management server 30. The registration operation initial screen 411 includes a notification robot add button 412, an administrator login button 413, and a reservation management server login button 414. In response to pressing of the notification robot add button 412, the registration operation initial screen 411 transitions to notification robot registration screens 421-1, 421-2, 421-3 and 421-4, as illustrated in FIGS. 12A to 12D. In response to pressing of the administrator login button 413, the registration operation initial screen 411 transitions to domain management screens 431-1 and 431-2, as illustrated in FIG. 13A to 13C. In response to pressing of the reservation management server login button 414, the registration operation initial screen 411 transitions to account association screens 441-1, 441-2, 441-3 and 441-4, as illustrated in FIG. 14A to 14D.

FIGS. 12A to 12D illustrate examples of the notification robot registration screens 421-1, 421-2, 421-3 and 421-4, each being displayed at the registration terminal 50. Each of the notification robot registration screens 421-1, 421-2, 421-3 and 421-4 is provided by the chat server 10. The notification robot registration screen 421-1 of FIG. 12A includes a team ID entry field 422 for a team ID of the chat system and a Continue button 423. The administrator of the resource reservation system 100 enters the team ID of the team to which the notification robot is to be added in the team ID entry field 422, and then presses the Continue button 423. The group name of the group to which the notification robot is to be added is a group of expected participants who are to attend the meeting.

Figure 12A:
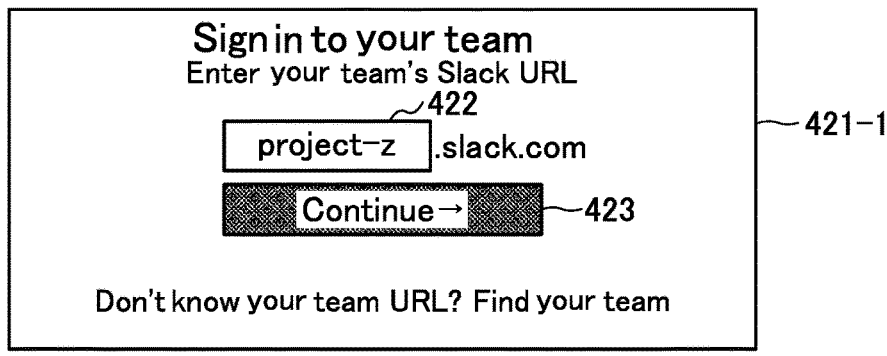
FIGS. 12A to 12D each illustrates an example of a notification robot registration screen displayed at the registration terminal, according to an embodiment of the present disclosure.
Figure 12B:
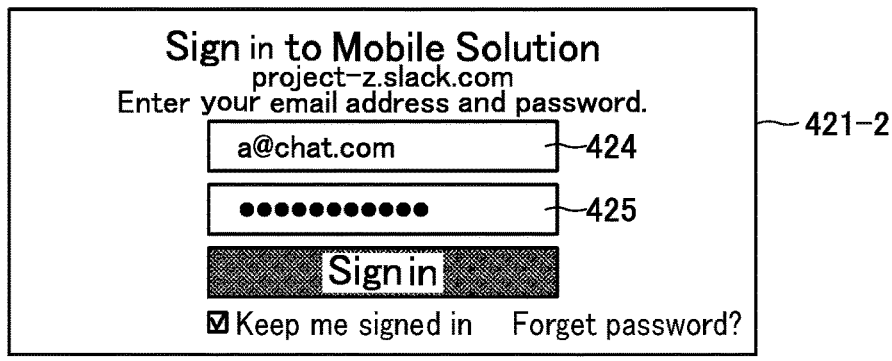

The notification robot registration screen 421-2 of FIG. 12B includes an account entry field 424 and a password entry field 425. The administrator of the resource reservation system 100 enters an account and a password of the member belonging to the team ID, which is entered on the screen of FIG. 12A. Thus, the authority to add the notification robot to the team is authenticated.

Figure 12C:
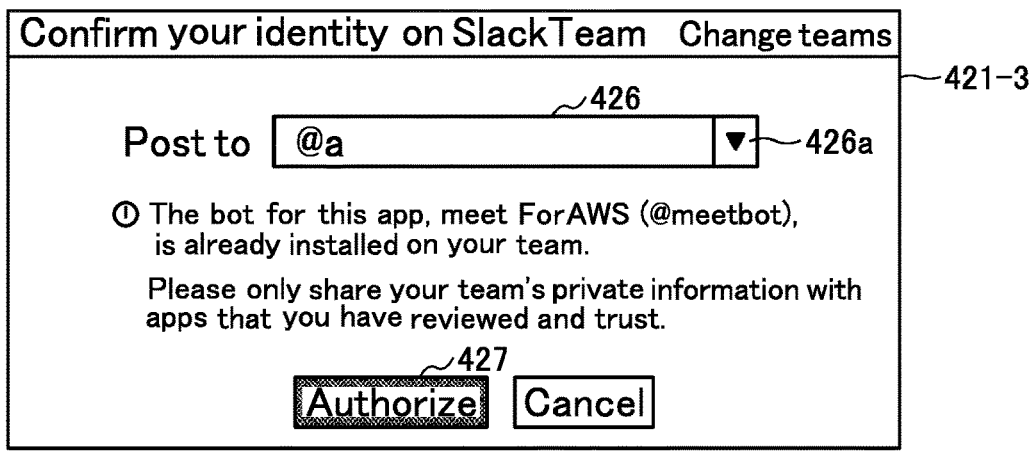

The notification robot registration screen 421-3 of FIG. 12C includes a notification destination account display field 426 that displays a destination account to which the notification robot sends a notification, and an Authorize button 427. In the notification destination account display field 426, a specific account address can be selected as the destination or a group can be selected as the destination. In response to pressing of a drop-down key 426a, the accounts of other members belonging to the group are displayed. In response to pressing of the Authorize button 427, the notification robot is added.

Figure 12D:
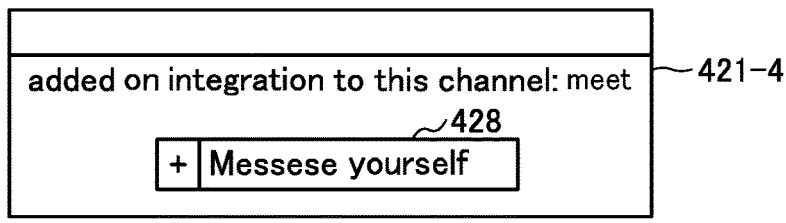

The notification robot registration screen 421-4 of FIG. 12D include a message entry field 428. The message entry field 428 receives, from the administrator of the resource reservation system 100, an entry of test text as a comment by the notification robot. This enables the administrator of the resource reservation system 100 (and each member) to confirm whether the text entered by the notification robot is sent to the members belonging to the group.

FIGS. 13A to 13C illustrates examples of the domain management screens 431-1 and 431-2, displayed at the registration terminal 50. Each of the domain management screens 431-1 and 431-2 is provided by the meeting management server 30. The domain management screens 431-1 and 431-2 are screens that enable the administrator of the resource reservation system 100 to set a domain of a customer that uses the resource reservation system 100. The resource reservation system 100 is used by a customer whose account contains the registered domain. The domain management screen 431-1 of FIG. 13A includes an administrator account entry field 432, a password entry field 433, and a Login button 434. The administrator of the resource reservation system 100 logs in to the meeting management server 30 with the administrator account and password of the resource reservation system 100.

FIGS. 13B and 13C each illustrates an example of the domain management screen 431-2, and FIG. 13C is an enlarged view of FIG. 13B. The domain management screen 431-2 includes a domain name entry field 435, an account entry field 436, and a Register button 437. In the domain name entry field 435, the domain of the customer that uses the reservation management server 20 is entered. In the account entry field 436, the account of the administrator of the customer that uses the reservation management server 20 is entered.

Thus, both the domain and the account of the reservation management server 20 of the customer are registered in the meeting management server 30. The customer logs in to the meeting management server 30 using this account (account issued by the reservation management server 20). The meeting management server 30 logs in to the reservation management server 20 using the registered account, and acquires the reservation information. Further, the meeting management server 30 identifies a reservation-making participant's account containing the registered domain as a target of notification.

On the screen illustrated in FIGS. 13B and 13C, no mark is put in a check box. This indicates that the domain has already been registered. In other words, the administrator of the resource reservation system 100 only needs to put a mark in the check box to register the domain. This prevents the misspelled domain from being entered.

FIGS. 14A to 14D illustrate examples of the account association screen 441-1, 441-2, 441-3 and 441-4, displayed at the terminal apparatus 60. Each of the account association screens 441-1, 441-2, 441-3 and 441-4 is a web page provided by the meeting management server 30. The account association screens 441-1, 441-2, 441-3 and 441-4 are screens for associating the group name of the chat system with the account of the reservation management system. On the account association screen 441-1 of FIG. 14A, a specific user's account of the reservation management system is displayed. This account is an account issued by the reservation management server 20. An expected participant selects the account of the administrator of the company (customer) to which the expected participant him- or herself belongs, and logs in the meeting management server 30.

Figure 14A:
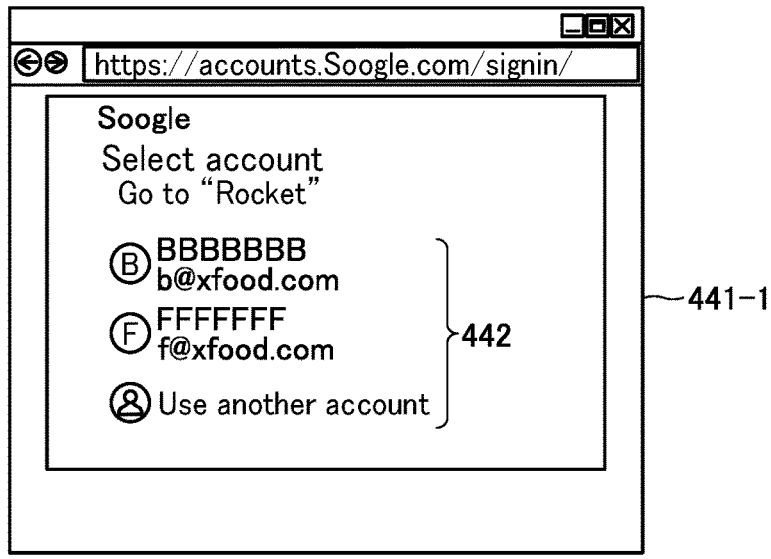
FIGS. 14A to 14D each illustrates an example of an account association screen displayed at the terminal apparatus, according to an embodiment of the present disclosure.
Figure 14B:
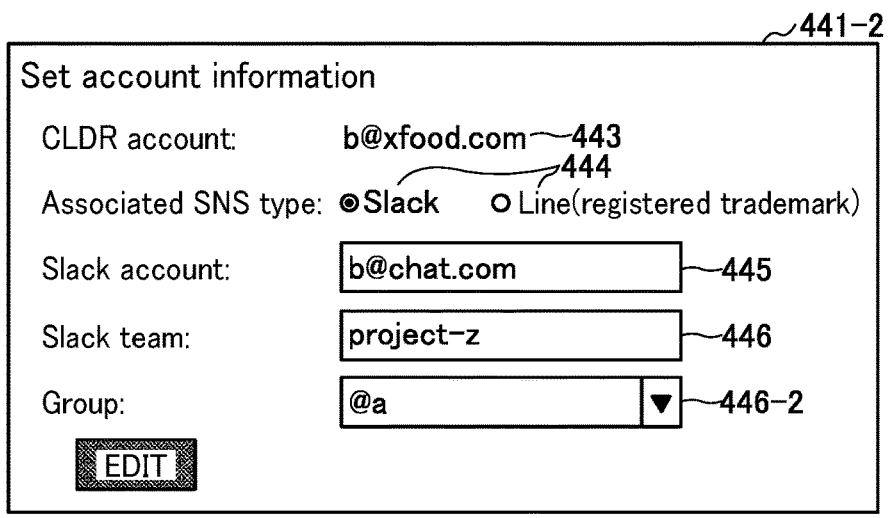

The account association screen 441-2 of FIG. 14B displays an account 443 (an account of the reservation management server 20), which is an account of the administrator of the customer to which the login participant belongs. Further, the account association screen 441-2 includes a chat system selection field 444, an account entry field 445 for entering an account of the chat system, a team ID entry field 446 for entering the team ID of the chat system, and a group name selection field 446-2 for selecting a group name of the chat system. In the chat system selection field 444, an expected participant selects the chat system to which the notification robot has been added. In the account entry field 445, the expected participant enters his or her account of the chat system. In the team ID entry field 446, the expected participant enters the team ID of the chat system to which the notification robot is added. In the group name selection field 446-2, the expected participant enters the group name.

Figure 14C:
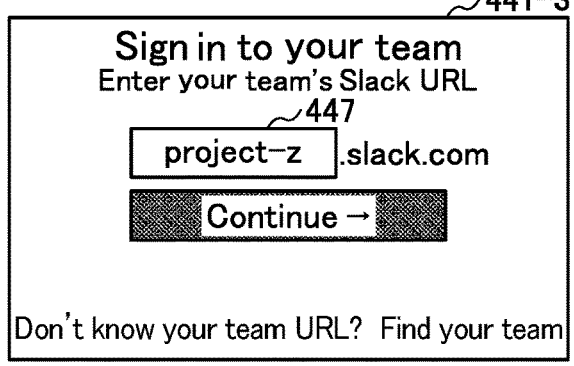
Figure 14D:
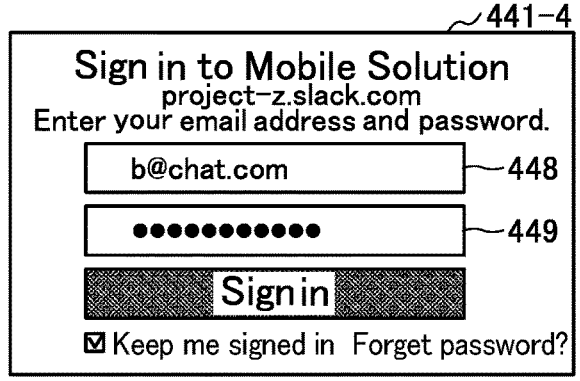

The account association screen 441-3 of FIG. 14C illustrates a group name entry screen for entering the group name of the chat system. Further, the account association screen 441-4 of FIG. 14C illustrates a login screen to the chat system. In substantially the same manner as described with reference to FIGS. 12A and 12B, an expected participant designates the group name in a group name field 447. Further, the expected participant enters the account and the password in an account entry field 448 and a password entry field 449 respectively to log in to the chat system. Thus, the information items entered on the account association screen 441-2 of FIG. 14B are confirmed as being appropriate. When it is confirmed that the information items entered on the screen of FIG. 14B are appropriate, the meeting management server 30 registers the group name and the account of the administrator of the customer in association with each other.

<Sequence of Preliminary Registration Process>

First, a description is given of a token of the notification robot. There should be one notification robot on the meeting management server 30. The meeting management server 30 performs a process of acquiring a token of the notification robot before the meeting management server 30 starts operating.

For example, the chat server 10 generates a notification robot in response to a request to add a notification robot from the meeting management server 30, and assigns a unique token to the notification robot. The communication unit 11 of the chat server 10 transmits the token of the notification robot to the meeting management server 30. The information associating unit 32 of the meeting management server 30 manages the tokens of the notification robot. This enables the meeting management server 30 to transmit a notification as the notification robot.

In addition, this token is information for enabling the meeting management server 30 to transmit a notification as the notification robot in the chat system, and this token serves as identification information of the notification robot.

Figure 15:
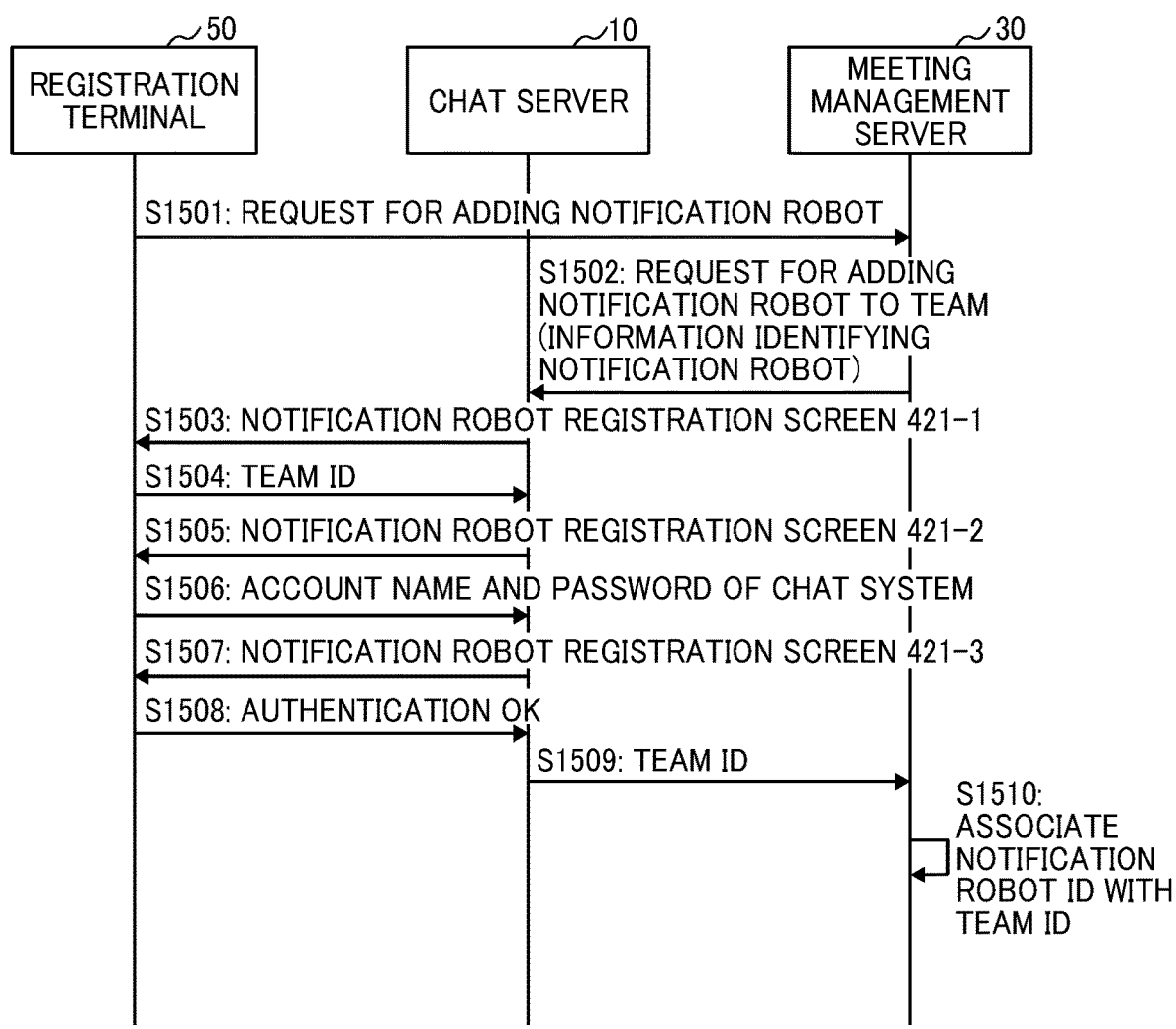
FIG. 15 is a sequence diagram illustrating an example of an operation of registering the notification robot, according to an embodiment of the present disclosure.

FIG. 15 is a sequence diagram illustrating an example of an operation of registering a notification robot.

S1501: The server communication unit 91 of the registration terminal 50 transmits, to the meeting management server 30, a request for adding a notification robot to a team. This request for adding the notification robot is transmitted in response to selection of the notification robot add button 412 on the registration operation initial screen 411 of FIG. 11, which is provided by the meeting management server 30.

S1502: The communication unit 31 of the meeting management server 30 transmits the identification information of the notification robot to the chat server 10 together with the request for adding the notification robot to the team.

S1503: The chat server 10 transmits, to the registration terminal 50, the notification robot registration screen 421-1. The registration terminal 50 displays the notification robot registration screen 421-1.

S1504: The administrator of the resource reservation system 100 enters a group name on the notification robot registration screen 421-1. The operation receiving unit 52 of the registration terminal 50 receives the input of the team ID. The communication unit 51 transmits the input team ID to the chat server 10.

S1505: In response to receiving the team ID, the chat server 10 transmits the notification robot registration screen 421-2 to the registration terminal 50.

S1506: The communication unit 51 of the registration terminal 50 receives the notification robot registration screen 421-2. The display control unit 53 displays the notification robot registration screen 421-2. The administrator of the resource reservation system 100 enters the account name of the chat system and the password (one of the members belonging to the group). The operation receiving unit 52 of the registration terminal 50 receives the input of the account name of the chat system and the password. The communication unit 51 transmits the received account name and password to the chat server 10.

S1507: The chat server 10 performs authentication of the account name of the chat system and the password transmitted from the registration terminal 50. When the authentication is successful, the chat server 10 transmits the notification robot registration screen 421-3 to the registration terminal 50.

S1508: The communication unit 51 of the registration terminal 50 receives the notification robot registration screen 421-3. The display control unit 53 displays the received notification robot registration screen 421-3. The administrator of the resource reservation system 100 presses the Authorize button 427. The operation receiving unit 52 of the registration terminal 50 accepts the pressing of the Authorize button 427. The communication unit 51 transmits information indicating that the authorization is confirmed to the chat server 10.

S1509: In response to receiving the information indicating the authorization is confirmed, the communication unit 11 of the chat server 10 transmits the team ID entered by the administrator of the resource reservation system 100 to the meeting management server 30.

S1510: The information associating unit 32 of the meeting management server 30 manages the team ID and the token of the notification robot in association with each other.

Figure 16:
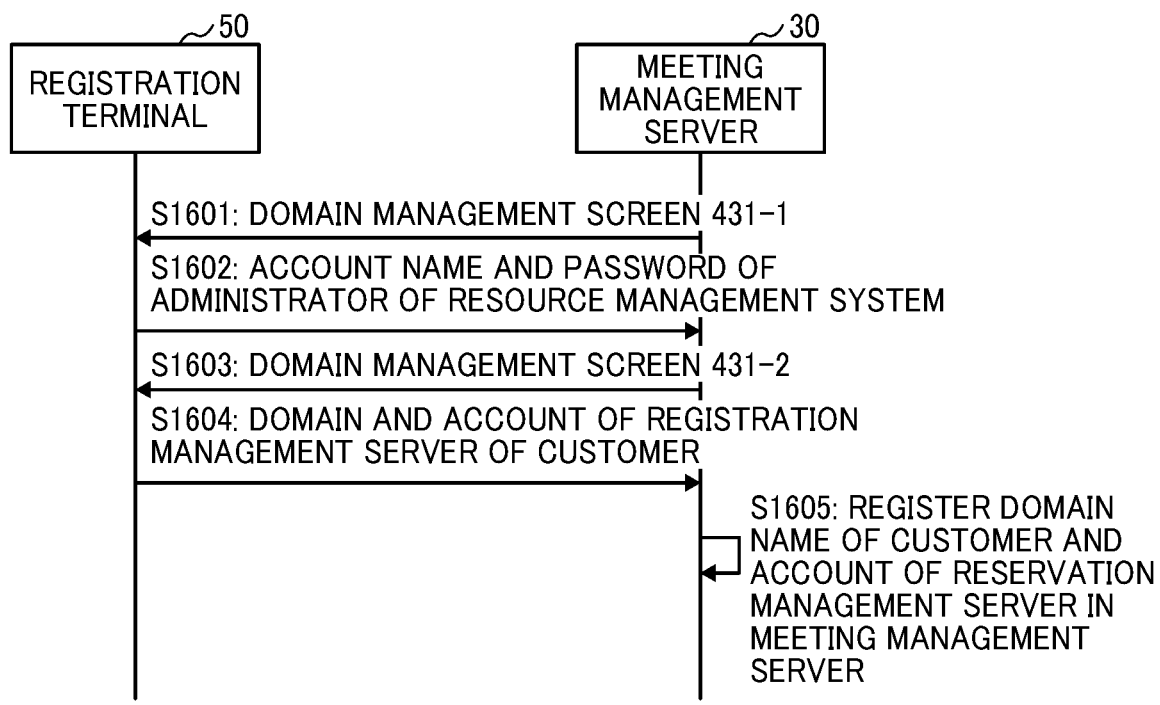
FIG. 16 is a sequence diagram illustrating an example of an operation of registering an account of a reservation management server of a customer, according to an embodiment of the present disclosure.

FIG. 16 is a sequence diagram illustrating an example of an operation of registering the account of the customer of the reservation management server 20.

S1601: The administrator of the resource reservation system 100 operates the registration terminal 50 to access the meeting management server 30. In response to the access from the registration terminal 50, the meeting management server 30 transmits the domain management screen 431-1.

S1602: The administrator of the resource reservation system 100 enters the account name of the administrator of the resource reservation system 100 and the corresponding password on the domain management screen 431-1. The operation receiving unit 52 of the registration terminal 50 receives the input of the account name of the administrator and the password. The communication unit 51 transmits the account name and the password received by the operation receiving unit 52 to the meeting management server 30.

S1603: When authentication based on the account name and the password is successful, the communication unit 31 of the meeting management server 30 transmits the domain management screen 431-2 to the registration terminal 50.

S1604: The communication unit 51 of the registration terminal 50 receives the domain management screen 431-2. The display control unit 53 displays the received domain management screen 431-2. The administrator of the resource reservation system 100 enters the domain of the customer of the reservation management server 20 and the account of the administrator of the customer. The operation receiving unit 52 of the registration terminal 50 receives the input of the domain of the customer of the reservation management server 20 and the administrator's account of the customer. The communication unit 51 transmits the domain and the account received by the operation receiving unit 52 to the meeting management server 30.

S1605: The communication unit 31 of the meeting management server 30 receives the domain of the customer of the reservation management server 20 and the administrator's account or the customer. The information associating unit 32 registers the domain of the customer of the reservation management server 20 and the administrator's account of the customer in association with each other with the customer domain DB 495.

Figure 17:
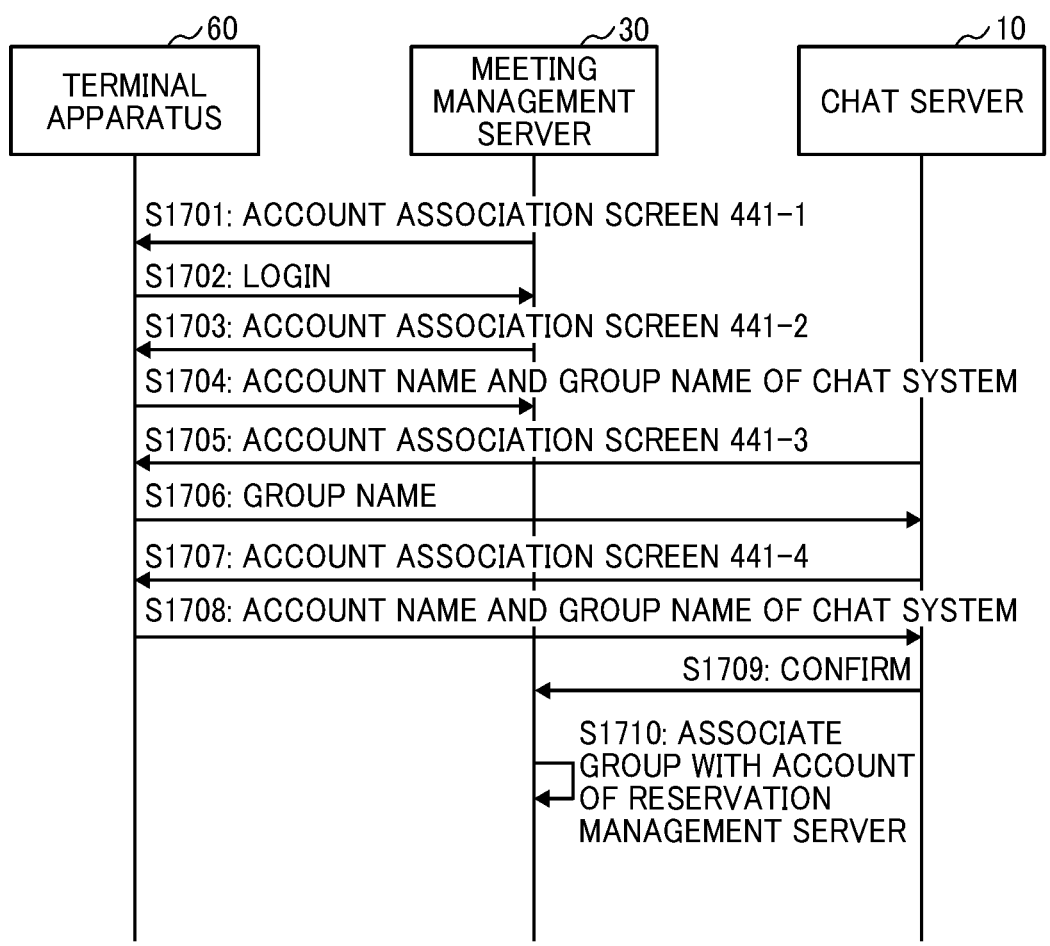
FIG. 17 is a sequence diagram illustrating an example of an operation of associating a group of a chat system with an account of a reservation management server, according to an embodiment of the present disclosure.

FIG. 17 is a sequence diagram illustrating an example of an operation of associating a group of the chat system with an account of the reservation management server 20.

S1701: An expected participant operates the terminal apparatus 60 to accesses the meeting management server 30. In response to the access from the terminal apparatus 60, the meeting management server 30 transmits the account association screen 441-1.

S1702: The expected participant selects the account name registered in the operation of FIG. 16 and logs in to the meeting management server 30. Thus, the account in the reservation management server 20 of the administrator of the customer is identified in the meeting management server 30.

S1703: When the meeting management server 30 permits the login, the meeting management server 30 transmits the account association screen 441-2 to the terminal apparatus 60.

S1704: The expected participant enters the account name and group name of the chat system on the account association screen 441-2. The operation receiving unit 61*b* of the terminal apparatus 60 receives the input of the account name, the group name, and the team ID. The communication unit 61*a* transmits the account name, group name and team ID to the meeting management server 30. A notification destination to which information about a meeting that is reserved in the reservation management server 20 using the account selected at S1702 is identified by the group name and the team ID.

S1705: The communication unit 31 of the meeting management server 30 receives the account name of the chat system, the group name, and the team ID transmitted from the communication unit 61*a* of the terminal apparatus 60. The information associating unit 32 redirects the terminal apparatus 60 to the chat server 10 for verification of the account name and the group name. Thereby, the terminal apparatus 60 displays the account association screen 441-3. Contents displayed on this account association screen 441-3 includes a team ID.

S1706: The operation receiving unit 61*b* of the terminal apparatus 60 receives an operation input by the expected participant. The communication unit 61*a* transmits the team ID to the chat server 10.

S1707: The chat server 10 transmits the account association screen 441-4 to the terminal apparatus 60 in order to acquire an account of a member included in a group identified by this team ID.

S1708: The expected participant enters the account name of the chat system and the corresponding password on the account association screen 414-4. The operation receiving unit 61*b* of the terminal apparatus 60 receives the input of the account of the chat system and the password. The communication unit 61*a* transmits the account name and the password to the chat server 10.

S1709: The chat server 10 performs authentication of the account name and the password. When the authentication is successful, the chat server 10 transmits information indicating that the account name and the password are confirmed to the meeting management server 30. In FIG. 17, a process of redirection in this case is omitted.

S1710: The information associating unit 32 of the meeting management server 30 stores, in the association information DB 491, information for identifying the group including the team ID and the group name in association with the account of the reservation management server 20 specified in step S1702.

With the operations described heretofore, when a customer registers a reservation for a meeting room in the reservation management server 20, the reservation management server can notify each terminal apparatus 60 of each expected participant of information about the reservation for the meeting room via the chat server 10.

<Timing of Notification of Information About Reservation for Meeting Room>

Figure 18:
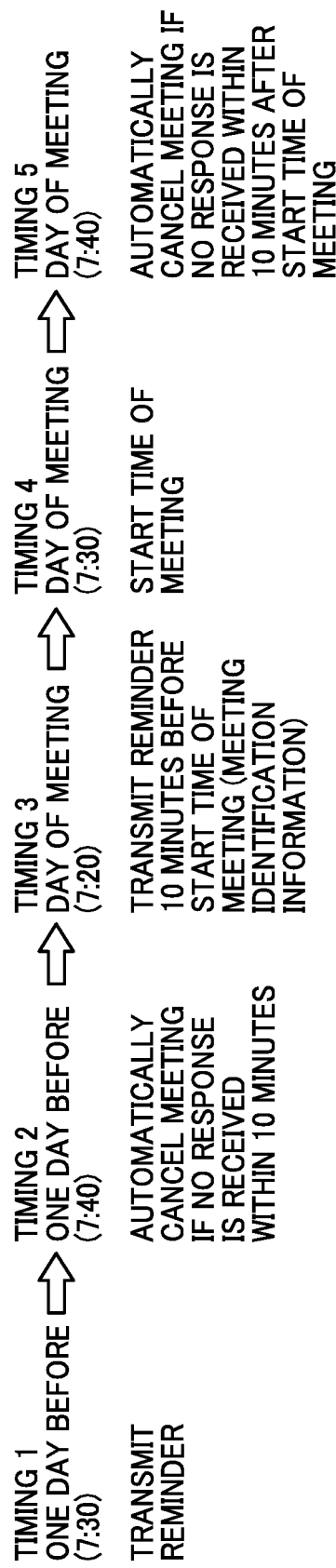
FIG. 18 is an illustration for explaining timings of notification of information about a reservation for a meeting room, according to an embodiment of the present disclosure.

FIG. 18 is an illustration for explaining timings of notification of information about a reservation for a meeting room.

Timing 1: First, when the current time corresponds to a notification timing that is registered in the notification settings DB 496, the meeting information notification unit 37 of the meeting management server 30 notifies the terminal apparatus 60 of information about a reservation for a meeting room.

Timing 2: When no response is received from any expected participant in ten minutes from the notification of the timing 1, the meeting information notification unit 37 transmits information requesting a cancellation of the reservation to the reservation management server 20.

Timing 3: When a response indicating that an expected participant will use the meeting room is received, the meeting information notification unit 37 of the meeting management server 30 again notifies the terminal apparatus 60 of the information about the reservation for the meeting room ten minutes before the start time of the meeting. In the present embodiment, the meeting identification information is transmitted as an example.

Timing 4: Meeting start time

Timing 5: When no check-in notification is received from the meeting room terminal 90 even after ten minutes has elapsed from the start time of the meeting, the check-in management unit 38 of the meeting management server 30 transmits the information requesting a cancellation of the reservation to the reservation management server 20.

It should be noted that if any one of the expected participants slated for attending the meeting responds to the information about the reservation for the meeting room, the reservation is not canceled. In another example, responses from all the expected participants can be required to avoid the cancellation of meeting. In still another example, responses from equal to or more than half of the expected participants can be required to avoid cancellation of meeting.

<Operation for Notification of Information about Reservation for Meeting Room>

Figure 19:
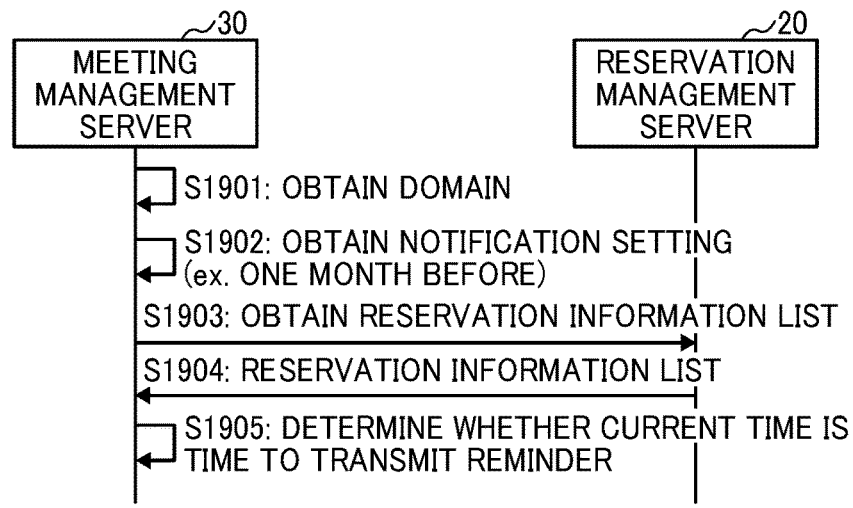
FIG. 19 is a sequence diagram illustrating an example of an operation, by the meeting management server, of notifying information about a reservation for a meeting room, according to an embodiment of the present disclosure.

FIG. 19 is a sequence diagram illustrating an example of an operation, by the meeting management server 30, of notifying information about a reservation for a meeting room.

S1901: The reservation information obtainer 33 of the meeting management server obtains an arbitrary domain of a customer from the customer domain DB 495.

S1902: Next, the reservation information obtainer 33 reads out a notification setting of the customer from the notification settings DB 496.

S1903: The reservation information obtainer 33 logs in to the reservation management server 20 using an account that is entered on the domain management screen 431-2 illustrated in FIG. 13B and FIG. 13C and stored in the customer domain DB 495, to obtain reservation information from the reservation management server 20. Specifically, the reservation information obtainer 33 obtains reservation information corresponding to a period that is set as a timing at which the information about the reservation for a meeting room is to be notified in the notification setting. For example, when the notification setting indicates that the information about the reservation for the meeting room is to be notified one month before the start time of the meeting, the reservation information obtainer 33 obtains reservation information up to one month ahead.

S1904: The reservation information obtainer 33 stores the reservation information acquired from the reservation management server 20 in the meeting management information DB 493.

S1905: The notification determination unit 34 refers to the reservation information to determine whether it is the timing to notify (remind) the information about the reservation for the meeting room. A detailed description is given heretofore of this determination with reference to a flowchart of FIG. 20.

Figure 20:
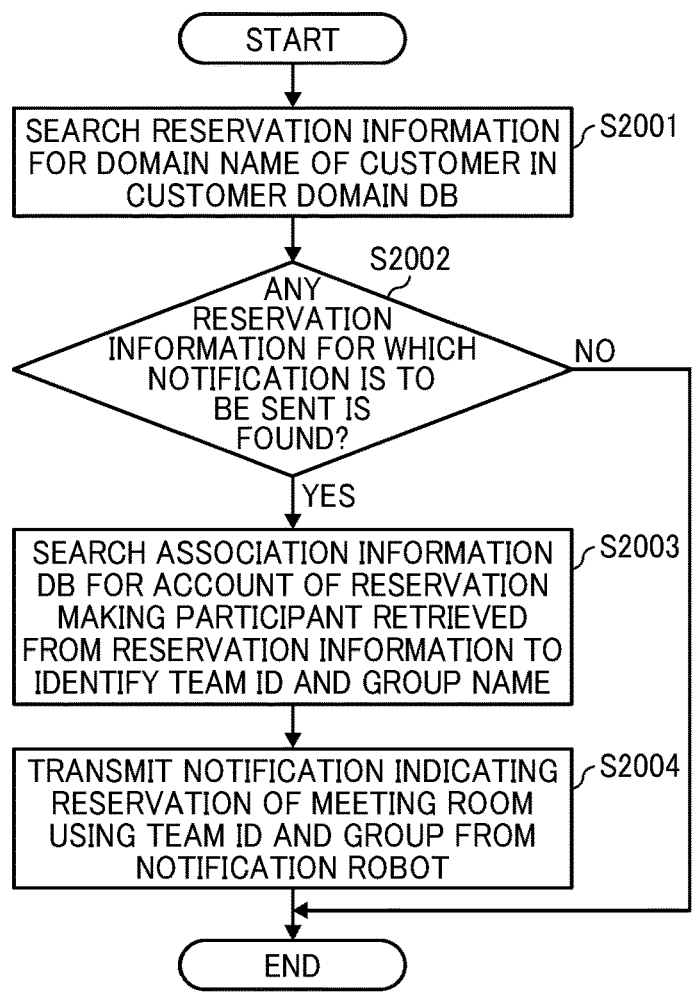
FIG. 20 is a flowchart illustrating an example of an operation, performed by a notification determination unit, of determining whether to transmit a notification of the information about the reservation for the meeting room, according to an embodiment of the present disclosure.

FIG. 20 is a flowchart illustrating an example of an operation, performed by the notification determination unit 34, of determining whether to transmit a notification of the information about the reservation for the meeting room.

The notification determination unit 34 searches the reservation information for the domain name of the customer stored in the customer domain DB 495 (S2001). Since the reservation information is obtained by designating the domain of the customer, all the accounts of reservation-making participant or accounts of expected participants included in the reservation information contain the domain. In another example, the reservation information obtainer 33 can obtain arbitrary reservation information for a given period of time, and the notification determination unit 34 can search the obtained reservation information using the domain of the customer. In this embodiment, it is assumed that the reservation information includes a reservation-making participant's account containing the domain name of the customer stored in the customer domain DB 495 or an expected participant's account containing the domain name of the customer.

Next, the notification determination unit 34 determines whether there is reservation information corresponding to a timing at which the notification is to be sent (S2002). More specifically, the notification determination unit 34 determines whether the current date and time matches or is past a date and time obtained by subtracting a period that is set in the notification setting from the start time of reservation of a meeting room. When the current date and time matches the date and time obtained by this subtraction, the notification determination unit 34 determines that the notification is to be sent. Further, the notification determination unit 34 determines that the notification is to be sent, also when the current date and time is past the date and time obtained by this subtraction and no notification has been sent yet. When the notification determination unit 34 determines that there is no reservation information corresponding to a timing at which the notification is to be sent (S2002: NO), no notification is sent, and the operation of FIG. 20 ends.

When the notification determination unit 34 determines that there is reservation information corresponding to a timing at which the notification is to be sent (S2002: YES), the notification determination unit 34 searches the association information DB 491 using the account of the reservation-making participant acquired from the reservation information as a search key, to identify the team ID and the group name, as an example of the information identifying a group, associated with the account of the reservation-making participant (S2003). When the meeting management server 30 designates a team ID, a group name (information identifying the group), and a token of a notification robot, a notification is sent to the group.

The meeting information notification unit 37 notifies, as a notification robot, expected participants of the information about the reservation for the meeting room by using the information for identifying the group including the identified team ID and group name (S2004).

Figure 21:
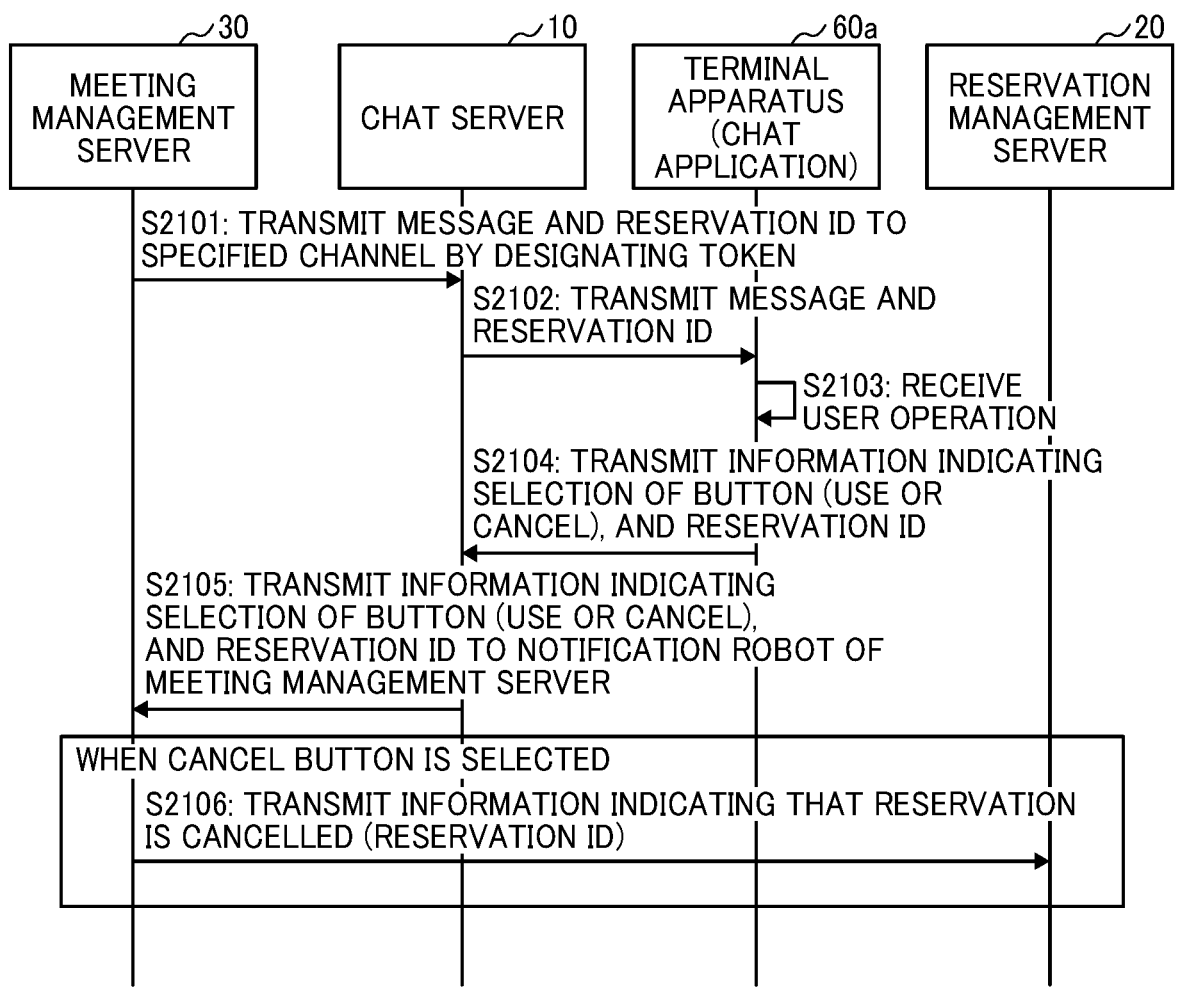
FIG. 21 is a sequence diagram illustrating an example of operation, by the meeting management server, of sending a notification of the information about the reservation for the meeting room to expected participants, according to an embodiment of the present disclosure.

FIG. 21 is a sequence diagram illustrating an example of operation, performed by the meeting management server 30, of sending a notification of the information about the reservation for the meeting room to expected participants.

S2101: The meeting information notification unit 37 designates the identified team ID and group name together with a token indicating a notification robot of the meeting management server 30, and sends to the chat server 10 a message (information about the reservation for a meeting room). Since meeting identification information is to be generated before notification of the information about the reservation for the meeting room, the meeting identification information can be transmitted at this timing (e.g., the timing 1 in FIG. 18). In addition, a reservation ID is included to identify a reservation corresponding to a response from the terminal apparatus 60. The meeting information notification unit 37 sets a status indicating that a notification of the information about the reservation of the meeting room has been sent in the status of the meeting management information DB 493.

S2102: The text processing unit 12 of the chat server 10 transmits a message to the terminal apparatus 60 of each member specified by the team ID and the group name from the notification robot of the designated token.

S2103: The chat communication unit 62 of the terminal apparatus 60 receives the message, and the text display unit 63 displays the message. This message includes graphical components including a "USE" button and a "CANCEL" button as illustrated in FIG. 22 described below. When an expected participant presses the "USE" button or the "CANCEL" button included in the message, the operation receiving unit 61b of the terminal apparatus 60 receives the pressing either one of these buttons.

S2104: The communication unit 61 a of the terminal apparatus 60 transmits to the chat server 10 information indicating that the "USE" button has been pressed or information indicating that "CANCEL" button has been pressed, and the reservation ID.

S2105: The communication unit 21 of the chat server 10 transmits, to the notification robot of the meeting management server 30, the information indicating that the "USE" button has been pressed or the information indicating that "CANCEL" button has been pressed, and the reservation ID. The communication unit 31 of the meeting management server 30 receives the reservation ID and the information indicating the "USE" button has been pressed. Thus, the meeting information notification unit 37 detects that the reservation identified by the reservation ID has been confirmed by the expected participant. The meeting information notification unit 37 sets a status indicating that a reservation has been confirmed in the status of the meeting management information DB 493. When the cancel button is pressed, the meeting information notification unit 37 sets a status indicating that the reservation has been cancelled in the status of the meeting management information DB 493.

S2106: Step S2106 is executed when a reservation is canceled. At step S2106, the meeting information notification unit 37 designates the reservation ID and transmits, to the reservation management server 20, information indicating that the reservation has been cancelled. This prevents an empty reservation.

Furthermore, the meeting information notification unit 37 can notify an expected participant that a reservation has been confirmed or canceled via the notification robot.

<Display Screen of Text>

Figure 22A:
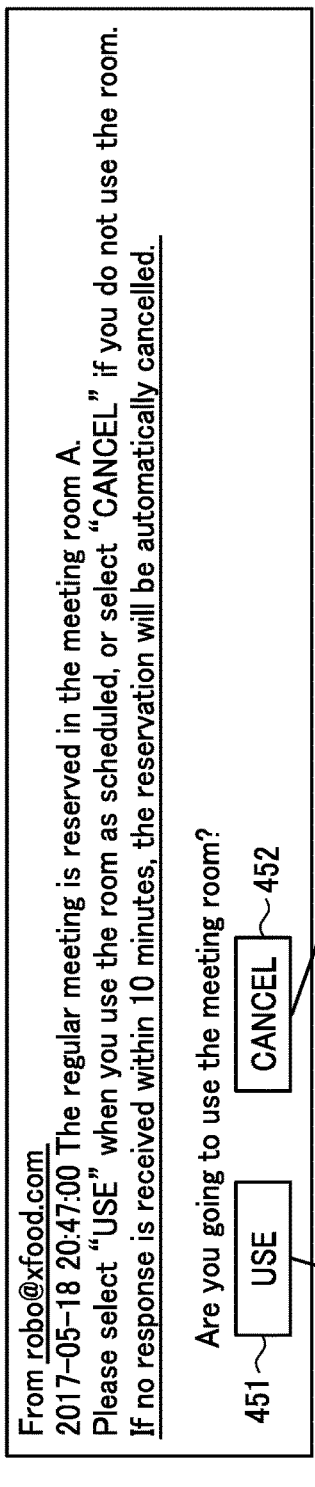
FIGS. 22A to 22D illustrate examples of the information about the reservation for the meeting room displayed at the terminal apparatus, according to an embodiment of the present disclosure.

FIGS. 22A to 22D illustrate examples of information about a reservation for a meeting room displayed on the terminal apparatus 60. FIG. 22A illustrates an example of information about a reservation for a meeting room to be notified to an expected participant at a timing that is set in the notification settings DB 496. For example, a following message is displayed at the timing 1 in FIG. 18, for example. "2017-05-18 20:47:00 The regular meeting is reserved in the meeting room A. Please select "USE" when you use the room as scheduled, or select "CANCEL" if you do not use the room. If no response is received within 10 minutes, the reservation will be automatically cancelled." An expected participant who views this message takes appropriate countermeasures, such as pressing one of the "USE" button 451 and the "CANCEL" button 452. If neither the "USE" button 451 nor the "CANCEL" button 452 is pressed, the meeting information notification unit 37 of the meeting management server 30 automatically cancels the reservation for the meeting room in ten minutes. Accordingly, empty reservations can be reduced.

The press of the "USE" button 451 and the "CANCEL" button 452 is notified to the meeting management server 30. Each of the "USE" button 451 and the "CANCEL" button 452 is associated with (embedded with or linked to) a content of the button, a URL (address information) of the meeting management server 30, and the reservation ID. Accordingly, the meeting information notification unit 37 of the meeting management server 30 can detect a content of the response and the reservation information as a target of the response.

Also, when the expected participant presses the "USE" button 451, the meeting information notification unit 37 transmits a message 453 indicating that the reservation has been confirmed to the chat application 60a of the terminal apparatus 60 via the chat server 10.

When the expected participant presses the "CANCEL" button 452, the meeting information notification unit 37 transmits a message 454 indicating that the reservation has been cancelled to the chat application 60a of the terminal apparatus 60 via the chat server 10.

Figure 22B:
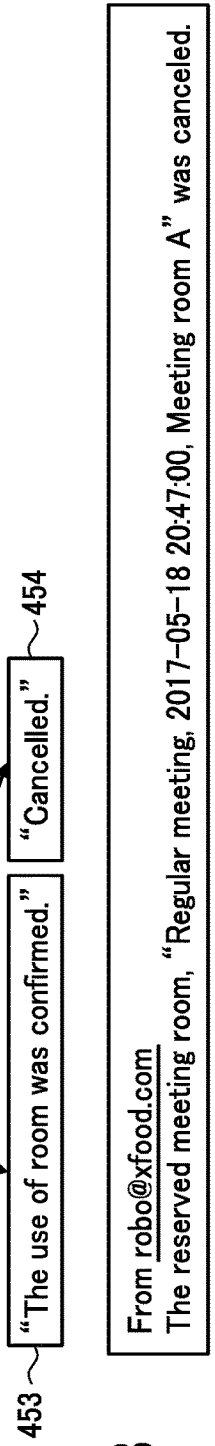

FIG. 22B illustrates a message indicating a cancellation of a reservation, which is displayed when neither the "USE" button 451 nor the "CANCEL" button 452 is pressed within a preset period (e.g., 10 minutes) after the display of message of FIG. 22A or when the "CANCEL" button 452 is pressed.

"The reserved meeting room, "Regular meeting, 2017-05-18, 20:47:00, Meeting room A" was canceled."

Expected participants who view this message can recognize that the meeting room has been canceled.

Figure 22C:
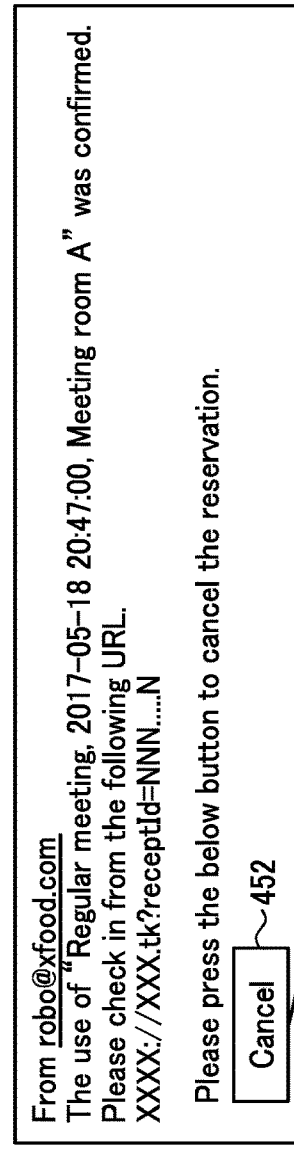

FIG. 22C illustrates an example of information about a reservation for a meeting room displayed at the terminal apparatus 60 after the use of the meeting room is confirmed in response to the pressing of the "USE" button 451.

"The use of "Regular meeting, 2017-05-18 20:47:00, Meeting room A" was confirmed.

Please check in from the following URL.

XXXX://XXX.tk?ReceptID=NNN . . . N"

In the above message, N denotes an arbitrary number or alphabet. The message like this is displayed at the timing 3 in FIG. 18, for example. In a case where the use has already been confirmed, in the present embodiment, a message includes the meeting identification information "NNN . . . N". An expected participant enters the meeting identification information to the meeting room terminal 90. In another example, the terminal apparatus 60 transmits the meeting identification information to the meeting room terminal 90. Note that the meeting identification information "NNN . . . N" can be included in the information about the reservation for the meeting room illustrated in FIG. 22A. Further, the same meeting identification information can be notified a plurality of times.

Even after confirming the reservation, the expected participant can cancel the reservation by pressing the "CANCEL" button 452. Also in this case, the meeting information notification unit 37 transmits the message 454 indicating that the reservation has been cancelled to the chat application 60a of the terminal apparatus 60 via the chat server 10.

"XXXX://XXX.tk" in the message illustrated in FIG. 22C is a URL of the meeting management server 30. Since "NNN . . . N" is designated in a parameter, the terminal apparatus 60 can access the meeting management server 30 together with the meeting identification information. This enables the check-in management unit 38 of the meeting management server 30 to a two-dimensional code including the meeting identification information. The terminal apparatus 60 can hold the generated two-dimensional code. This two-dimensional code can be used for check-in.

Figure 22D:
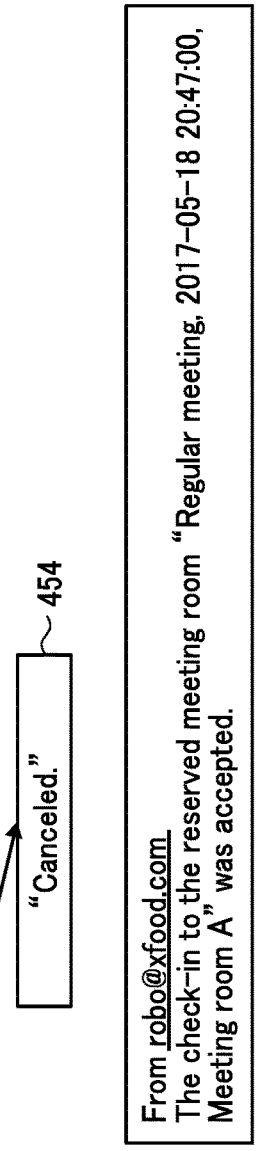

FIG. 22D illustrates a message indicating that check-in has been accepted. A detailed description is given later of the check-in. "The check-in to the reserved meeting room "Regular meeting, 2017-05-18 20:47:00, Meeting room A" was accepted. Expected participants who vies this message can recognize that one or more of the expected participants have checked in. Information indicating a specific person who has checked in can be displayed.

<Operation by Meeting Management Server 30>

FIG. 23 is a flowchart illustrating an example of an operation, performed by the meeting management server 30, of notifying information about a reservation for a meeting room.

As described above, the meeting information notification unit 37 transmits a notification of the information about the reservation for the meeting room from the notification robot (S2301).

The meeting information notification unit 37 determines whether a response corresponding to the pressing of "USE" button 451 or the "CANCEL" button 452 is received (S2302).

In response to receiving a response indicating cancellation of the reservation for the meeting room (S2302: CANCEL), the meeting information notification unit 37 transmits a notification indicating the cancellation of the reservation from the notification robot (S2303). It should be noted that an account of a reservation-making participant is identified based on the reservation ID included in the response, and a group is identified based on the account of the reservation-making participant. A status indicating that a reservation has been cancelled is registered in the status of the meeting management information DB 493.

In response to receiving a response indicating confirmation of the reservation for the meeting room (S2302: USE), the meeting information notification unit 37 transmits a notification indicating that the use of the meeting room has been confirmed from the notification robot (S2304). A status indicating that a use of the meeting room has been confirmed is registered in the status of the meeting management information DB 493.

Next, the meeting information notification unit 37 determines whether the current time is a predetermined time period before the start time of meeting (S2305). The meeting information notification unit 37 waits until the current time reaches the predetermined time period before the start time.

When the current time reaches the predetermined time period before the start time (S2305: YES), the meeting information notification unit 37 transmits a notification of the meeting identification information and the URL of the meeting management server 30 from the notification robot (S2306). The meeting information notification unit 37 generates meeting identification information and registers the generated meeting identification information in the meeting identification information DB 494 in association with the reservation ID and the meeting room ID. Thus, an empty reservation is likely to be suppressed, and a user can obtain a two-dimensional code, etc.

By contrast, neither a response corresponding to the pressing of "USE" button 451 nor a response corresponding to the pressing of the "CANCEL" button 452 is received (S2302: NO), the meeting information notification unit 37 determines whether a predetermined time has elapsed since the notification was transmitted at the timing that is set in the notification settings DB 496 (S2307). The determinations in steps 52302 and 52307 are repeated until the predetermined time has elapsed.

When neither a response corresponding to the pressing of "USE" button 451 nor a response corresponding to the pressing of the "CANCEL" button 452 is received even after the predetermined time has elapsed (S2307: YES), the meeting information notification unit 37 transmits a notification indicating the cancellation from the notification robot (S2308). A status indicating that a reservation has been cancelled is registered in the status of the meeting management information DB 493.

<Notification to Individual Expected Participants>

The notification robot of the chat server 10 can transmit messages in real time to all members belonging to the same group. In another example, the resource reservation system 100 of the present embodiment can also restrict the message transmission destination to some members in the group. In this case, it is necessary to designate, on the reservation screen 401 of FIG. 10, the accounts of the reservation management server 20 of all the expected participants to which a notification is to be sent.

<<Example 1 of How to Notify Individual Expected Participant>>

In one example, a notification destination to which information about a reservation for a meeting room is to be notified can be predetermined. In this example, the meeting information notification unit 37 only has to notify the information about the reservation for the meeting room only to the predetermined expected participants. For example, the meeting notification unit 37 can send a notification to an expected participant corresponding to an account of a reservation-making participant. In the chat server 10, in general, the notification robot transmits a message to all members belonging to a group. For this reason, when the meeting information notification unit 37 causes the notification robot of the chat server 10 to send a notification, the meeting information notification unit 37 requests the chat server 10 to designate one or more specific members to whom the notification is to be sent. In this example, the meeting management server 30 needs to store the accounts of the chat server 10 of all the expected participants to whom a notification is to be sent in association with the accounts of the reservation management server 20 of all the expected participants to whom a notification is to be sent.

<<Example 2 of How to Notify Individual Expected Participant>>

In another example, an administrator of the resource reservation system 100 or an expected participant can set a notification list in advance. For example, when the expected participants are the user A and the user B, the notification list includes the user A and the user B. For example, when the expected participants are the user A, the user B, and the user C, the notification list includes the user A, the user B, and the user C. For example, when the expected participants are the user A, the user B, the user C, and the user D, the notification list specifies an entire group. The meeting information notification unit 37 determines that a notification is to be sent to one or more expected participants included in the notification list from among the accounts of expected participants and the reservation-making participant's account included in the reservation information.

<<Example 3 of How to Notify Individual Expected Participant>>

In consideration of one or more groups of the chat system, a notification can be sent only to an expected participant(s) in a group including members closest to participants indicated by the account of the reservation-making participant and the accounts of the expected participants included in the reservation information. For example, in a Case 1 in which a group of the chat system includes the user A and the user B, and the expected participants in the reservation information are the user A and the user B, the meeting information notification unit 37 sends a notification to the user A and the user B. For example, in a Case 2 in which a Group 1 of the chat system includes the user A and the user B, a Group 2 of the chat system includes the user A, the user C, and the user D, and the expected participants in the reservation information are the user A and the user B, the meeting information notification unit 37 sends a notification to the user A and the user B, since the members belonging to the Group 1 are closer to the expected participants included in the reservation information than the Group 2. In this example, the notification robot needs to be added to each of the group 1 and the group 2. Further, the meeting management server 30 needs to store, for each of the Group 1 and Group 2, an account of the chat server 10 of each member belonging to the group, and an account of the reservation management server 20 of each expected participant in association with each other.

<Initial Setting of Meeting Room Terminal 90>

It is preferable that a meeting room ID, a meeting room name, a URL of the meeting management server 30, are set in the meeting room terminal 90. For this reason, the administrator of the resource reservation system 100 configures initial settings for the meeting room terminal 90.

Figure 24:
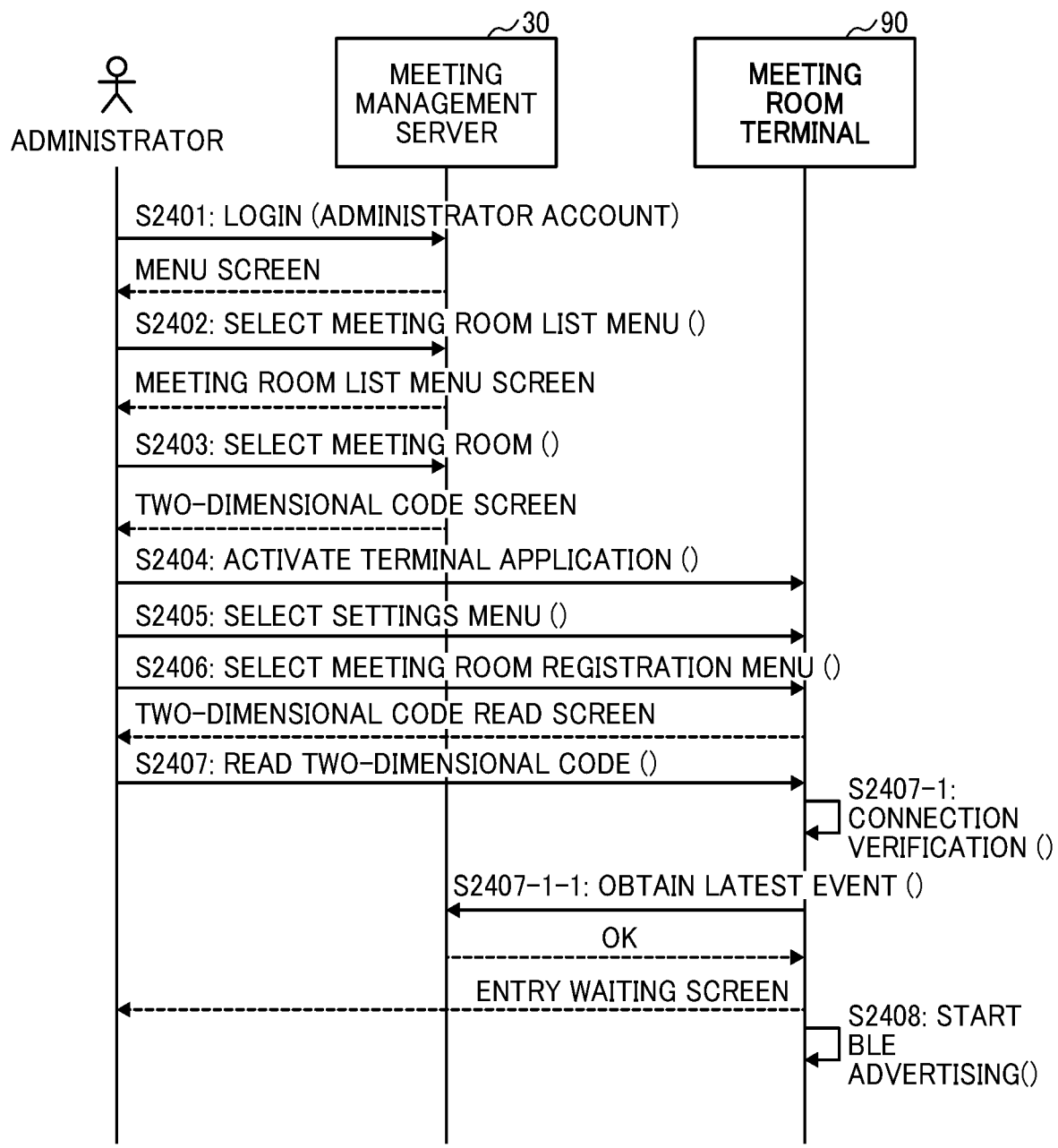
FIG. 24 is a sequence diagram illustrating an example of an operation of configuring initial settings for the meeting room terminal, according to an embodiment of the present disclosure.

FIG. 24 is a sequence diagram illustrating an example of operation of configuring initial settings for the meeting room terminal 90.

S2401: The administrator of the resource reservation system 100 operates the registration terminal 50 to log in to the meeting management server 30. The initial setting unit 39 of the meeting management server 30 transmits a menu screen to the registration terminal 50.

S2402: The registration terminal 50 receives selection (pressing) of a menu for a meeting room list on the menu screen by the administrator of the resource reservation system 100. The display control unit 53 of the registration terminal 50 displays a meeting room list screen.

S2403: The administrator of the resource reservation system 100 selects (presses) a meeting room where he/she is (a meeting room for which he/she is going to configure initial settings) on the meeting room list screen. The communication unit 51 of the registration terminal 50 transmits information identifying the selected meeting room to the initial setting unit 39 of the meeting management server 30. The initial setting unit 39 of the meeting management server 30 generates a two-dimensional code. The two-dimensional code includes a meeting room ID and a meeting room name, and an URL of the meeting management server 30. The meeting room ID and the meeting room name managed by the meeting management server 30 can be registered in the meeting room terminal 90 using the two-dimensional code. Further, the meeting room terminal 90 accesses the meeting management server 30 using the URL of the meeting management server 30.

S2404: The administrator of the resource reservation system 100 operates the meeting room terminal 90 to activate the terminal application 90a.

S2405: Next, the administrator presses a setting menu displayed by the terminal application 90a. The operation receiving unit 93 of the meeting room terminal 90 accepts the pressing. The display control unit 94 displays a screen corresponding to the received operation.

S2406: The administrator of the resource reservation system 100 presses a meeting room registration menu. The operation receiving unit 93 accepts the operation (pressing), and the terminal apparatus communication unit 92 of the meeting room terminal 90 starts reading a two-dimensional code.

S2407: Since the display control unit 53 of the registration terminal 50 displays the two-dimensional code transmitted from the meeting management server 30 in response to the selection of the meeting room in step S2403, the terminal apparatus communication unit 92 of the meeting room terminal 90 reads the displayed two-dimensional code.

S2407-1: The server communication unit 91 of the meeting room terminal 90 communicates with the meeting management server 30 using the URL of the meeting management server 30, and verifies whether connection is established. For example, the server communication unit 91 confirms that Ack is sent back.

S2407-1-1: The server communication unit 91 of the meeting room terminal 90 acquires the latest event (e.g., reservation information for the meeting room in the current time slot, a check-in state, control information, etc.) from the meeting management server 30. When check-in has not been performed, the meeting room terminal 90 displays an entry waiting screen, which displays information indicating an entry to a meeting room is being waited. The entry waiting screen can be also referred to as a "check-in waiting screen", hereinafter.

S2408: When the check-in has not been performed, the meeting room terminal 90 starts BLE (Bluetooth (registered trademark) Low Energy) advertising. This enables the terminal apparatus 60 to communicate with the meeting room terminal 90.

Figure 25:
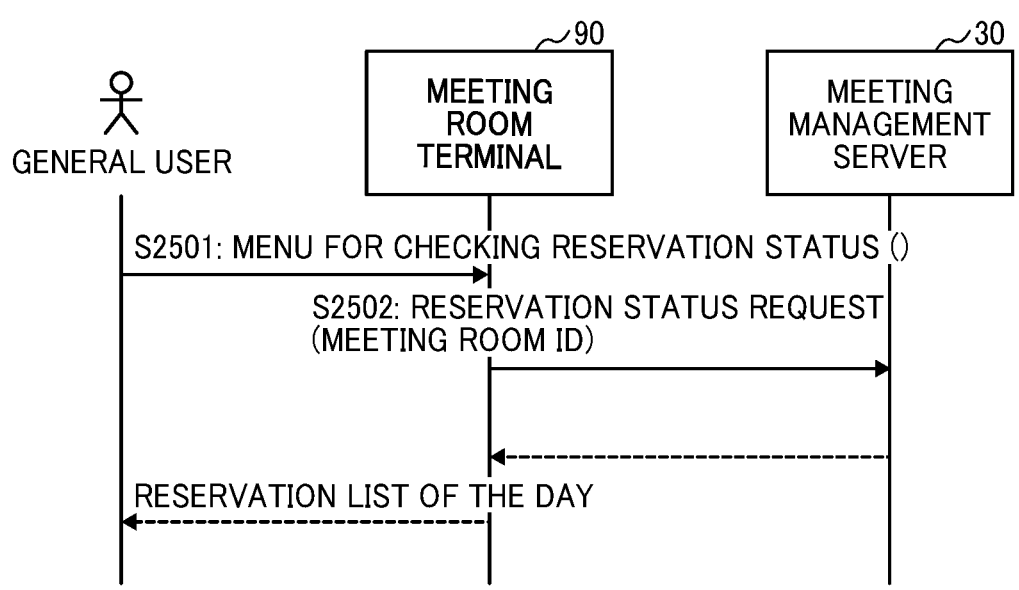
FIG. 25 is a sequence diagram illustrating an example of an operation performed when a general user checks a reservation status, according to an embodiment of the present disclosure.

FIG. 25 is a sequence diagram illustrating an example of an operation performed when a general user checks a reservation status. The general user refers to a nonspecific user such as a person who is going to reserve a meeting room.

S2501: The general user operates the meeting room terminal 90 to display a menu for confirming a reservation status.

S2502: The server communication unit 91 of the meeting room terminal 90 transmits an inquiry to the meeting management server 30 for the reservation status using the meeting room ID and the URL of the meeting management server 30, which are set in the initial setting process as described above with reference to FIG. 24. The meeting management server 30 transmits the reservation information identified by the meeting room ID among the reservation information stored in the reservation information DB 291 to the meeting room terminal 90. The reservation information to be transmitted can be the reservation information for the current day only, one week ahead, or one month ahead. The general user can specify a desired period. Thus, the general user can check the reservation status of a meeting room where the general user is.

<Check In>

A description is given hereinafter of several types of operations for checking in.

<<Check-In Using Two-dimensional Code>>

Figure 26:
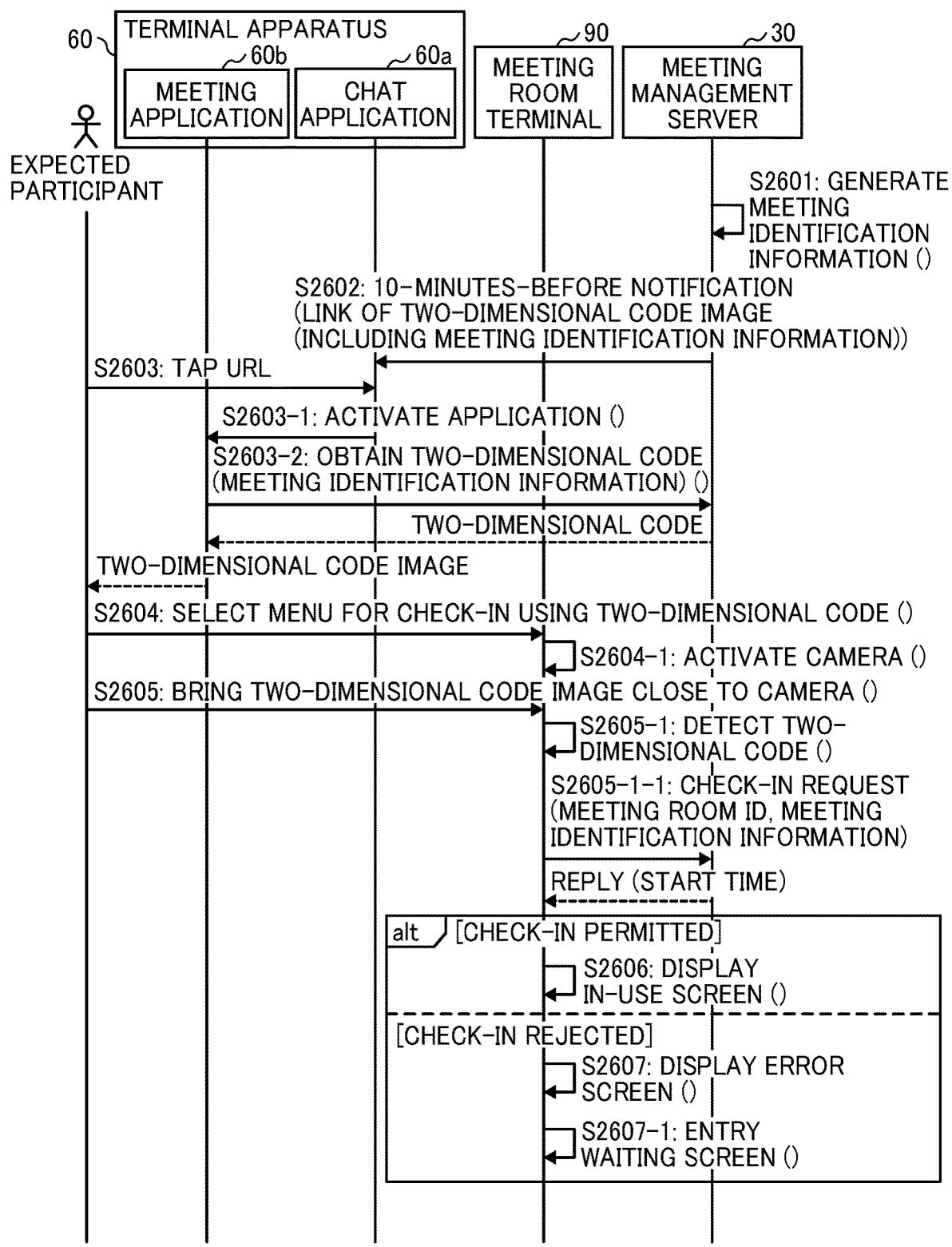
FIG. 26 is a sequence diagram illustrating an example of an operation of check-in using a two-dimensional code, according to an embodiment of the present disclosure.

FIG. 26 is a sequence diagram illustrating an example of an operation of check-in using a two-dimensional code.

S2601: As described above, the meeting information notification unit 37 of the meeting management server 30 generates meeting identification information by the start time of the meeting.

S2602: As illustrated in FIG. 22C, the meeting information notification unit 37 of the meeting management server 30 transmits, to the chat server 10 (terminal apparatus 60), the meeting identification information together with information about a reservation for a meeting room. The terminal apparatus 60 stores the meeting identification information.

S2603: An expected participant presses (selects) an URL of the meeting management server 30 included in the information about the reservation for the meeting room. The operation receiving unit 61b of the terminal apparatus 60 receives the pressing of the URL. At the terminal apparatus 60, a browser included in the chat application 60a is activated.

S2603-1: The communication unit 61a of the terminal apparatus 60 transmits, to the meeting management server 30 specified by the URL, a request for a two-dimensional code, by designating the meeting identification information. The check-in management unit 38 of the meeting management server 30 generates a two-dimensional code by coding the meeting identification information. The communication unit 31 transmits the two-dimensional code to the terminal apparatus 60. The display control unit 66 (browser) of the terminal apparatus 60 displays the two-dimensional code. The two-dimensional code contains the meeting identification information.

S2603-2: The server communication unit 65 of the terminal apparatus 60 designates the meeting identification information and requests the meeting management server 30 for a two-dimensional code.

S2604: The expected participant selects a menu for receiving a check-in using a two-dimensional code, which menu is displayed at the meeting room terminal 90.

S2604-1: The meeting room terminal 90 activates a camera.

S2605: The expected participant brings the two-dimensional code displayed at the terminal apparatus 60 close to the camera of the meeting room terminal 90.

S2605-1: The terminal apparatus communication unit 92 of the meeting room terminal 90 detects the two-dimensional code and decodes the two-dimensional code to obtain the meeting identification information.

S2605-1-1: The server communication unit 91 of the meeting room terminal 90 transmits the meeting room ID and the meeting identification information contained in the two-dimensional code to the meeting management server 30. The check-in management unit 38 of the meeting management server 30 determines whether the received meeting identification information matches meeting identification information of the latest scheduled meeting. The meeting identification information is registered in the meeting identification information DB 494 in association with the meeting room ID. However, it is not appropriate to accept a check-in well before the start time. In view of this, the check-in management unit 38 searches the meeting management information DB 493 using the reservation ID associated with the meeting identification information in the meeting identification information DB 494, to identify the start time. When the current time is about 5 to 10 minutes before (the predetermined period before) the start time of the meeting, the check-in management unit 38 permits a check-in.

When the received meeting identification information matches meeting identification information of the latest scheduled meeting, the check-in management unit 38 of the meeting management server 30 transmits a response indicating whether the check-in is permitted or denied, together with responds to the meeting room terminal 90 together with the meeting start. The above-mentioned 5 to 10 minutes is an example, and a check-in can be permitted even when the current time is more than 5 to 10 minutes before the start time, if no reservation is made for the same meeting room. The communication unit 31 of the meeting management server 30 transmits the start time as a response.

When the check-in is permitted, step S2606 is executed. S 2606: The display control unit 94 of the meeting room terminal 90 displays information indicating that a meeting room is in use. The screen displaying the information indicating that a meeting room is in use can be referred to as an "in-use screen" hereinafter.

When the check-in is denied, step S2707 is executed. S 2707: The display control unit 94 of the meeting room terminal 90 displays an error message. For example, a message like "Reservation time is still ahead." is displayed. S 2707-1: The display control unit 94 of the meeting room terminal 90 displays information indicating an entry to the room is being waited. In other words, the display control unit 94 displays the entry waiting screen (check-in waiting screen).

<<Check-in in Using Meeting Identification Information Manually Input by Participant>>

Figure 27:
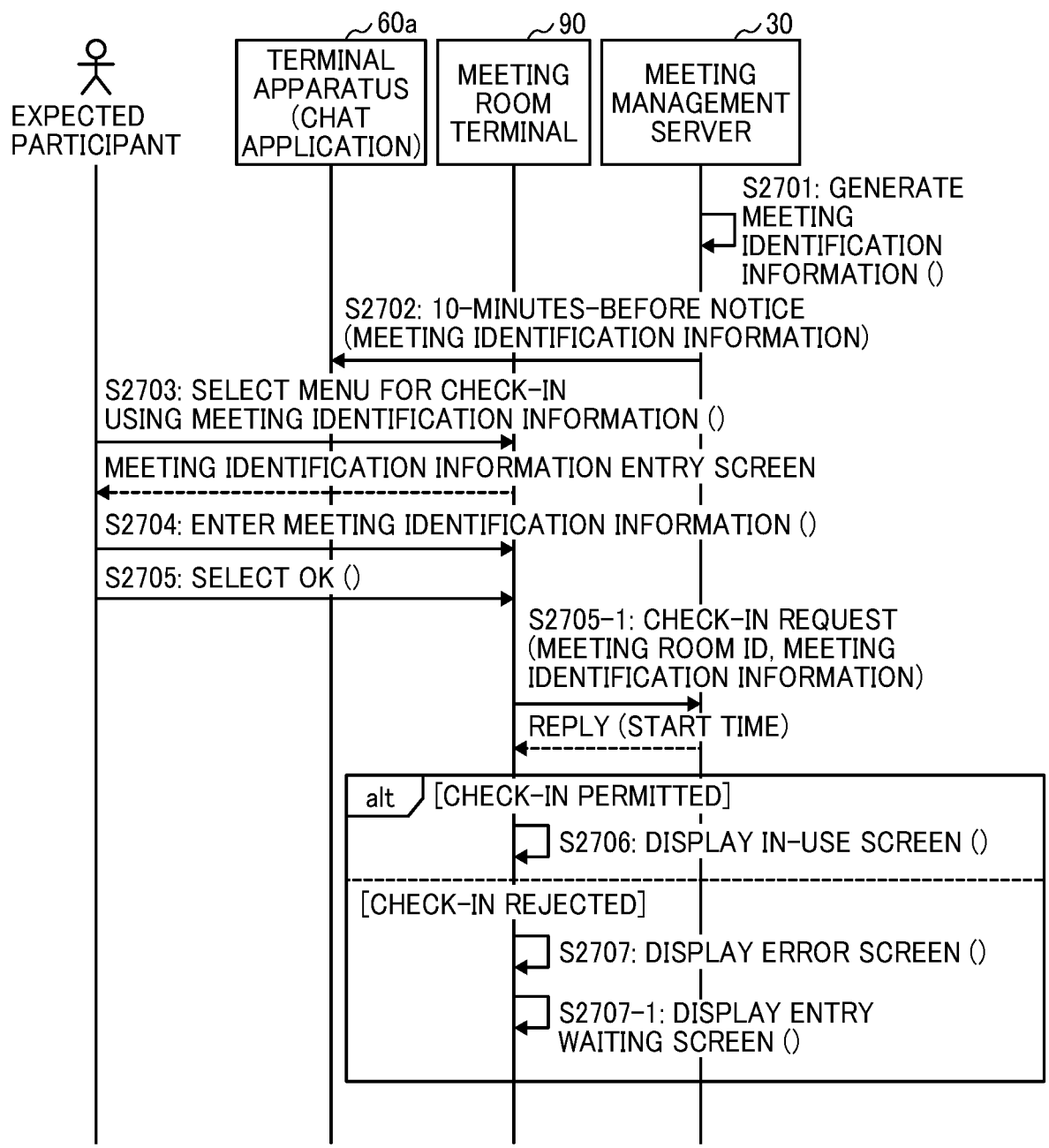
FIG. 27 is a sequence diagram illustrating an example of an operation of check-in when an expected participant does not bring his/her terminal apparatus with him- or herself, according to an embodiment of the present disclosure.

FIG. 27 is a sequence diagram illustrating an example of operation of check-in when an expected participant does not bring his/her terminal apparatus 60 with him- or herself. In this case, the expected participant log in using meeting identification information that he/she remembers.

S2701: As described above, the meeting information notification unit 37 of the meeting management server 30 generates meeting identification information by the start time of the meeting.

S2702: As illustrated in FIG. 22C, the meeting information notification unit 37 of the meeting management server 30 transmits, to the chat server 10 (terminal apparatus 60), the meeting identification information together with information about a reservation for a meeting room. The terminal apparatus 60 stores the meeting identification information.

However, in this case, an expected participant does not bring the terminal apparatus 60 with him- or herself.

S2703: The expected participant presses (selects) a "Check-in Using Meeting Identification Information" menu displayed at the meeting room terminal 90. The operation receiving unit 93 of the meeting room terminal 90 receives this operation by the expected participant. The display control unit 94 displays an entry field for meeting identification information.

S2704: The expected participant enters meeting identification information. The operation receiving unit 93 of the meeting room terminal 90 receives the meeting identification information.

S2705: The expected participant presses an OK button (Enter button). The operation receiving unit 93 of the meeting room terminal 90 receives the pressing of the OK button.

The subsequent steps S2705-1, S2706, S2707 and S2701-1 are the same or substantially the same as steps S2605-1, S2606, S2607, and S2607-1 of FIG. 26. Thus, even when an expected participant does not bring the terminal apparatus 60 with him- or herself, the expected participant can check in using meeting identification information the he or she remembers.

<<Check-In with Short-Range Wireless Communication>>

Figure 28B:
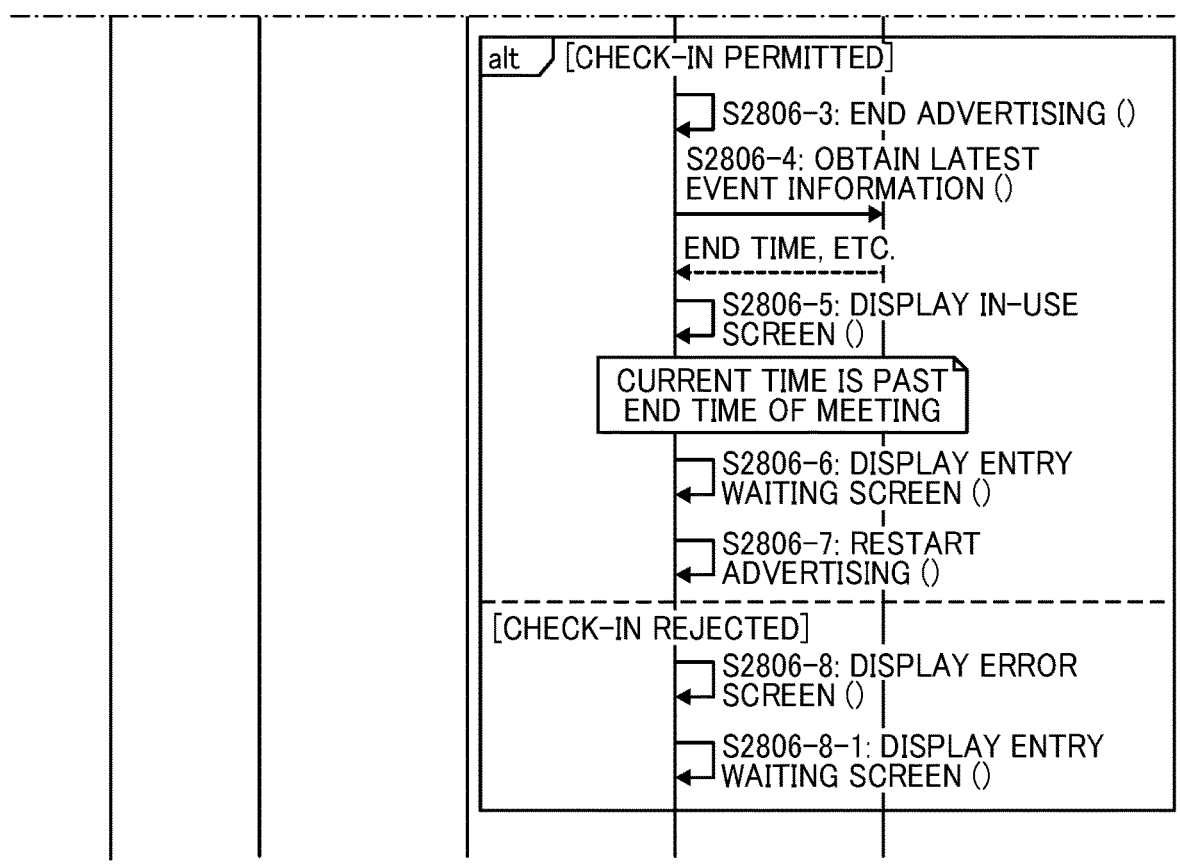

FIGS. 28A and 28B are a sequence diagram illustrating an example of an operation in which an expected participant checks in using a short-range wireless communication network.

S2801: As described above, the meeting information notification unit 37 of the meeting management server 30 generates meeting identification information by the start time of the meeting.

S2802: As illustrated in FIG. 22C, the meeting information notification unit 37 of the meeting management server 30 transmits, to the chat server 10 (terminal apparatus 60), the meeting identification information together with information about a reservation for a meeting room. The terminal apparatus 60 stores the meeting identification information.

S2803: An expected participant operates the chat application 60a of the terminal apparatus 60 to control the application communication unit 64 to activate the meeting application 60b.

S2803-1: As a result, the meeting application 60b starts up and the information about the reservation of the meeting room is stored.

S2804: The expected participant brings the terminal apparatus 60 close to the meeting room terminal 90.

S2805: The terminal communication unit 68 of the terminal apparatus 60 detects the meeting room terminal 90. For example, in Bluetooth Low Energy (BLE; registered trademark), the meeting room terminal 90 is a peripheral device and the terminal apparatus 60 is a central device.

S2805-1: The terminal communication unit 68 of the terminal apparatus 60 connects to the meeting room terminal 90 with BLE.

S2805-2: The terminal communication unit 68 of the terminal apparatus 60 writes the meeting identification information in a characteristic for writing meeting identification information, to transmit the meeting identification information to the meeting room terminal 90.

S2806: The terminal apparatus communication unit 92 of the meeting room terminal 90 detects the meeting identification information.

S2806-1: The server communication unit 91 of the meeting room terminal 90 transmits a meeting room ID and the meeting identification information to the meeting management server 30. The check-in management unit 38 of the meeting management server 30 determines whether the received meeting identification information matches meeting identification information of the latest scheduled meeting.

S2806-1-1: The check-in management unit 38 transmits a check-in result to the meeting room terminal 90. At this step, it is preferable that the check-in management unit 38 transmits a connection ID as well contained in the reservation information to the meeting room terminal 90. The meeting room terminal 90 transmits the connection ID to the electronic device 70. This enables the electronic device 70 to designate an electronic device 70 provided at a different site using the connection ID and automatically connect to the electronic device 70 provided at the different site.

S2806-2: The server communication unit 91 of the meeting room terminal 90 receives the check-in result. The terminal apparatus communication unit 92 writes the check-in result in a characteristic for reading a check-in result, to transmit the check-in result to the terminal apparatus 60.

S2805-3, S2805-4: The terminal communication unit 68 of the terminal apparatus 60 obtains the characteristic for reading the check-in result from the meeting room terminal 90 as appropriate, to obtain the check result.

S2805-5: The terminal communication unit 68 of the terminal apparatus 60 disconnects BLE.

When the check-in is permitted, the following processes are executed. S2806-3: The terminal apparatus communication unit 92 of the meeting room terminal 90 ends advertising of BLE.

S2806-4: The server communication unit 91 of the meeting room terminal 90 communicates with the meeting management server 30 to acquire the latest event.

S2806-5: The display control unit 94 of the meeting room terminal 90 displays information indicating that a meeting room is in use. In other words, the display control unit 94 displays the in-use screen.

S2806-6: Thereafter, the current time passes the end time of the meeting. The expected participant checks out. The display control unit 94 of the meeting room terminal 90 displays information indicating that an entry to the room is being waited. In other words, the display control unit 94 displays the entry waiting screen (check-in waiting screen). A description is given later of a process of the check-out with reference to FIG. 29.

S2806-7: The terminal apparatus communication unit 92 of the meeting room terminal 90 restarts advertising of BLE.

By contrast, when the check-in is denied, the following processes are executed. S2806-8: The display control unit 94 of the meeting room terminal 90 displays an error message. For example, a message like "Reservation time is still ahead." is displayed.

S2806-8-1: The display control unit 94 of the meeting room terminal 90 displays information indicating a time of waiting for an entry to the room. In other words, the display control unit 94 displays the entry waiting screen (check-in waiting screen).

<Check-Out Processes>

Figure 29:
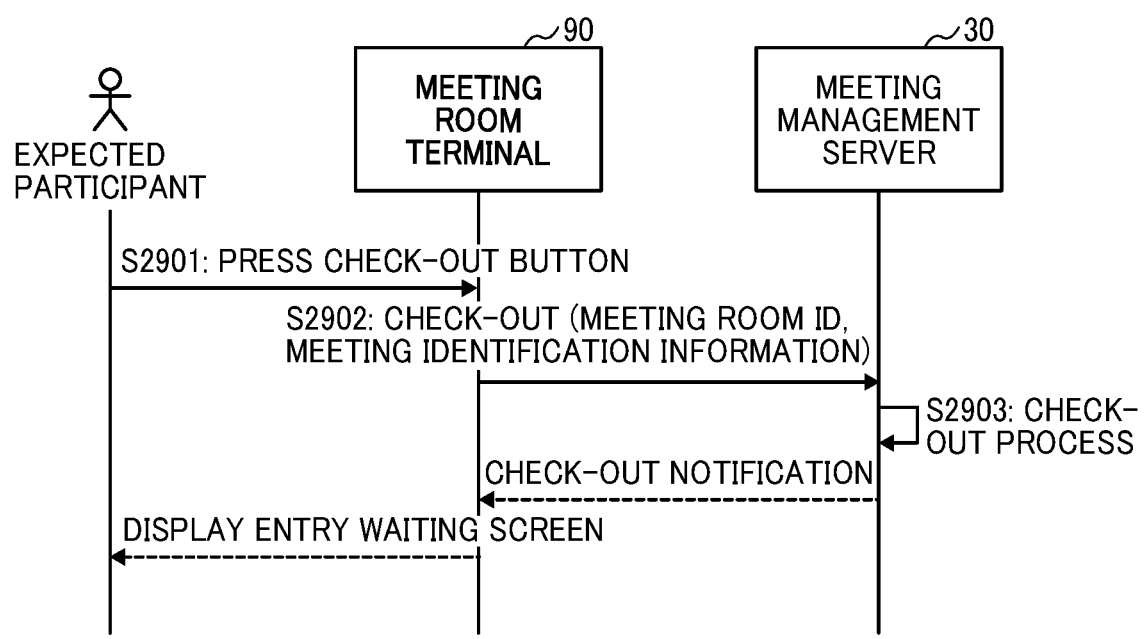
FIG. 29 is a sequence diagram illustrating an example of an operation in which a participant checks out, according to an embodiment of the present disclosure.

FIG. 29 is a sequence diagram illustrating an example of an operation of check-out.

S2901: An expected participant selects (presses) a Check-out button displayed at the meeting room terminal 90.

S2902: The operation receiving unit 93 of the meeting room terminal 90 receives the pressing of the Check-out button. The server communication unit 91 transmits, to the meeting management server 30, the meeting room ID, the meeting identification information, and a signal indicating that an instruction for checking out is received from a participant. Such signal indicating that an instruction for checking out is received from a participant can be referred to as a "check-out signal" hereinafter.

S2903: The check-in management unit 38 of the meeting management server 30 performs a check-out process. Specifically, a status indicating that a check-out has been performed is registered in the status of the meeting management information DB 493. Since the server communication unit 91 of the meeting room terminal 90 obtains the check-out status as the latest event from the meeting management server 30, the display control unit 94 of the meeting room terminal 90 displays information indicating an entry to the room is being waited. In other words, the display control unit 94 displays the entry waiting screen (check-in waiting screen).

<Processes of Activating Meeting Room Terminal 90>

Figure 30:
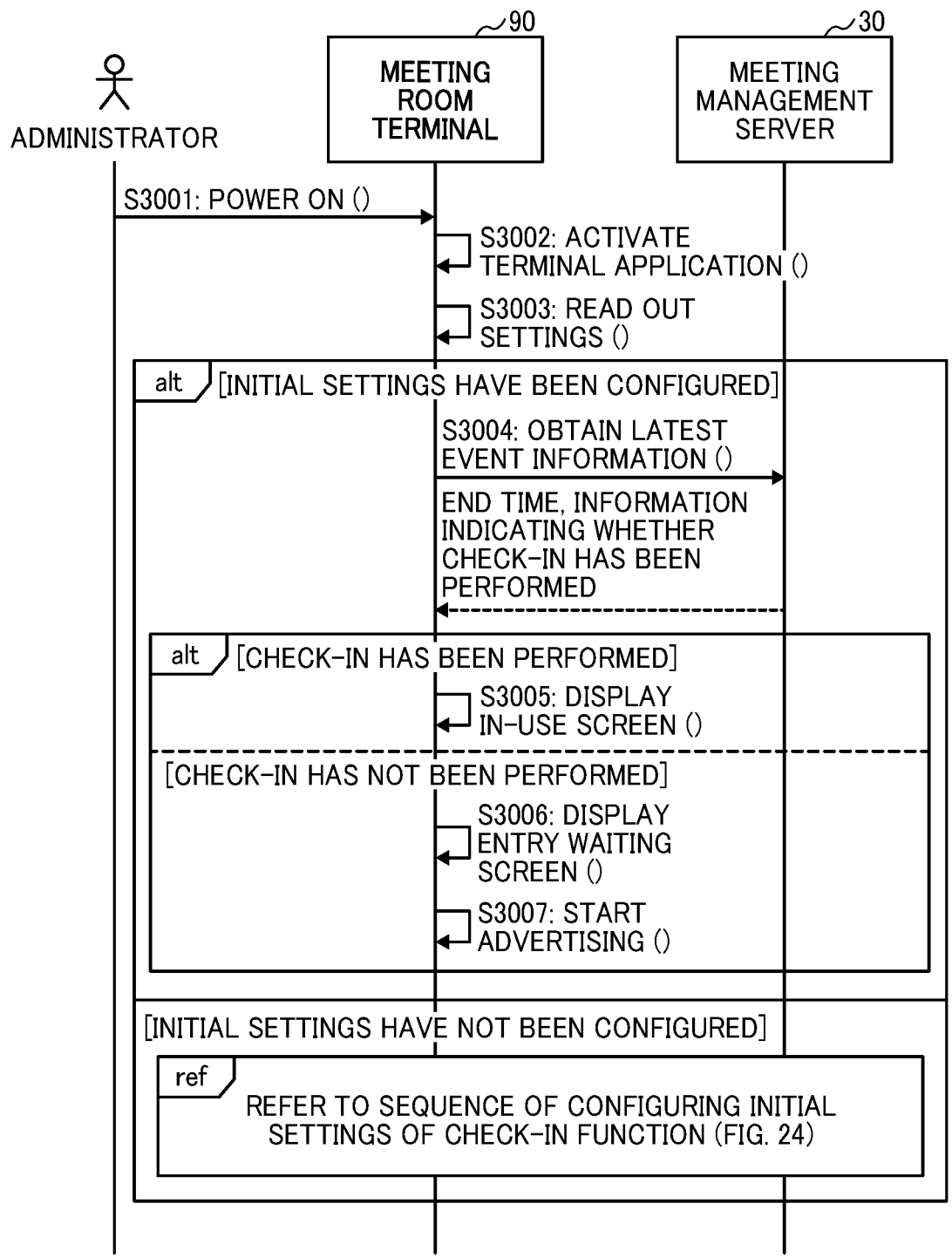
FIG. 30 is a sequence diagram for explaining an example of an operation performed when the meeting room terminal is started up, according to an embodiment of the present disclosure.

FIG. 30 is a sequence diagram for explaining an example of an operation performed when the meeting room terminal 90 is started up.

S3001: An administrator of the resource reservation system 100 turns on the power of the meeting room terminal 90.

S3002: The meeting room terminal 90 starts up and automatically activates the terminal application.

S3003: The meeting room terminal 90 loads a setting. This setting includes a URL of the meeting management server 30, the meeting room name, the meeting room ID, etc., which are configured at the initial setting process.

The following processes are executed when the initial settings have been configured.

S3004: The server communication unit 91 of the meeting room terminal 90 communicates with the meeting management server 30 to acquire the latest event. For example, the meeting management server 30 transmits, to the meeting room terminal 90, reservation information of the current time slot, information indicating whether a check-in has been performed, etc.

S3005: When the check-in has already been performed, the display control unit 94 of the meeting room terminal 90 displays information indicating that a meeting room is in use. In other words, the display control unit 94 displays the in-use screen.

S3006: When the check-in has not been performed yet, the display control unit 94 of the meeting room terminal 90 displays information indicating a time of waiting for an entry to the room. In other words, the display control unit 94 displays the entry waiting screen (check-in waiting screen).

S3007: The terminal apparatus communication unit 92 of the meeting room terminal 90 restarts advertising of BLE.

When the initial settings have not been configured yet, the initial setting process as described above with reference to 24 is executed.

<Processes by Meeting Management Server 30>

Figure 31A:
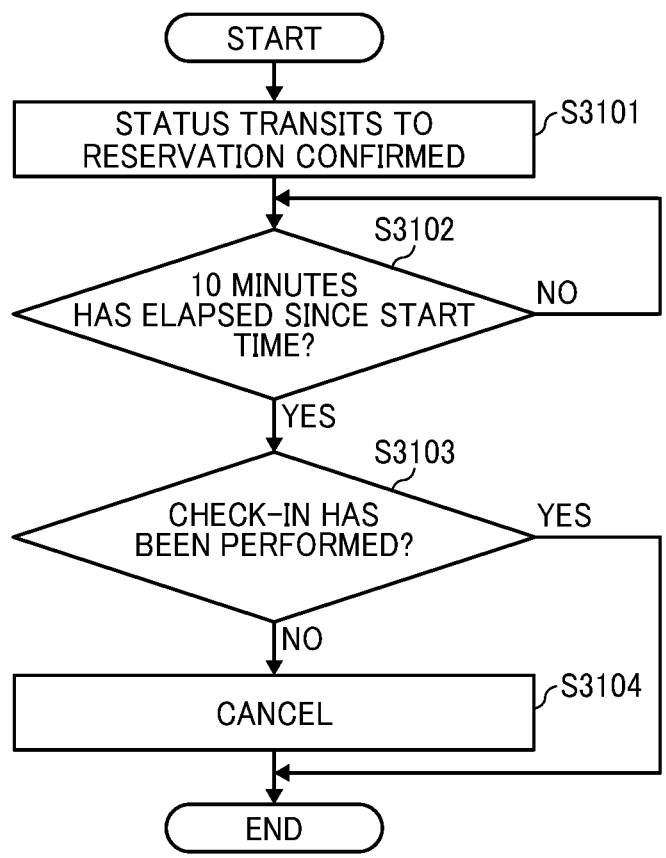
FIG. 31A is a flowchart illustrating an example of an operation, performed by the meeting management server, of automatically cancelling a reservation, according to an embodiment of the present disclosure.

FIG. 31A is a flowchart illustrating an example of an operation, performed by the meeting management server 30, of automatically cancelling a reservation.

First, as described above, in response to selection (pressing) of the "USE" button 451 by an expected participant, a status indicating that a use of a meeting room has been confirmed is registered in the status of the meeting management information DB 493.

First, the status transitions to a status indicating that a use of a meeting room is confirmed (S3101). Then, the check-in management unit 38 of the meeting management server 30 determines whether the current time matches ten or more minutes after the start time of a meeting (S3102).

When the current time matches ten or more minutes after the start time (S3102: YES), the check-in management unit 38 determines whether check-in has been performed referring to the status (S3103).

When no check-in has been performed even when ten minutes has elapsed since the start time (S3103: NO), the check-in management unit 38 cancels the reservation (S3104). Once the reservation has been cancelled, the check-in management unit 38 does not accept check-in even when the meeting identification information and the meeting room ID are transmitted afterwards. The meeting management server 30 designates the reservation ID and notifies the reservation management server 20 that the reservation has been canceled.

As a result, empty reservations can be reduced.

Figure 31B:
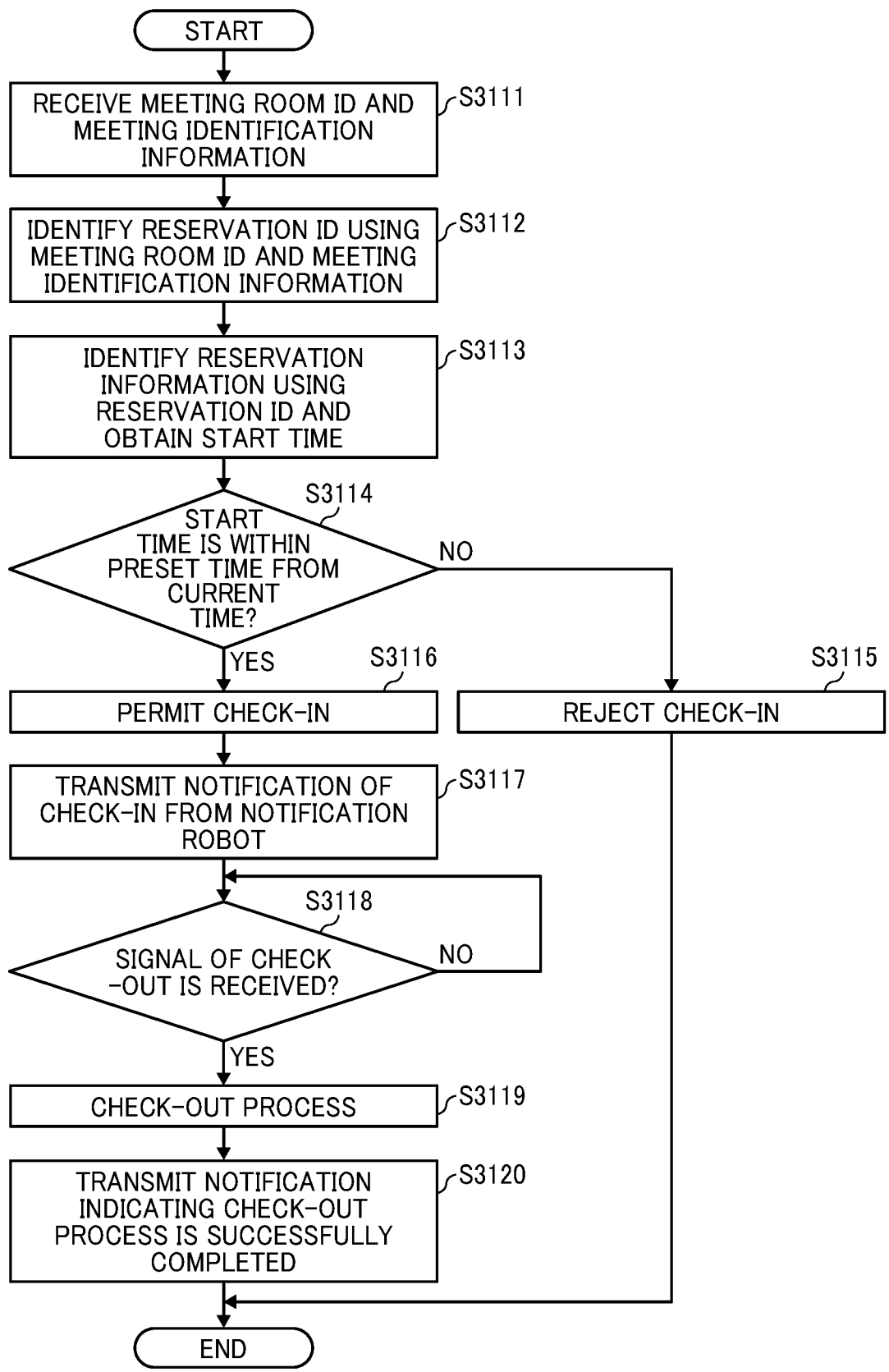
FIG. 31B is a flowchart illustrating an operation, performed by the meeting management server, of check-in and check-out, according to an embodiment of the present disclosure.

FIG. 31B is a flowchart illustrating an operation, performed by the meeting management server 30, of check-in and check-out. For example, an operation of FIG. 31B starts when a status indicating a use of a meeting room is confirmed is registered in the meeting management information DB 493.

The check-in management unit 38 of the meeting management server 30 receives a meeting room ID and meeting identification information from the meeting room terminal 90 (S3111).

The check-in management unit 38 searches the meeting identification information DB 494 using the meeting room ID and the meeting identification information to identify a reservation ID (S3112).

Next, the check-in management unit 38 identifies reservation information using the reservation ID and acquires the start time (S3113).

The check-in management unit 38 determines whether the start time is within a predetermined time period from the current time (S3114).

If the start time is not within the predetermined time period from the current time (S3114: NO), the check-in management unit 38 does not permit a check-in and sends information indicating that a check-in is not permitted to the meeting room terminal 90 (S3115).

If the start time is within the predetermined time period from the current time (S3114: YES), the check-in management unit 38 permits a check-in and sends information indicating that a check-in is permitted to the meeting room terminal 90 (S3116). Further, a status indicating that a check-in has been performed is registered in the status of the meeting management information DB 493. The meeting room terminal 90 can display information indicating that the meeting room is in use.

The meeting information notification unit 37 notifies an expected participant(s) via the notification robot that the check-in has been performed (S3117). Since the reservation ID can be identified based on the meeting identification information management information stored in the meeting identification information DB 494, a group to which the notification is to be sent is identified based on an account of a reservation-making participant in the reservation information.

Next, the check-in management unit 38 determines whether a check-out signal has been received (S3118). The check-in management unit 38 waits until receiving the check-out signal.

In response to receiving the check-out signal, the check-in management unit 38 performs a check-out process (S3119). In other words, a status indicating that a check-out has been performed is registered in the status of the meeting management information DB 493. Accordingly, any process is no more performed relating to this item of reservation information.

The check-in management unit 38 transmits information indicating that the check-out is successful to the meeting room terminal 90 (S3120). Accordingly, the meeting room terminal 90 displays information indicating a time of waiting for an entry to the room is being waited. In other words, the meeting room terminal 90 displays the entry waiting screen.

<Examples of Screens Displayed at Meeting Room Terminal 90>

Figure 32A:
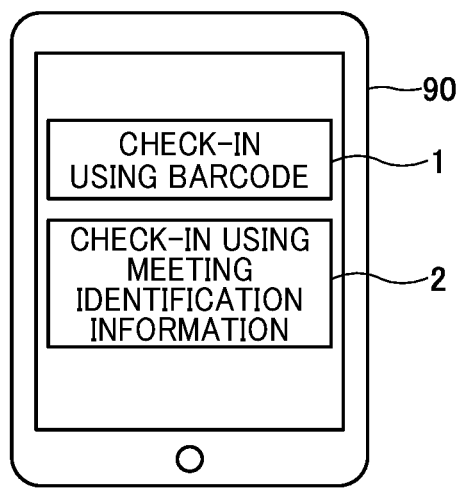
FIGS. 32A to 32C are diagrams, each illustrating an example of a screen displayed at the meeting room terminal, according to an embodiment of the present disclosure.
Figure 32B:
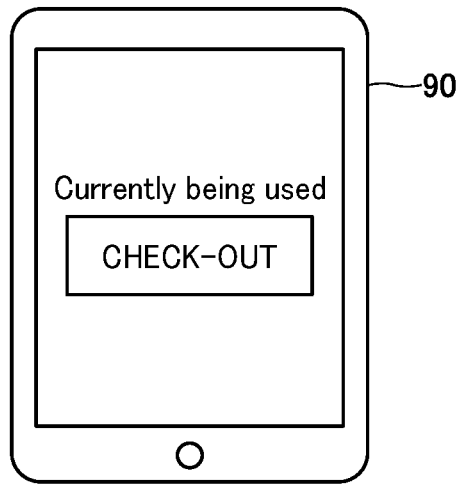
Figure 32C:
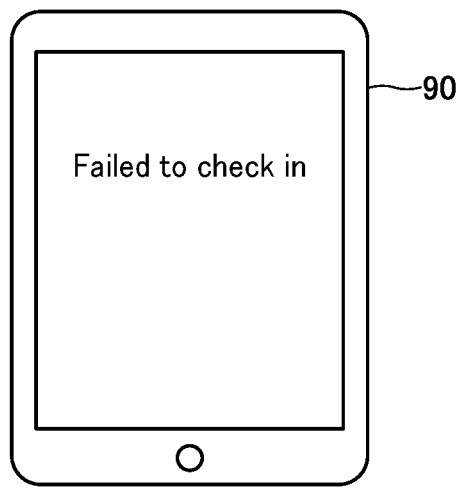

FIGS. 32A to 32C are diagrams, each illustrating an example of a screen displayed at the meeting room terminal 90. FIG. 32A illustrates an example of the entry waiting screen (check-in waiting screen). FIG. 32B illustrates an example of the in-use screen. FIG. 32C illustrates an example of an error notification screen. An expected participant selects (presses) Menu 1 in FIG. 32A to check in using two-dimensional code. On the other hand, an expected participant selects (presses) Menu 2 in FIG. 32A to check in using meeting identification information. No menu is provided for a check-in using a short-range wireless communication network, because in this case, the terminal apparatus 60 and the meeting room terminal 90 automatically communicate with each other. Once the check-in is successful, the in-use screen of FIG. 32B is displayed until check-out. After the check-out is performed, the entry waiting screen (check-in waiting screen) of FIG. 32A is displayed. When the check-in is not successful, the error notification screen of FIG. 32C is displayed, and thereafter, it automatically transitions to the entry waiting screen (check-in waiting screen) of FIG. 32A.

According to statistics, one receives a larger number of emails for promotion than emails from acquaintances. For this reason, an expected participant of a meeting sometimes overlooks a reminder email indicating that a meeting room has been reserved. Further, in order to transmit a notification indicating a reservation of a meeting room to only scheduled participants of a meeting, one needs to register participants who are to attend the meeting in the reservation management server each time he/she is going to hold a meeting. However, participants often differ depending on meetings. Thus, registering participants each time he/she is going to hold a meeting is burdensome.

<Summary>

As described heretofore, the resource reservation system 100 according to the present embodiment can notify expected participants of information about a reservation for a meeting room by using a chat system instead of an email. This enables the expected participants to confirm the information about the reservation for the meeting room. Thus, empty reservations of meeting rooms can be reduced.

<Variation>

The above-described embodiments are illustrative and do not limit the present invention. Thus, numerous additional modifications and variations are possible in light of the above teachings. For example, elements and/or features of different illustrative embodiments can be combined with each other and/or substituted for each other within the scope of the present invention. Any one of the above-described operations can be performed in various other ways, for example, in an order different from the one described above.

For example, a message as a notification is not necessarily text. In another example, a file of voice, a still image, a moving image, a program, an application, etc., can be transmitted as a notification.

Further, although in the above description of the present embodiment, the meeting management server 30 identifies expected participants using an account issued by the reservation management server 20, the meeting management server 30 can identify the expected participants using a unique account issued by the meeting management server 30, provided that the account of the reservation management server 20 and the unique account of the meeting management server 30 are associated with each other.

In alternative to or in addition to the two-dimensional code, a one-dimensional code such as a bar code can be used. Further, the two-dimensional code and the bar code are examples of an image code. Furthermore, the terminal apparatus 60 and the meeting room terminal 90 can communicate with each other using NFC, infrared communication, etc.

In alternative to or in addition to an email address, any suitable information can be used as the account, provided that it can specify or identify an expected participant. For example, a telephone number, an IP address, a media access control (MAC) address, an arbitrary ID, or the like can be used as information identifying or specifying an expected participant.

The resource reservation system 100 can include a plurality of meeting management servers 30. The meeting management server 30 can be configured as a plurality of servers to which divided functions are arbitrary allocated.

In addition, the functional configuration of the resource reservation system 100 are divided into the functional blocks as illustrated in FIG. 8 and FIGS. 9A and 9B, for example, based on main functions thereof, in order to facilitate understanding the processes performed by the resource reservation system 100. No limitation is intended by how the processes are divided or by the name of the processes. The processes implemented by the resource reservation system 100 can be divided to a larger number of processes depending on the contents of processes. Further, one process can be divided to include a larger number of processes.

Embodiment 2

In the present embodiment (embodiment 2), a description is given of the resource reservation system 100 configured to control the electronic device 70 provided in a meeting room. Specifically, a description is given of an operation of controlling the electronic device 70, performed by the meeting management server 30 and the meeting room terminal 90.

<Control of Electronic Device 70>

Figure 33:
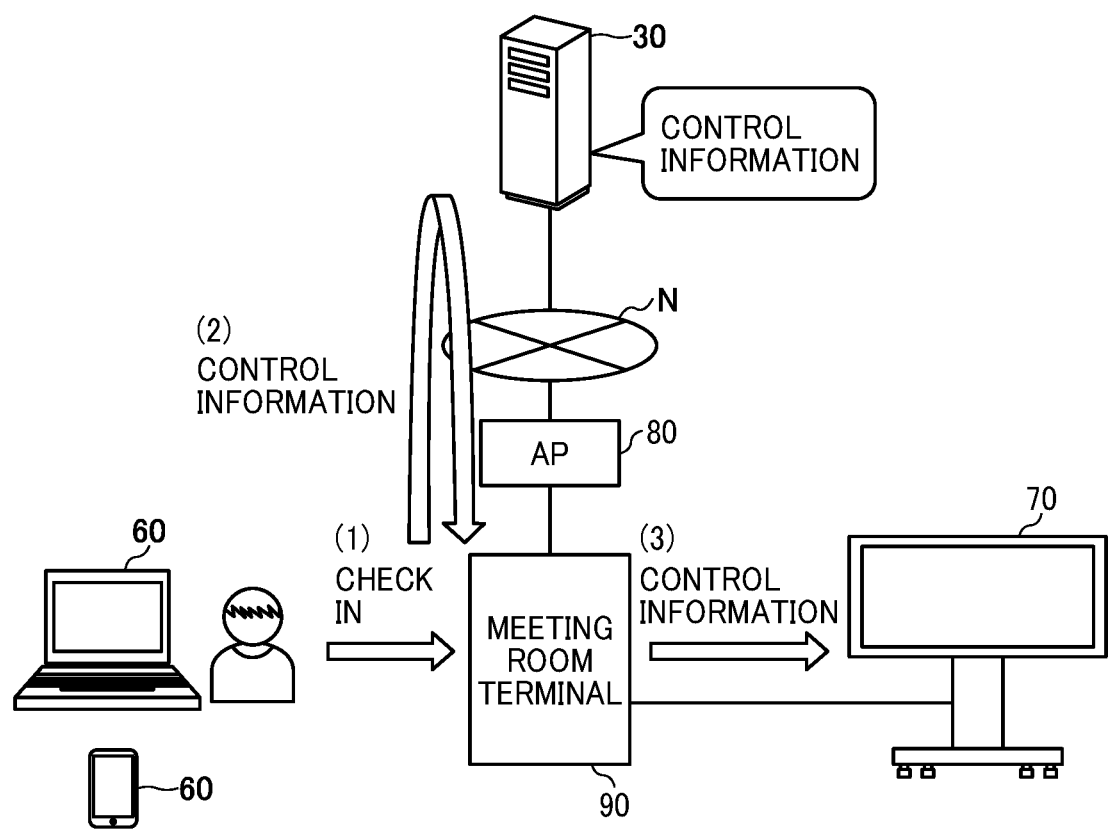
FIG. 33 is an illustration for explaining an overview of control by the resource reservation system of the electronic device provided in a meeting room, according to an embodiment of the present disclosure.
Figure 34:
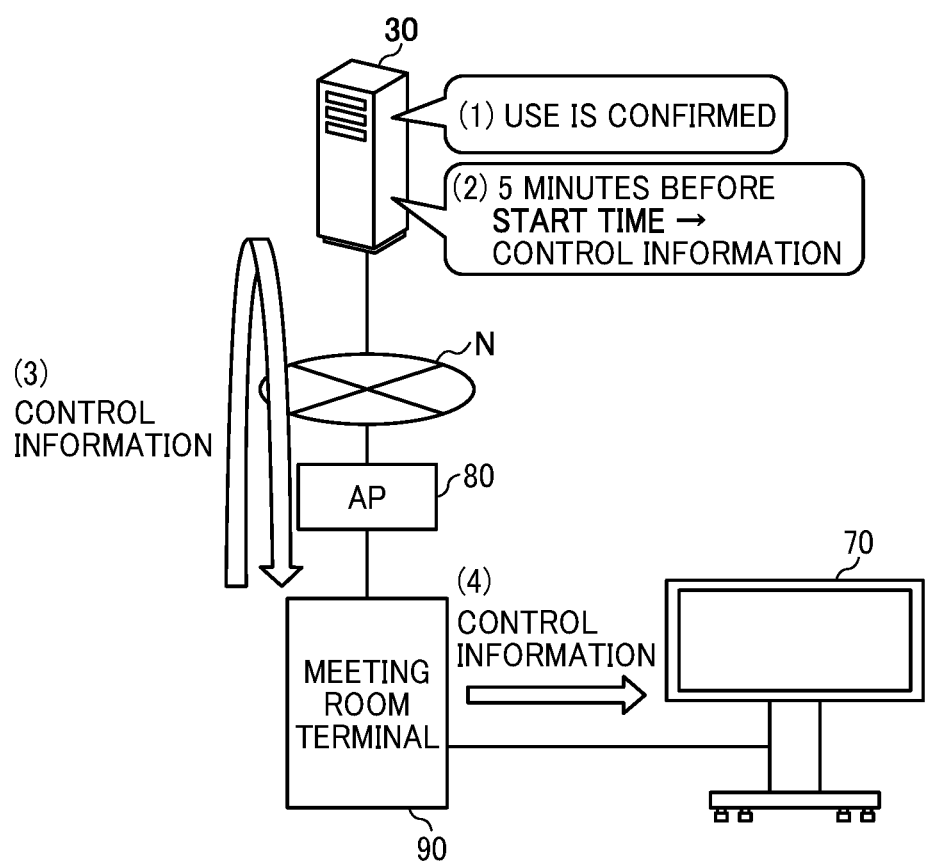
FIG. 34 is an illustration for explaining an overview of control by the resource reservation system of the electronic device provided in a meeting room, according to an embodiment of the present disclosure.

FIGS. 33 and FIG. 34 are illustrations for explaining an overview of control by the resource reservation system 100 of the electronic device 70 provided in a meeting room. In the present embodiment, a description is given of an example in which the power of the electronic device 70 is turned on. More specifically, FIG. 33 illustrate a case 1 in which the power of the electronic device 70 is turned on in response to a check-in to the meeting room terminal 90. FIG. 34 illustrates a case 2 in which the power of the electronic device 70 is turned on a predetermined time period before the start time. As for the case 1, since a start time of meeting is taken into consideration when determining whether to permit check-in as described in the above Embodiment 1, the power of the electronic device 70 is turned on by detecting a timing at which the electronic device 70 provided in the meeting room 6 is started to be used based on the reservation information. Since a start time of meeting is used in the case 2, the power of the electronic device 70 is turned on by detecting a timing at which the electronic device 70 provided in the meeting room 6 is started to be used based on the reservation information.

<<Turning Power On In Response to Check-In>>

A description is given hereinafter of the case 1 illustrated in FIG. 33.

(1) As described in the above Embodiment 1, an expected participant checks in to the meeting room terminal 90 using the terminal apparatus 60.

(2) In response to obtaining a response indicating permission of the check-in from the meeting management server 30, the meeting room terminal 90 requests the meeting management server 30 for control information. A reason why the request is transmitted from the meeting room terminal 90 to the meeting management server 30 is the meeting room terminal 90 resides on the intra-company network N1. In addition, obtaining the control information together with the response indicating permission of the check-in can reduce a communication load.

There are several examples as to which items of information is to be included in the control information.

EXAMPLE 1

Information on the electronic device 70 provided in the meeting room 6 has been set in the meeting room terminal 90. Examples of the information that has been set in the meeting room terminal 90 include connection destination information such as an IP address of each electronic device, authentication information, and an interface for turning the power on or off (e.g., an application programming interface (API) to issue an ON/OFF command via a network). Information indicating a time when the power is to be turned on or off, information indicating whether a videoconference system is to be used, and connection destination information (e.g., a connection destination ID) of the videoconference system are transmitted as the control information. In this example, information of each meeting room need not to be registered to the meeting management server 30.

EXAMPLE 2

Information to be transmitted as the control information includes information indicating a time at which the power is to be turned on and off (i.e., the start time and end time of a meeting), information on a device provided in a meeting room (connection destination information such as an IP and address of each device, authentication information, an interface for turning the power on or off (API), information indicating whether a videoconference system is to be used, and connection destination information (e.g., a connection destination ID) of a videoconference terminal. In this example, the meeting management server 30 manages these items of information. Accordingly, for example, when the meeting room terminal 90 does not store the interface for turning on or off the power in advance, settings for each meeting room terminal 90 can be reduced.

(3) The meeting room terminal 90 transmits the control information obtained from the meeting management server 30 to the electronic device 70 to control the electronic device 70. When the transmitted control information is control information for turning on the power, the electronic device 70 is activated. Accordingly, the expected participant can use the electronic device 70 immediately by checking in. The electronic device 70 is not activated unless the power is turned on in accordance with the control information from the meeting management server 30. Accordingly, it is possible to prevent the electronic device 70 from being used by any person other than the expected participants, such as a person who does not have the right to check in the meeting room. Therefore, the resource reservation system 100 can manage the use of the electronic device 70, without leaving the use of the device to the participant.

<<Turning Power on Predetermined Time Period before Start Time>>

A description is given hereinafter of the case 2 illustrated in FIG. 34.

(1) As described above in the Embodiment 1, when an expected participant sends a reply indicating "USE" to information about a reservation for a meeting room, a status indicating that the use of the meeting room is confirmed is registered in the status of the meeting management information DB 493.

(2) When the current time reaches a predetermined time period before the start time (e.g., five to ten minutes before the start time), the meeting management server 30 generates control information for turning on the power of the electronic device 70.

(3) The meeting room terminal 90 periodically transmits an inquiry to the meeting management server 30 for the presence or absence of the control information. Accordingly, the meeting room terminal 90 can obtain the control information in response to such inquiry made after the generation of the control information. In another example, the meeting management server 30 can generate the control information in response to an inquiry.

(4) The meeting room terminal 90 transmits the control information obtained from the meeting management server 30 to the electronic device 70 to control the electronic device 70. In a case where the transmitted control information is control information for turning on the power, the electronic device 70 is activated. This means that the electronic device 70 is activated before the expected participant checks in. Accordingly, the expected participant can use the electronic device 70 immediately after the check-in. The electronic device 70 is not activated unless the power is turned on in accordance with the control information from the meeting management server 30. Accordingly, it is possible to prevent the electronic device 70 from being used by any person other than the expected participants, such as a person who does not have the right to check in the meeting room. Therefore, the resource reservation system 100 can manage the use of the electronic device 70, without leaving the use of the device to the participant.

<Terms Used in the Disclosure>

A description that a resource terminal communicates with a terminal apparatus of a user of a resource means that the user arrives at the resource or the user indicates his or her intention to use the resource. In the present embodiment, a term "check-in" is used.

A termination of a use of a resource means that a user leaves the resource or the user indicates his or her intention to leave the resource. In the present embodiment, the term "check-out" is used.

<About System Configuration, etc.>

A system configuration, a hardware configuration, and functional blocks of the present embodiment are the same of substantially the same as those of the Embodiment 1. Alternatively, the system configuration, the hardware configuration, and the functional blocks of the present embodiment can be different from those of Embodiment 1, a description of the present embodiment is given under the assumption that such differences are insignificant. In the present disclosure, the same reference numbers are allocated to the hardware element or functional elements implementing the same functions, and redundant descriptions can be omitted. A description can be given only of differences.

<Operations>

Figure 35:
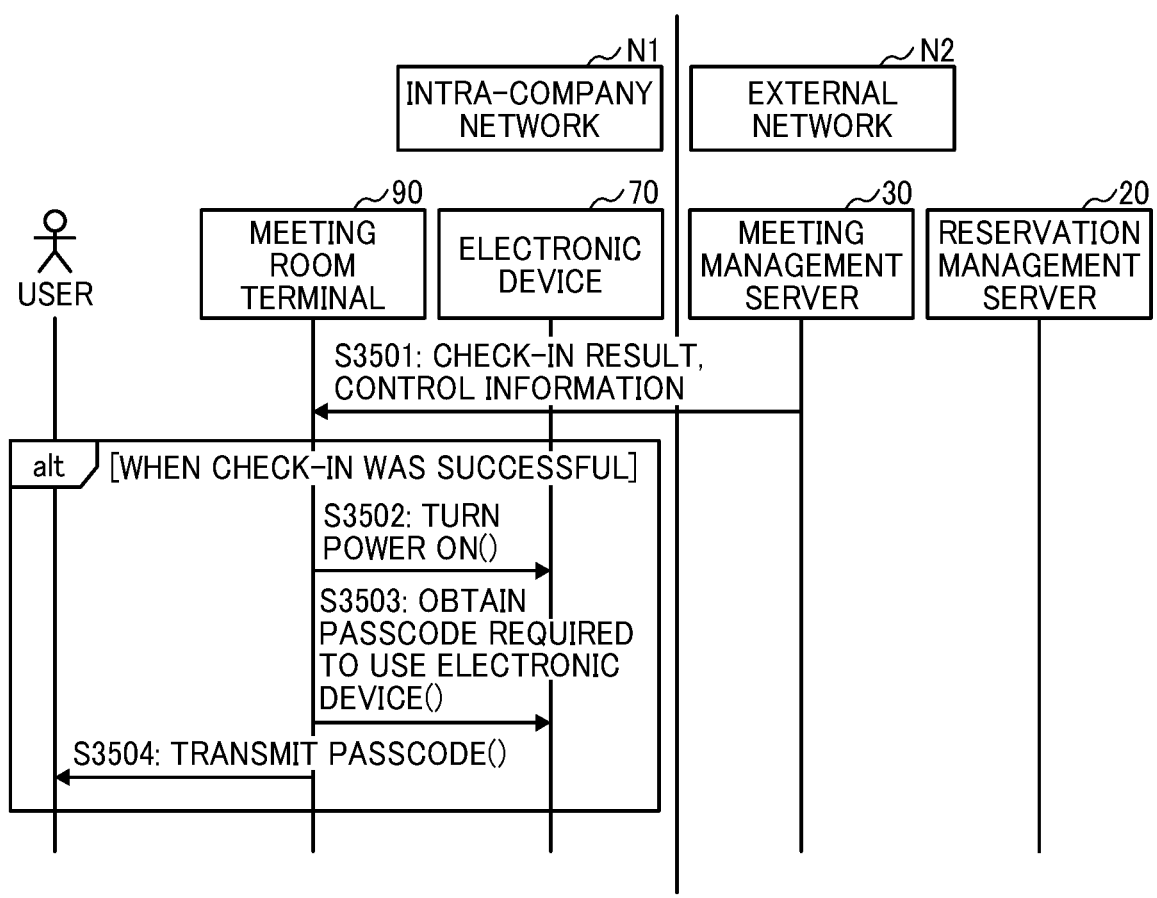
FIG. 35 is a sequence diagram illustrating an example of an operation, by the meeting management server, controlling the power of the electronic device to be on in response to a check-in, according to an embodiment of the present disclosure.

FIG. 35 is a sequence diagram illustrating an example of an operation of turning on the power of the electronic device 70 in response to a check-in according to the control information from the meeting management server 30.

S3501: As described in Embodiment 1, a check-in result (information indicating whether a check-in is permitted or denied) is transmitted from the meeting management server 30. In FIG. 35, control information is transmitted together with the result indicating that the check-in is permitted. Since the meeting management server 30 communicates beyond the firewall, this transmission is performed in response to receiving a request for check-in.

S3502: The server communication unit 91 of the meeting room terminal 90 receives the check-in result indicating the check-in is permitted and the control information. When the check-in is successful, the electronic device communication unit 95 of the meeting room terminal 90 transmits the control information to the electronic device 70.

S3503: The electronic device communication unit 95 of the meeting room terminal 90 obtains, from the electronic device 70, a pass code required for use of the electronic device 70. The pass code is authentication information for the terminal apparatus 60 to transmit video to the electronic device 70. Since the passcode is generated each time the electronic device 70 is activated, it is possible to prevent a participant who is attending a meeting in a different meeting room from transmitting video wirelessly, for example.

S3504: The terminal apparatus communication unit 92 of the meeting room terminal 90 notifies the terminal apparatus 60 of the passcode. This notification can be implemented in several ways. For example, the passcode can be transmitted using BLE. In another example, the passcode can be transmitted using infrared communication, NFC, etc. In still another example, the passcode can be displayed on the display 616 of the meeting room terminal 90. In response to acquiring the passcode, the terminal apparatus 60 can transmit video to the electronic device 70, and the video is shared by the participants. Thus, an expected participant can turn on the power of the electronic device 70 by checking in a meeting room, and the terminal apparatus 60 can transmit video to the electronic device 70.

When the power of the electronic device 70 has been already turned on, the power of the electronic device 70 is kept turned on.

Figure 36:
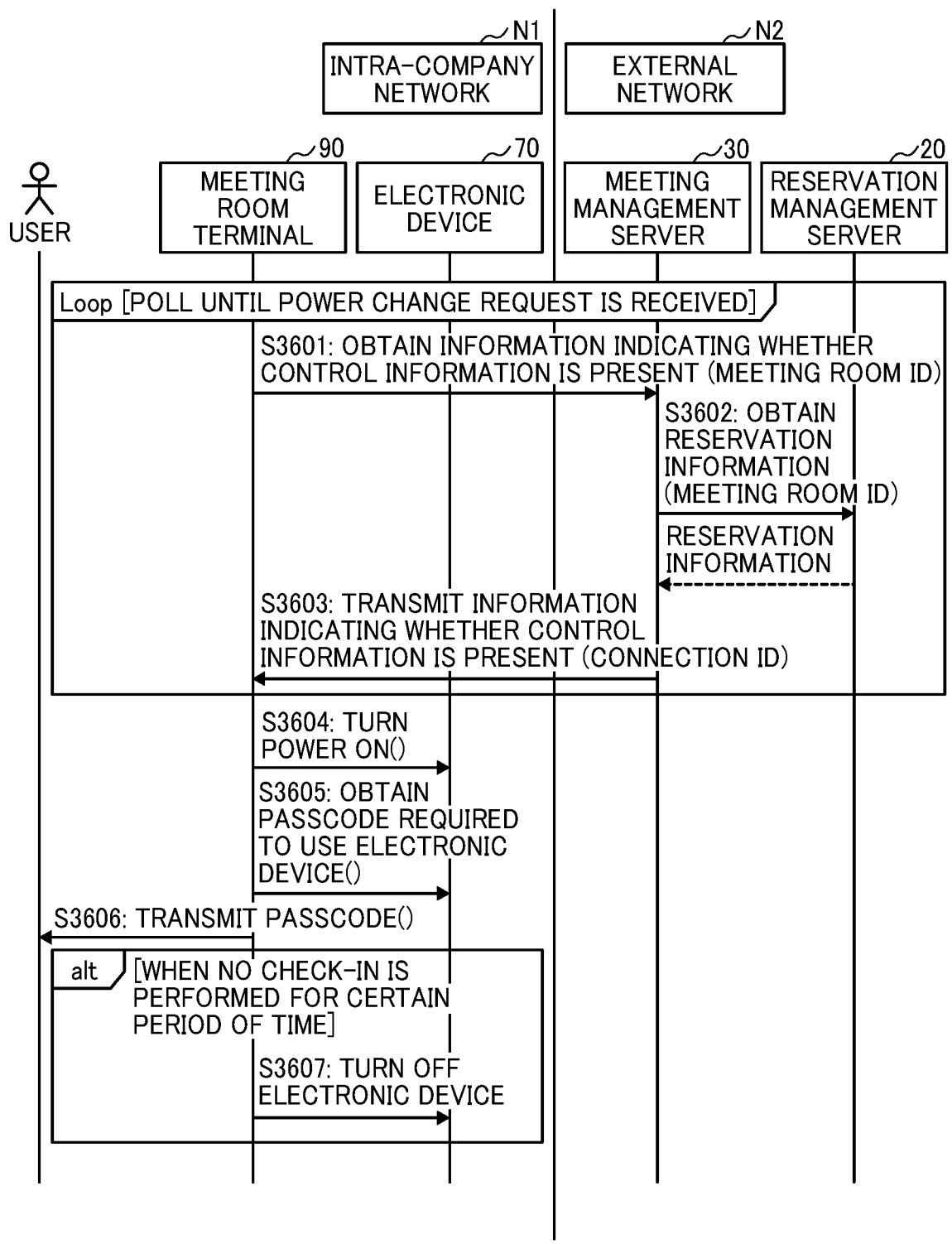
FIG. 36 is a sequence diagram illustrating an example of an operation, by the meeting management server, of controlling the power of the electronic device to be on a predetermined time period before a start time, according to an embodiment of the present disclosure.

FIG. 36 is a sequence diagram illustrating an example of an operation of turning on the power of the electronic device 70 a predetermined time period before the start time in accordance with control information from the meeting management server 30.

S3601: The server communication unit 91 of the meeting room terminal 90 acquires a meeting room ID and the presence or absence of control information from the meeting management server 30. Since an access from the external network N2 to the intra-company network N1 is difficult due to a firewall, the server communication unit 91 of the meeting room terminal 90 polls the meeting management server 30. In other words, the server communication unit 91 periodically transmits an inquiry to the meeting management server 30 for the meeting room ID and the presence or absence of the control information. Communication technology such as WebSocket can be used.

S3602: The communication unit 31 of the meeting management server 30 acquires reservation information from the reservation management server 20 using the meeting room ID as a key. When the latest reservation information is already acquired, this step S3602 can be omitted. In other words, the reservation information cannot be acquired at the timing of the polling by the meeting room terminal 90. The control information generator 35 of the meeting management server 30 determines whether control information is to be generated. Based on the determination that control information is to be generated, the control information generator 35 generates control information. Specifically, the control information generator 35 determines whether the current time is a predetermined time period before the start time. When the reservation information is acquired in advance, the control information generator 35 generates control information in advance. In this case, the control information generator 35 does not generate control information at the timing of polling. Although the meeting identification information is not taken into consideration in this operation, the meeting identification information is taken into consideration at the time of check-in, and since the power of the electronic device 70 is turned off if the check-in is not performed, there is little trouble.

S3603: The meeting management server 30 transmits, to the meeting room terminal 90, information indicating the presence or absence of control information. Further, when control information is present, the meeting management server 30 transmits the control information. At this step S3603, the communication unit 31 of the meeting management server 30 can transmit a connection ID. When the connection ID of the electronic device 70 provided at a different site is set in the reservation information, by transmitting the connection ID together with the reservation information, the connection ID is transmitted to the electronic device 70 after a check-in by participant. The electronic device 70 can automatically connect to the electronic device 70 provided at a different site using the connection ID and start a remote meeting. Therefore, there is a case that the connection ID is not transmitted at the time of check-in by a participant as described above with reference to FIGS. 28A and 28B.

The processes of steps S3604 to S3606 are executed in substantially the same manner as steps S3502 to S3504 of FIG. 35. Therefore, an expected participant can use the electronic device 70 immediately after the check-in.

S3607: However, the power of the electronic device 70 will remain on even when an expected participant does not check in. To address this issue, the electronic device communication unit 95 of the meeting room terminal 90 turns off the power of the electronic device 70 when no information indicating that a check-in is permitted is received from the meeting management server 30 within a predetermined time from when the power of the electronic device 70 is turned on. Thus, power consumption can be reduced.

<Control to Turn off Power>

Figure 37:
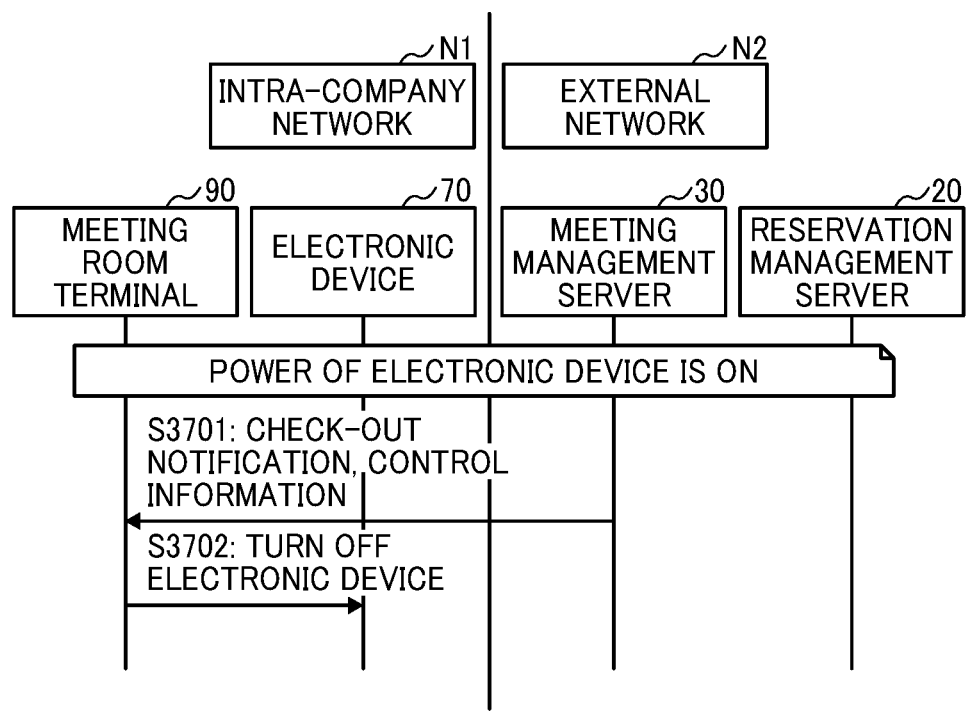
FIG. 37 is a sequence diagram illustrating an example of an operation, by the meeting room terminal, of controlling the power of the electronic device to be off after a check-out, according to an embodiment of the present disclosure.

FIG. 37 is a sequence diagram illustrating an example of an operation of turning off the power of the electronic device 70 after a check-out in accordance with control information from the meeting room terminal 90.

S3701: As described above in Embodiment 1, the server communication unit 91 of the meeting room terminal 90 obtains a check-out notification and control information from the meeting management server 30. This notification and the control information is obtained in response to a request for a check-out made by the meeting room terminal 90.

S3702: The electronic device communication unit 95 of the meeting room terminal 90 transmits the control information for tuning off the power to the electronic device 70.

Accordingly, the power of the electronic device 70 is turned off even when a participant does not turn off the power. Thus, the power consumption can be reduced. In another example, the meeting room terminal 90 can request the meeting management server 30 for control information in response to receiving the check-out notification. Although the check-out notification can also serve as the control information for turning off the power of the electronic device 70, by separately transmitting the check-out notification and the control information, the electronic device 70 is prevented from being turned off at the time of check-out in a case where the next meeting will start immediately. A detailed description is given later.

<Operation by Meeting Management Server 30 and Meeting Room Terminal 90 of Turning on Power of Electronic Device 70 in response to Check-In>

Figure 38C:
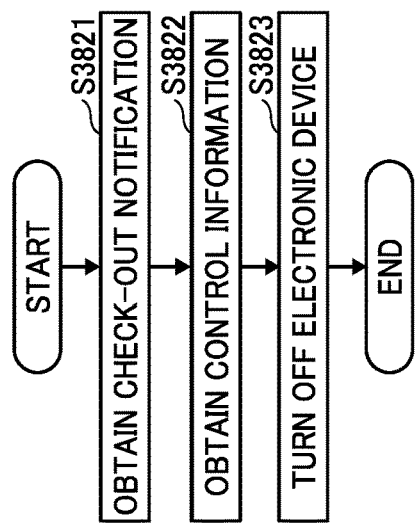
FIGS. 38A to 38C are diagrams for describing operations, performed by the meeting management server and the meeting room terminal, of controlling to turn on the power of the electronic device in response to a check-in, according to an embodiment of the present disclosure.
Figure 38B:
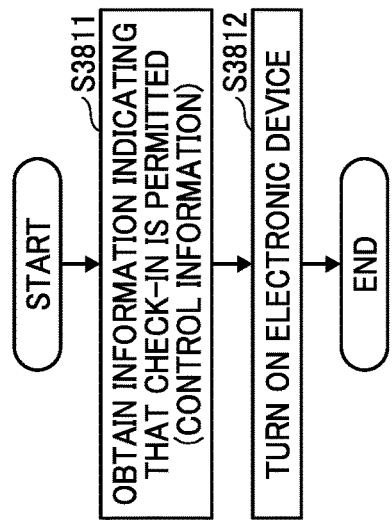
Figure 38A:
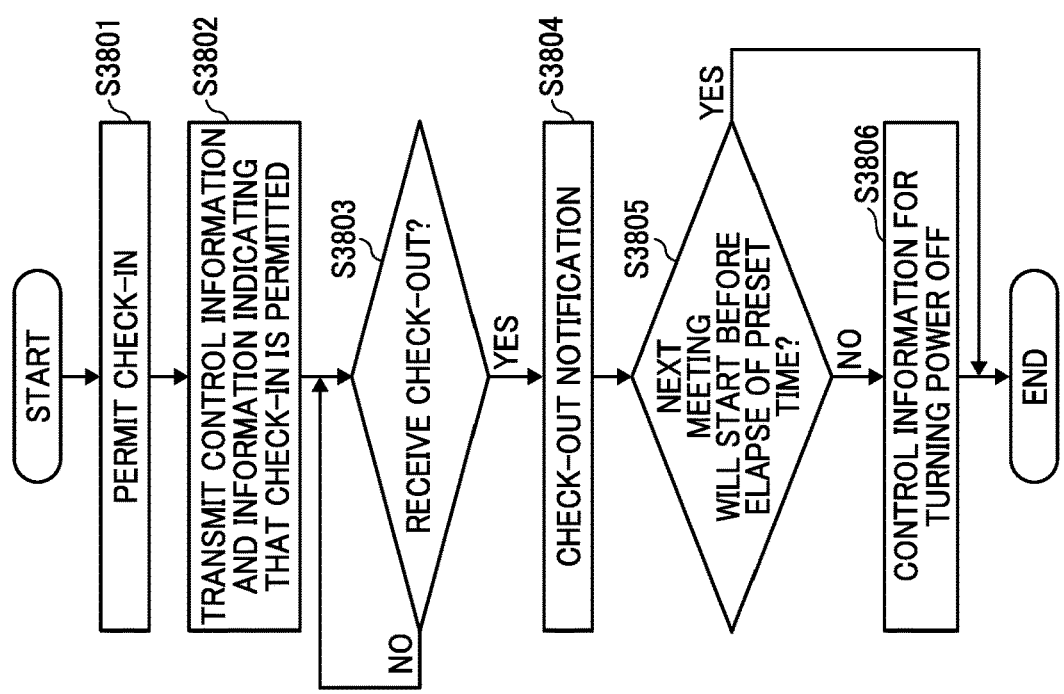

FIGS. 38A to 38C are diagrams for describing operations, performed by the meeting management server 30 and the meeting room terminal 90, of controlling to turn on the power of the electronic device 70 in response to a check-in.

FIG. 38A is a flowchart illustrating an example of an operation, performed by the meeting management server 30, of transmitting control information in response to check-in.

First, the check-in management unit 38 of the meeting management server 30 permits check-in (S3801).

The check-in management unit 38 transmits information indicating that the check-in is permitted to the meeting room terminal 90. The control information response unit 36 transmits control information to the meeting room terminal 90 (S3802). In another example, the information indicating that the check-in is permitted and the control information can be transmitted separately (at different timings). In still another example, the information indicating that the check-in is permitted can also serve as the control information.

When the electronic device 70 provided in a meeting room includes a videoconference terminal, this control information can contain a connection destination ID of the videoconference terminal. Specifically, when the reservation management server 20 accepts an input of the connection destination ID at the same time when accepting a reservation of a meeting room, as illustrated in FIG. 10, the connection destination ID can be identified based on the reservation information. In such case, the meeting management server 30 can transmit this connection destination included in the control information.

Next, the check-in management unit 38 determines whether a check-out signal is received (S3803). The check-in management unit 38 waits until the check-out signal is received. However, when a predetermined time has elapsed from the end time of the meeting, the check-in management unit 38 determines that the check-out signal is received. This is because a participant can leave the meeting room without performing the check-out operation.

When the check-in management unit 38 determines that the check-in signal is received (S3803: YES), the check-in management unit 38 transmits a check-out notification to the meeting room terminal 90 (S3804).

Next, the control information generator 35 determines whether the start time of the next meeting is within a predetermined time from the current time (S3805). This prevents the power of the electronic device 70 from being turned off and then turned on during a short time.

When the control information generator 35 determines that the start time of the next meeting is not within a predetermined time from the current time (S3805: NO), the control information generator 35 generates control information for turning off the power. Further, the control information response unit 36 transmits the generated control information to the meeting management server 30 (S3806).

When the control information generator 35 determines that the start time of the next meeting is within a predetermined time from the current time (S3805: YES), the control information generator 35 generates no control information for turning off the power.

FIG. 38B is a flowchart illustrating an example of an operation, performed by the meeting room terminal 90, of turning on the power of the electronic device 70 in response to check-in.

First, the server communication unit 91 of the meeting room terminal 90 obtains information indicating that a check-in is permitted (S3811). The server communication unit 91 can obtain control information in addition to the information indicating that a check-in is permitted. Since the server communication unit 91 obtains the information indicating that a check-in is permitted and the control information as a response to a check-in request, the meeting room terminal 90 does not need to perform polling.

In response to receiving the information indicating that a check-in is permitted or the control information, the electronic device communication unit 95 of the meeting room terminal 90 controls the power of the electronic device 70 to be on (S3812).

In a case where the control information contains a connection destination ID of the videoconference terminal, the meeting room terminal 90 can issue a request for connecting to the connection destination ID, after issuing the instruction for turning on the power of the electronic device 70. Further, to control the power to on, the meeting room terminal 90 performs control via a network using a specific interface and connection destination information such as an IP address identifying the electronic device 70.

FIG. 38C is a flowchart illustrating an example of an operation, performed by the meeting room terminal 90, of turning off the power of the electronic device 70 in response to check-out.

First, the server communication unit 91 of the meeting room terminal 90 acquires a check-out notification (S3821). Since the server communication unit 91 obtains the check-out notification information as a response to a check-out request, the meeting room terminal 90 does not need to perform polling.

Next, the server communication unit 91 of the meeting room terminal 90 obtains control information (S3822). When the start time of the next meeting is within a predetermined time from the current time, the control information is not transmitted. Since the server communication unit 91 obtains the control information as a response to a check-out request, the meeting room terminal 90 does not need to perform polling.

In response to receiving the control information, the electronic device communication unit 95 of the meeting room terminal 90 controls the power of the electronic device 70 to be off (S3823).

In substantially the same manner when controlling the power to be on, to control the power to be off, the meeting room terminal 90 performs control via a network using a specific interface and connection destination information such as an IP address identifying the electronic device 70.

<Operation by Meeting Management Server 30 and Meeting Room Terminal 90 for Turning on Power of Electronic Device 70 Predetermined Time before Start Time>

Figure 39:
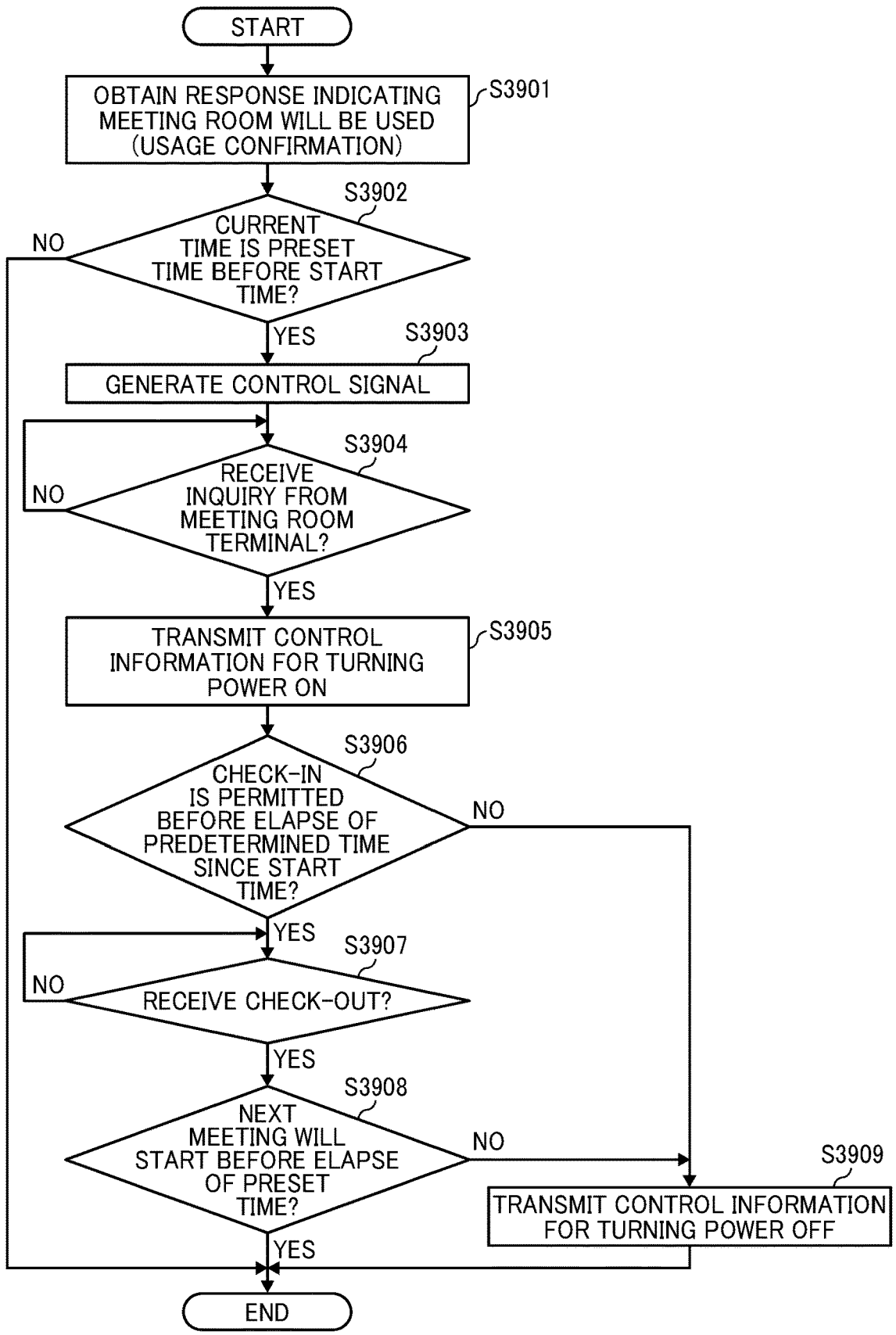
FIG. 39 is a flowchart illustrating an example of an operation, performed by the meeting management server, of transmitting control information a predetermined time period before the start time, according to an embodiment of the present disclosure.

FIG. 39 is a flowchart illustrating an example of an operation, performed by the meeting management server 30, of transmitting control information a predetermined time period before the start time.

The meeting information notification unit 37 of the meeting management server 30 obtains a response confirming use of a meeting room from the terminal apparatus 60 (S3901). Accordingly, a status indicating that a use of the meeting room has been confirmed is registered in the status of the meeting management information DB 493.

The control information generator 35 of the meeting management server 30 determines whether the current time is a predetermined time period before the start time set in the reservation information (S3902).

When the control information generator 35 determines that the current time is a predetermined time period before the start time (S3902: YES), the control information generator 35 of the meeting management server 30 generates control information and registers the generated control information in the control information DB 497 (S3903).

Thereafter, the control information response unit 36 of the meeting management server 30 determines whether an inquiry about the presence or absence of control information is received from the meeting room terminal 90 (S3904). This inquiry includes a meeting room ID. Accordingly, the control information response unit 36 determines that the control information to be transmitted as a response to the inquiry is present, based on a determination that control information associated with the meeting room ID is stored in the control information DB 497.

When the control information response unit 36 determines that the inquiry about the presence or absence of control information is received (S3904: YES), the control information response unit 36 transmits the control information for turning on the power to the meeting room terminal 90 (S3905).

Thereafter, the control information generator 35 of the meeting management server 30 determines whether a check-in is permitted to the meeting room terminal 90 (S3906). This is because the power is kept on even when an expected participant does not check in. In a case where the check-in is not permitted within a predetermined time period (e.g., 10 minutes) after the start time, the control information generator 35 of the meeting management server 30 transmits control information for turning off the power. This predetermined time period can be equal to the time period based on which a reservation is automatically canceled if an expected participant does not check in.

When the control information generator 35 of the meeting management server 30 determines that a check-in is not permitted to the meeting room terminal 90 (S3906: NO), the control information generator 35 generates control information for turning off the power. Further, the control information response unit 36 transmits the generated control information to the meeting room terminal 90 (S3909).

When the control information generator 35 of the meeting management server 30 determines that a check-in is permitted to the meeting room terminal 90 (S3906: YES), the control information generator 35 determines whether a check-out is accepted (S3907).

When the check-out is received, the control information generator 35 determines whether the start time of the next meeting is within a predetermined time period from the current time (S3908). This prevents the power of the electronic device 70 from being turned off and then turned on during a short time.

When the control information generator 35 determines whether the start time of the next meeting is not within a predetermined time period from the current time (S3908: NO), the control information generator generates control information for turning off the power. Further, the control information response unit 36 transmits the generated control information to the meeting room terminal 90 (S3909).

Figure 40:
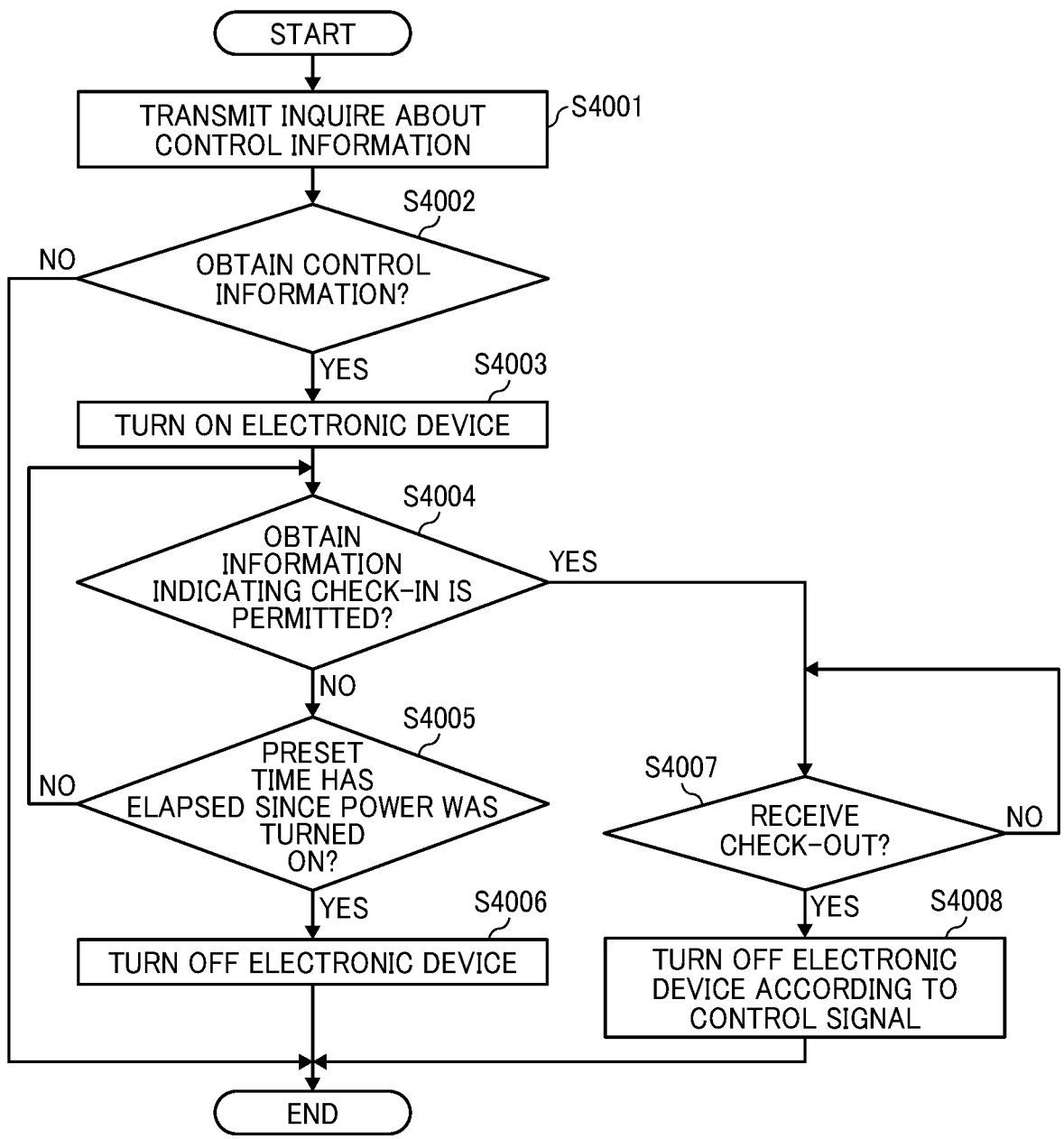
FIG. 40 is a flowchart illustrating an example of an operation, performed by the meeting room terminal, of controlling the power of the electronic device to be on a predetermined time period before the start time, according to an embodiment of the present disclosure.

FIG. 40 is a flowchart illustrating an example of an operation, performed by the meeting room terminal 90, of controlling the power of the electronic device 70 to be on a predetermined time period before the start time.

First, the server communication unit 91 of the meeting room terminal 90 transmits an inquiry to the meeting management server 30 for a meeting room ID and the presence or absence of control information (S4001).

The electronic device communication unit 95 of the meeting room terminal 90 determines whether control information is received (S4002). When no control is received (S4002: NO), the operation of FIG. 40 ends.

When control information is received (S4002: YES), the electronic device communication unit 95 controls the power of the electronic device 70 to be off (S4003).

Next, the electronic device communication unit 95 determines whether an expected participant checks in and information indicating that the check-in is permitted is obtained from the meeting management server 30 (S4004).

When the server communication unit 91 of the meeting room terminal 90 obtains information indicating that the check-in is permitted (S4004: YES), the electronic device communication unit 95 determines whether a check-out notification is obtained from the meeting management server 30 (S4007). When no check-out notification is received (S4007: NO), the meeting room terminal 90 waits until a check-out notification is received.

When a check-out notification is received (S4007: YES), the electronic device communication unit 95 controls the power of the electronic device 70 to be off in response to receiving control information indicating that the power is to be turned off (S4008).

When the server communication unit 91 of the meeting room terminal 90 does not obtain information indicating that the check-in is permitted (S4004: NO), the electronic device communication unit 95 determines whether a predetermined time period has elapsed since the power of the electronic device 70 was turned on (S4005). When the electronic device communication unit 95 determines that a predetermined time period has not elapsed since the power of the electronic device 70 was turned on (S4005: NO), the determination in step 54004 is repeated.

When the electronic device communication unit 95 determines that a predetermined time period has elapsed since the power of the electronic device 70 was turned on (S4005: YES), the electronic device communication unit 95 controls the power of the electronic device 70 to be off, since an expected participant does not check in (S4006).

<Summary>

In a meeting room, electronic devices such as an electronic whiteboard, a multifunction peripheral, or a projector are provided, and used by participants during a meeting. Participant who are going to use one or more of these electronic devices need to turn on the power of the device. It takes time for some of the participants to start up the electronic device. Further, if the power of the electronic device can be turned on and off freely before the start time of a meeting, a person who does not reserve the meeting room can also use the electronic device. In addition, when participants forget to turn off the power, the power consumption increases.

With the operations as described above, the resource reservation system 100 can turn on and off the power of the electronic device 70, and can manage the use of the electronic device 70 provided in a meeting room. Therefore, an expected participant can use the electronic device 70 immediately after the check-in. The electronic device 70 is not activated unless the power is turned on in accordance with the control information from the meeting management server 30. Accordingly, it is possible to prevent the electronic device 70 from being used by any person other than the expected participants, such as a person who does not have the right to check in the meeting room. Further, since the power of the electronic device 70 is automatically turned off in response to a check-out, power consumption can be reduced.

According to one or more embodiments of the present disclosure, an information processing apparatus is provided that reduces empty reservations of resources such as a meeting room.

According to one or more embodiments of the present disclosure, an information processing apparatus is provided that manages use of electronic devices.

<Variation>

The above-described embodiments are illustrative and do not limit the present invention. Thus, numerous additional modifications and variations are possible in light of the above teachings. For example, elements and/or features of different illustrative embodiments can be combined with each other and/or substituted for each other within the scope of the present invention. Any one of the above-described operations can be performed in various other ways, for example, in an order different from the one described above.

For example, although a description is given heretofore of an example in which the power of the electronic device 70 is turned on or off in accordance with control information transmitted from the meeting management server 30, the meeting management server 30 can transmit control information for controlling the electronic device 70 to display various kinds of information. For example, the electronic device 70 can display information indicating a remaining time until a scheduled end time such as "10 minutes remaining" or a countdown timer screen that counts down in seconds, minutes, etc. to the end time of the meeting, in accordance with control information from the meeting management server 30. In another example, the electronic device 70 can display a meeting name, names (accounts) of expected participants, etc., in accordance with control information from the meeting management server 30.

Further, although in Embodiment 2, the power of the electronic device 70 is controlled to be turned off in response to a check-out, the meeting management server 30 can control to turn off the power of the electronic device 70 at the end time of the meeting, a short time before the end time, or at a given time after the end time. In this case, the power of the electronic device 70 is turned off, even if a remaining time until the start of the next meeting is less than a predetermined time period. This prevents a meeting from being continued past the scheduled end time.

The control information generator 35 is an example of control information generating means. The control information response unit 36 is an example of control information transmission means. The check-in management unit 38 is an example of resource management means. The control information for turning on the power is an example of first control information. The control information for turning off the power is an example of second control information. A part of the resource reservation system 100 (e.g., the meeting management server 30 and the meeting room terminal 90) is an example of a device control system. The server communication unit 91 is an example of receiving means. The electronic device communication unit 95 is an example of electronic device communication means. The terminal apparatus communication unit 92 is an example of terminal communication means.

The notification determination unit 34 is an example of notification destination identifying means. The meeting information notification unit 37 is an example of notifying means. The check-in management unit 38 is an example of resource management means. The account of an expected participant is an example of identification information of a target person. The group name of a chat system is an example of identification information of a group. The customer domain DB 495 is an example of target person information. The group name and the team ID is an example of notification destination information. The account of a reservation-making participant is an example of reservation identification information. The meeting identification information DB 494 is an example of resource usage registration information. The meeting identification information is an example of reservation management information.

Each of the functions of the described embodiments can be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

What is claimed is:

1. A system comprising an information providing apparatus, a robot, and an information processing apparatus communicable with a reservation management apparatus managing a reservation of a resource and communicable with the information providing apparatus via a network, the information processing apparatus comprising:

a memory to store association information associating notification destination information and identification information with each other, the notification destination information being information used for transmitting notification information from the information providing apparatus to one or more target persons belonging to a same group; and circuitry configured to:
  obtain reservation information from the reservation management apparatus;
  obtain, from the obtained reservation information, particular identification information identifying a user who requested the reservation of the resource indicated by the obtained reservation information;
  identify, from the association information in the memory using the particular identification information, a team ID and a group name associated with an account of the user who requested the reservation of the resource;
  identify, using the team ID and the group name, particular notification destination information used for transmitting particular notification information relating to the obtained reservation information to a particular group corresponding to the team ID and the group name; and request the information providing apparatus to send the particular notification information relating to the obtained reservation information to the particular group associated with the team ID and the group name, wherein the information providing apparatus is a chat system, and the particular notification information comprises a chat message sent by the chat system, and wherein the robot is registered in the chat system and configured to send the chat message to the particular group by entering text in a chat between the one or more target persons belonging to the particular group.

2. The system of claim 1,
wherein the notification destination information stored in the memory is managed by the information providing apparatus and identifies the same group to which the one or more target persons belong.

3. The system of claim 1, wherein
the information providing apparatus receives the particular notification information and performs a process of sharing the particular notification information within the particular group in a chat system, and
the circuitry is further configured to cause the information providing apparatus to enter the particular notification information on behalf of the information processing apparatus, and to send the particular notification information to one or more target persons belonging to the particular group.

4. The system of claim 1, wherein
the circuitry is further configured to obtain a response to the notification information relating to the reservation of the resource from one or more terminal apparatuses, each being operated by one of the one or more target persons, and
the circuitry is further configured to request the reservation management apparatus to cancel the reservation of the resource according to a content of the obtained response.

5. The system of claim 4, wherein
when the circuitry receives no response from the one or more terminal apparatuses within a specific time from when the circuitry requests the information providing apparatus for transmission of the notification information, the circuitry is further configured to request the reservation management apparatus to cancel the reservation of the resource.

6. The system of claim 4, wherein
the notification information about the reservation of the resource notified by the circuitry to the one or more terminal apparatuses via the information providing apparatus includes a first graphical component that accepts an instruction for confirming the reservation of the resource and a second graphical component that accepts an instruction for cancelling the reservation of the resource, and
the circuitry is further configured to receive, via the information providing apparatus, information indicating that the reservation of the resource is confirmed or cancelled from the one or more terminal apparatuses in response to selection of one of the first graphical component and the second graphical component.

7. The system of claim 4, wherein
the association information further associates identification information of the one or more target persons with the notification destination information, and
the circuitry is further configured to identify, in the association information, the notification destination information associated with the identification information of the one or more target persons who transmitted the response in the association information, and
the circuitry is further configured to request the information providing apparatus to notify the content of the response based on the identified notification destination information.

8. The system of claim 1, wherein the circuitry is further configured to:
determine, based on notification setting information in which a timing for sending the notification information is set, whether particular reservation information exists for which a notification is to be sent from among the reservation information obtained from the reservation management apparatus; and
based on the determination that the particular reservation information exists, obtain the particular identification information for the reservation identifying the user who requested the reservation indicated by the particular reservation information.

9. A resource reservation system, comprising:
a terminal apparatus;
a chat system and a robot registered in the chat system; and
an information processing apparatus communicable with the terminal apparatus, and including a memory to store association information associating notification destination information and identification information for reservation with each other, the notification destination information being information used for transmitting notification information to one or more target persons belonging to a same group, and the identification information for reservation identifying an entity that reserves a resource,
wherein the terminal apparatus includes first circuitry to display a reservation screen and accept, from a user, a request for a reservation of a resource, the request including particular identification information identifying the user, and
the information processing apparatus further includes second circuitry configured to:
identify, from the association information in the memory using the particular identification information, a team ID and a group name associated with an account of the user who requested the reservation of the resource;
identify, using the team ID and the group name, particular notification destination information used for transmitting particular notification information relating to the reservation of the resource to a particular group corresponding to the team ID and the group name; and
request to send the particular notification information relating to the reservation of the resource to the particular group associated with the team ID and the group name,
wherein the particular notification information is a chat message sent by the robot registered in the chat system, and the robot is configured to send the chat message to the particular group by entering text in a chat between the one or more target persons belonging to the particular group.

10. An information notification method, performed by an information processing apparatus communicable with a reservation management apparatus managing a reservation of a resource and communicable with an information providing apparatus via a network, the method comprising:

storing, in a memory, association information associating notification destination information and identification information for reservation with each other, the notification destination information being information used for transmitting notification information from the information providing apparatus to one or more target persons belonging to a same group;

obtaining reservation information from the reservation management apparatus;

obtaining, from the obtained reservation information: particular identification information identifying a user who requested a reservation of a resource indicated by the obtained reservation information;

identifying, from the association information in the memory using the particular identification information, a team ID and a group name associated with an account of the user who requested the reservation of the resource;

identifying, using the team ID and the group name, particular notification destination information used for transmitting particular notification information relating to the obtained reservation information to a particular group corresponding to the team ID and the group name; and requesting the information providing apparatus to send the particular notification information relating to the obtained reservation information to the particular group associated with the team ID and the group name, wherein the information providing apparatus is a chat system, and the particular notification information comprises a chat message sent by the chat system, and wherein a robot registered in the chat system is configured to send the chat message to the particular group by entering text in a chat between the one or more target persons belonging to the particular group.

11. The method of claim 10 further comprising:

after sending of the particular notification information, waiting a predetermined time for a user response to the particular notification information; and in a case that the user response is not received within the predetermined time, canceling the reservation by the robot.

\* \* \* \* \*